US007206924B2

(12) United States Patent
Boles et al.

(10) Patent No.: US 7,206,924 B2
(45) Date of Patent: *Apr. 17, 2007

(54) MICROCONTROLLER INSTRUCTION SET

(75) Inventors: Edward Brian Boles, Mesa, AZ (US); Rodney Drake, Phoenix, AZ (US); Darrel Johansen, Tempe, AZ (US); Sumit Mitra, Tempe, AZ (US); Joseph Triece, Phoenix, AZ (US); Randy Yach, Phoenix, AZ (US)

(73) Assignee: Microchip Technology Inc., Chandler, AZ (US)

( * ) Notice: Subject to any disclaimer, the term of this patent is extended or adjusted under 35 U.S.C. 154(b) by 378 days.

This patent is subject to a terminal disclaimer.

(21) Appl. No.: 10/751,210

(22) Filed: Dec. 31, 2003

(65) Prior Publication Data

US 2004/0158692 A1    Aug. 12, 2004

Related U.S. Application Data

(63) Continuation of application No. 09/280,112, filed on Mar. 26, 1999, now Pat. No. 6,708,268.

(51) Int. Cl.
*G06F 12/08* (2006.01)

(52) U.S. Cl. ..................................... 712/220

(58) Field of Classification Search ................ 712/220, 712/247, 248
See application file for complete search history.

(56) References Cited

U.S. PATENT DOCUMENTS

| | | | |
|---|---|---|---|
| 4,118,773 A | 10/1978 | Raguini et al. | 364/200 |
| 4,124,893 A | 11/1978 | Joyce et al. | 364/200 |
| 4,276,595 A | 6/1981 | Brereton et al. | 712/207 |
| 5,117,488 A | 5/1992 | Noguchi et al. | 712/210 |
| 5,455,955 A | 10/1995 | Kida et al. | 712/208 |
| 5,504,903 A | 4/1996 | Chen et al. | 713/1 |
| 5,553,023 A * | 9/1996 | Lau et al. | 365/189.01 |
| 5,613,151 A * | 3/1997 | Dockser | 711/202 |
| 5,649,207 A | 7/1997 | Suzuki et al. | 395/733 |
| 5,704,052 A | 12/1997 | Wu et al. | 395/380 |
| 5,734,858 A * | 3/1998 | Patrick et al. | 711/208 |
| 5,774,740 A | 6/1998 | Namba | 712/42 |
| 5,987,583 A | 11/1999 | Triece et al. | 711/214 |
| 6,009,509 A | 12/1999 | Leung et al. | 712/380 |
| 6,058,467 A | 5/2000 | Broterman et al. | 712/32 |

FOREIGN PATENT DOCUMENTS

| | | |
|---|---|---|
| EP | 0 889 393 | 1/1999 |
| EP | 0 918 279 | 5/1999 |
| WO | WO 93 10501 | 5/1993 |

* cited by examiner

*Primary Examiner*—Eric Coleman
(74) *Attorney, Agent, or Firm*—Baker Botts L.L.P.

(57) ABSTRACT

A microcontroller apparatus is provided with an instruction set for manipulating the behavior of the microcontroller. The apparatus and system is provided that enables a linearized address space that makes modular emulation possible. Direct or indirect addressing is possible through register files or data memory. Special function registers, including the Program Counter (PC) and Working Register (W), are mapped in the data memory. An orthogonal (symmetrical) instruction set makes possible any operation on any register using any addressing mode. Consequently, two file registers to be used in some two operand instructions. This allows data to be moved directly between two registers without going through the W register. Thus increasing performances and decreasing program memory usage.

8 Claims, 95 Drawing Sheets

|  | TCY0 | TCY1 | TCY2 | TCY3 | TCY4 | TCY5 |
|---|---|---|---|---|---|---|
| 1. MOVLW 55h | Fetch 1 | Execute 1 | | | | |
| 2. MOVWF PORTB | | Fetch 2 | Execute 2 | | | |
| 3. MOVWF PORTB | | | Fetch 3 | Execute 3 | | |

*Figure 9*

|  | TCY0 | TCY1 | TCY2 | TCY3 | TCY4 | TCY5 |
|---|---|---|---|---|---|---|
| 1. MOVLW 55h | Fetch 1 | Execute 1 | | | | |
| 2. BTFSC PORTA, 3 | | Fetch 2 | Execute 2 Skip Taken | | | |
| 3. ADDWF PORTB | | | Fetch 3 | Flush | | |
| 4. BRA SUB_1 | | | | Fetch 4 | Execute 4 | |
| 5. ADDWF PORTB | | | | | Fetch 5 | Flush |
| 6. Instruction @ address SUB_1 | | | | | | Fetch SUB_1 |

*Figure 10*

|  | TCY0 | TCY1 | TCY2 | TCY3 | TCY4 | TCY5 |
|---|---|---|---|---|---|---|
| 1. MOVLW 55h | Fetch 1 | Execute 1 | | | | |
| 2. TBLWT +* | | Fetch 2 | Execute 2 | | | |
| 3. MOVLW 0AAh | | | Fetch 3 | Execute 2 Write Cycle | | |
| 2a. Table Operation | | | | Bus Write | Execute 3 | |
| 4. MOVLW 0CCh | | | | | Fetch 4 | Execute 4 |

*Figure 11*

|   | TCY0 | TCY1 | TCY2 | TCY3 | TCY4 | TCY5 |
|---|---|---|---|---|---|---|
| 1. MOVLW 55h | Fetch 1 | Execute 1 | | | | |
| 2. MOVFF PORTB, PORTA | | Fetch 2R | Read PORTB | | | |
| 3. Second Word | | | Fetch 2W | Write PORTA | | |
| 4. BSF PORTA, BIT3 | | | | Fetch 3 | Execute 3 | |

*Figure 12*

|   | TCY0 | TCY1 | TCY2 | TCY3 | TCY4 | TCY5 |
|---|---|---|---|---|---|---|
| 1. MOVLW 55h | Fetch 1 | Execute 1 | | | | |
| 2. MOVLF FSR0, 05ACh | | Fetch 2H | Write FSR0H | | | |
| 3. Second Word | | | Fetch 2L | Write FSR0L | | |
| 4. BSF PORTA, BIT3 | | | | Fetch 3 | Execute 3 | |

*Figure 13*

|   | TCY0 | TCY1 | TCY2 | TCY3 | TCY4 | TCY5 |
|---|---|---|---|---|---|---|
| 1. MOVLW 55h | Fetch 1 | Execute 1 | | | | |
| 2. GOTO LABEL | | Fetch 2L | Update PC | | | |
| 2a. Second Word | | | Fetch 2H | NOP | | |
| 3. Instruction @ address LABEL | | | | Fetch LABEL | Execute LABEL | |
| 4. BSF PORTA, BIT3 | | | | | Fetch 4 | Execute 4 |

*Figure 14*

| --- | --- | --- | N | OV | Z | DC | C |
|-----|-----|-----|-----|-----|-----|-----|-----|
| bit7 | bit6 | bit5 | bit4 | bit3 | bit2 | bit1 | bit0 |

*Figure 15*

| R/C-0 | R/C-0 | U-0 | R/W-0 | R/W-0 | R/W-0 | R/W-0 | R/W-0 |
|---|---|---|---|---|---|---|---|
| STKOVF | STKUNF | - | SP4 | SP3 | SP2 | SP1 | SP0 |
| bit7 | 6 | 5 | 4 | 3 | 2 | 1 | bit0 |

R = Readable bit
W = Writeable bit
C = Clearable bit
U = Unimplemented bit, Read as '0'
- n = Value at POR reset bit 7: STKOVF: Stack Overflow Flag bit
1 = Stack overflow occurred
0 = Reset or cleared by user software bit 6: STKUNF: Stack Underflow Flag bit
1 = Stack underflow occurred
0 = Reset or cleared by user software bit 5: Unimplemented: Read as '0' bit 4-0: SP4:SP0: Stack Pointer Location bits

STKPTR - Stack Pointer Register

Figure 18

| U-0 | U-0 | U-0 | R/W-u | R/W-u | R/W-u | R/W-u | R/W-u |
|---|---|---|---|---|---|---|---|
| - | - | - | TOS20 | TOS19 | TOS18 | TOS17 | TOS16 |
| bit7 | 6 | 5 | 4 | 3 | 2 | 1 | bit0 | bit 7-0: TSO<20:16>: Top of Stack bit

R = Readable bit
W = Writeable bit
U = Unimplemented bit, Read as '0'
- n = Value at POR reset

Figure 19  TOSU - Top of Stack Upper

| R/W-u | R/W-u | R/W-u | R/W-u | R/W-u | R/W-u | R/W-u | R/W-u |
|---|---|---|---|---|---|---|---|
| TOS15 | TOS14 | TOS13 | TOS12 | TOS11 | TOS10 | TOS9 | TOS8 |
| bit7 | 6 | 5 | 4 | 3 | 2 | 1 | bit0 | bit 7-0: TOS<15:8>: Top of Stack bit

R = Readable bit
W = Writeable bit
U = Unimplemented bit, Read as '0'
- n = Value at POR reset

Figure 20  TOSH - Top of Stack High

| R/W-u | R/W-u | R/W-u | R/W-u | R/W-u | R/W-u | R/W-u | R/W-u |
|---|---|---|---|---|---|---|---|
| TOS7 | TOS6 | TOS5 | TOS4 | TOS3 | TOS2 | TOS1 | TOS0 |
| bit7 | 6 | 5 | 4 | 3 | 2 | 1 | bit0 | bit 7-0: TOS<7:0>: Top of Stack bit

R = Readable bit
W = Writeable bit
U = Unimplemented bit, Read as '0'
- n = Value at POR reset

Figure 21  TOSL - Top of Stack Low

When a device is reset, the PC is loaded with the reset vector (0h). The stack pointer is initialized to 00h, and the Top of Stack register (TOS) is 000000h.

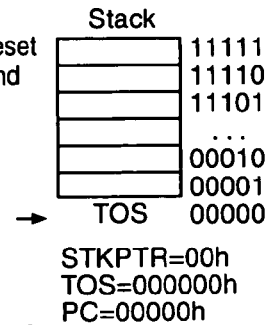

STKPTR=00h
TOS=000000h
PC=00000h

Reset

Figure 22

The first push of the stack increments the stack pointer to point to location 1. The value in the PC is loaded into stack level 1. The PC is then updated.

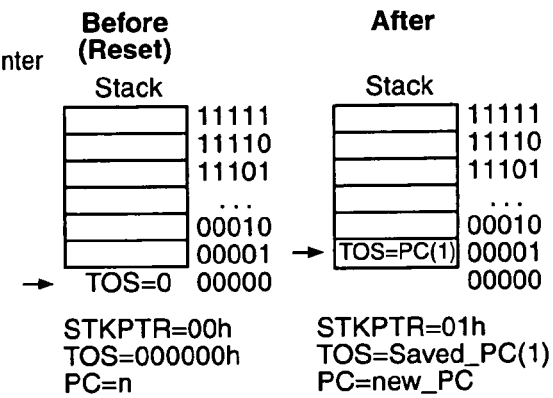

First CALL on an initialized stack

Figure 23

The second push will increment the stack pointer, load the TOS register with the current PC value, and then update the PC.

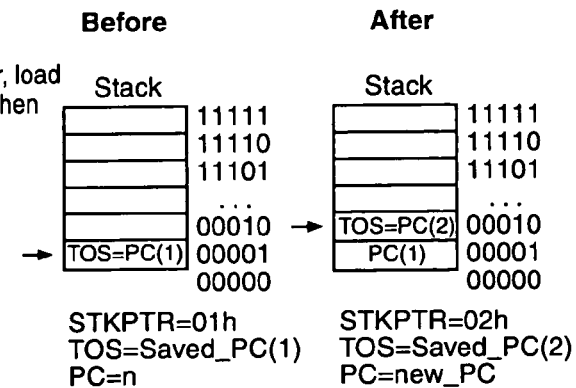

Second Consecutive CALL

Figure 24

The 31st CALL will increment the stack pointer, load the TOS register with the current PC value, and then update the PC. The STKOVF bit is set to indicate the impending stack overflow.

The 32nd CALL will attempt to increment the stack pointer. However the stack pointer is now pointing at the upper most stack level and cannot be incremented. The pointer will be loaded with 1Fh (still pointing to stack level 31), and the TOS will be overwritten with the current PC value. The PC will be updated. The stack overflow bit remains set. Another push will yield the same results. Once the pointer had incremented to 1Fh, it cannot be incremented to a higher value, it can only be cleared or decremented.

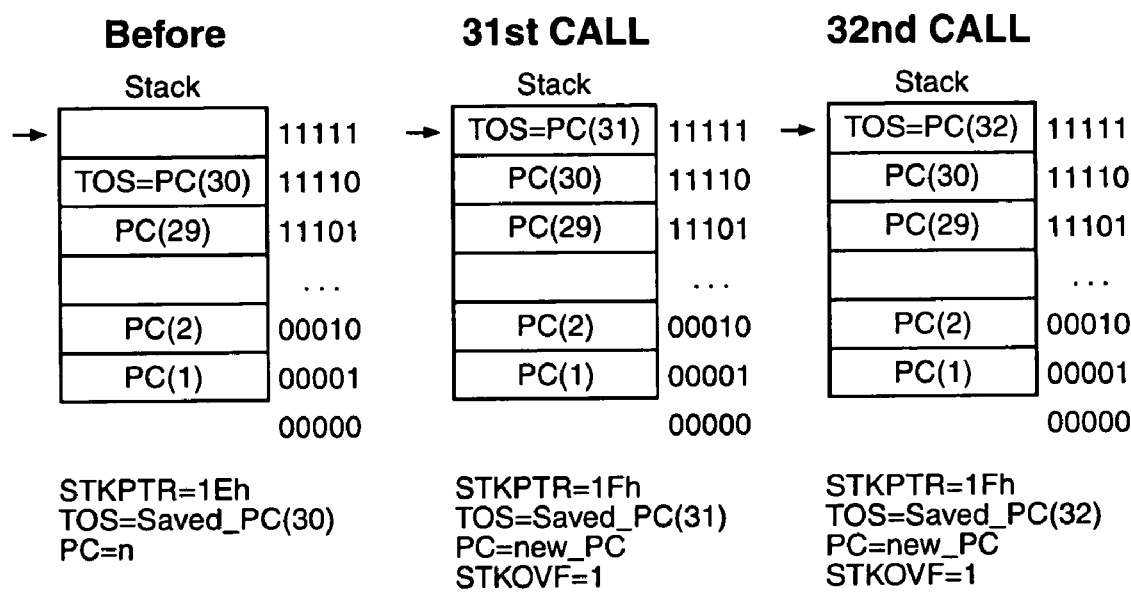

31st and 32nd consecutive CALL

*Figure 25*

A return pop will copy the contents of the TOS to the PC
and then decrement the stack pointer.

Return Pop

When the stack has been popped enough to reach 00h and the stack pointer can no longer be decremented, further popping will return 000000h to the PC. The stack pointer will maintain the value of 00h. The underflow bit (STKUNF) is set.

Stack Return Pops Causing Stack Underflow

A PUSH instruction performs a similar operation as a call. The PC is incremented to PC+2, the stack pointer is incremented and the TOS is loaded with the PC value (which is essentially a wasted operation). The user will then have access to write values into the TOS registers.

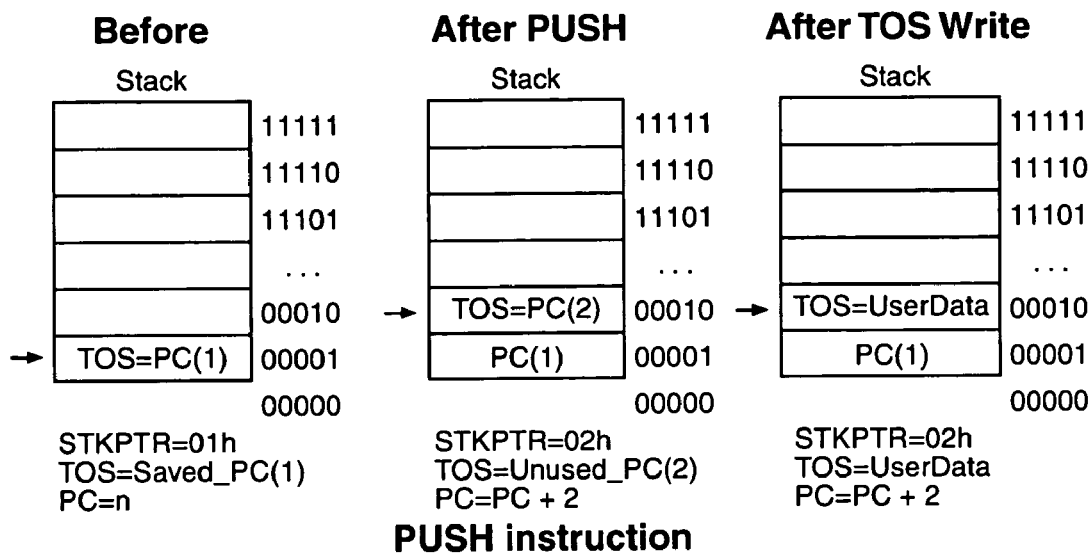

PUSH instruction

*Figure 28*

The POP instruction will perform actions similar to a return, however the PC is not loaded with the TOS value. The user must recover his data before the POP.
The stack pointer is then decremented.

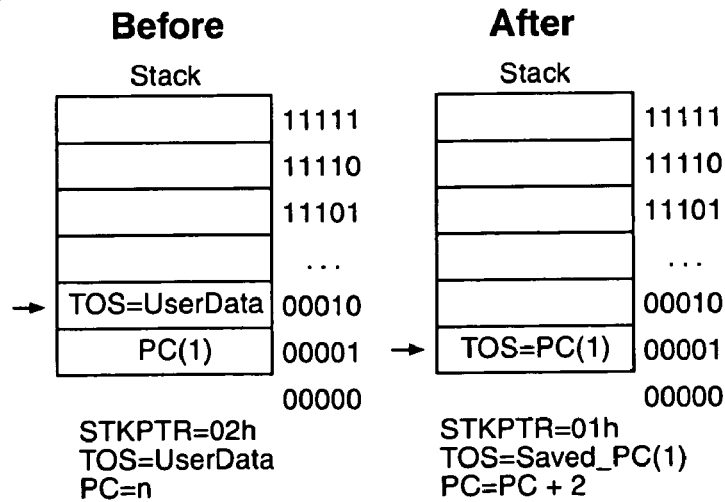

POP instruction

*Figure 29*

Note 1:
User memory space may be internal, external, or both. The memory configuration depends on the processor mode.

|  | 1 | 0 | LSb of Address |
|---|---|---|---|
| Word Addresses → 000000h | 000001h | 000000h | ← Byte Addresses |
| // 000002h | 000003h | 000002h | // |
| // 000004h | 000005h | 000004h | // |
| // 000006h | 000007h | 000006h | // |
|  |  |  |  |
| Word Addresses → 1FFFFEh | 1FFFFFh | 1FFFFEh | ← Byte Addresses |

MSb  LSb   MSb  LSb
 MS Byte    LS Byte

Memory Map in Bytes/Words

*Figure 31*

|  | 1 | 0 | LSb of Address |
|---|---|---|---|
| Word Addresses → 000000h | 0Eh | 55h | ← MOVLW 55h |
| // 000002h | EFh | 2Bh | ┌ GOTO 123456H |
| // 000004h | F9h | 1Ah | ┘ |
| // 000006h | C1h | 23h | ┌ MOVFF123h, 456h |
| 000008h | F4h | 56h | ┘ |
|  |  |  |  |
| Word Addresses → 1FFFFEh |  |  |  |

MSb  LSb   MSb  LSb
 MS Byte    LS Byte

Instructions in Memory

*Figure 32*

|                          | Microprocessor Mode | Extended Microcontroller Mode | Microcontroller Mode |
|--------------------------|---------------------|-------------------------------|----------------------|
| Program Space Execution  | 000000h — External Program Memory — 1FFFFFh  OFF-CHIP | 000000h On-chip Program Memory 007FFFh  008000h External Program Memory 1FFFFFh  ON-CHIP / OFF-CHIP | 000000h On-chip Program Memory 007FFFh  008000h Reads '0' 1FFFFFh  ON-CHIP / OFF-CHIP |
| Data Space               | 000h — FFFh  ON-CHIP | 000h — FFFh  ON-CHIP | 000h — FFFh  ON-CHIP |

Note 1: Example Shows 32K Bytes of Internal EPROM Program Memory

Device Memory Map in Different Modes

*Figure 33*

| R/W-0 | U-0 | R/W-0 | R/W-0 | U-0 | U-0 | R/W-0 | R/W-0 |
|---|---|---|---|---|---|---|---|
| EBDIS | — | WAIT1 | WAIT0 | — | — | WM1 | WM0 |
| bit7 | | | | | | | bit0 |

R = Readable bit
W = Writable bit
-n = Value at POR reset
(x = unknown)

bit 7: EBDIS: External bus disable
1 = Drivers disable, all external bus drivers disabled, I/O ports can be used to control signals
0 = Drivers enabled bit 6: Unimplemented: Read as '0' bit 5-4: Wait <1:0>: Table reads and writes bus cycle wait count
11 = Table reads and writes will wait 0 Tcy
10 = Table reads and writes will wait 1 Tcy
01 = Table reads and writes will wait 2 Tcy
00 = Table reads and writes will wait 3 Tcy bit 3-2: Unimplemented: Read as '0' bit 1-0: WM<1:0>: TABLWT operation with 16-bit bus
1x = Word Write Mode: TABLAT0 and TABLAT1 word output, $\overline{WRH}$ active when TABLAT1 written
01 = Byte Select Mode: TABLAT data copied on both MS and LS, $\overline{WRH}$ and ($\overline{UB}$ or $\overline{LB}$) will activate
00 = Byte Write Mode: TABLAT data copied on both MS and Byte, $\overline{WRH}$ or $\overline{WRL}$ will activate MEMCON Register

*Figure 34*

| U-1 | R/P-1 | R/P-1 | R/P-1 | U-1 | R/P-1 | R/P-1 | R/P-1 |
|---|---|---|---|---|---|---|---|
| — | BSDIS | BADIS | WDIS | — | A19SDIS | A15DIS | A11DIS | bit7                                                            bit0 bit 7: Unimplemented: Read as '0' bit 6: BSDIS: Byte Select $\overline{UB}$, $\overline{LB}$ disable
        0=Drivers disabled
        1=Drivers enabled R = Readable bit
P = Programmable bit
-n = UnprogrammedValue
    (x = unknown)

bit 5: BADIS: Byte Address BA0 disable
        0=Drivers disabled
        1=Drivers enabled bit 5: WDIS: Write Select $\overline{WRH}$, $\overline{WRL}$ disable
        0=Drivers disabled
        1=Drivers enabled bit 3: Unimplemented: Read as '0' bit 2: A19DIS: Disable AD19:AD16 drivers
        0=Drivers disabled
        1=Drivers enabled bit 1: A15DIS: Disable AD15:AD12 drivers
        0=Drivers disabled, only if 8-bit external interface
        1=Drivers enabled bit 0: A11DIS: Disable AD11:AD8 drivers
        0=Drivers disabled, only if 8-bit external interface
        1=Drivers enabled

CONFIG7 Configuration Byte

*Figure 35*

External Memory Connection Diagram (16-bit)

Note 1: This signal is unused for ROM and EPROM external memories

External Memory Connection Diagram (8-bit)

| Name | Port | Bit | Function |
|---|---|---|---|
| RF4/BA0 | PORTF | bit4 | Input/Output or system bus byte address bit 0 |
| RD0/AD0 | PORTD | bit0 | Input/Output or system bus address bit 0 or data bit 0 |
| RD1/AD1 | PORTD | bit1 | Input/Output or system bus address bit 1 or data bit 1 |
| RD2/AD2 | PORTD | bit2 | Input/Output or system bus address bit 2 or data bit 2 |
| RD3/AD3 | PORTD | bit3 | Input/Output or system bus address bit 3 or data bit 3 |
| RD4/AD4 | PORTD | bit4 | Input/Output or system bus address bit 4 or data bit 4 |
| RD5/AD5 | PORTD | bit5 | Input/Output or system bus address bit 5 or data bit 5 |
| RD6/AD6 | PORTD | bit6 | Input/Output or system bus address bit 6 or data bit 6 |
| RD7/AD7 | PORTD | bit7 | Input/Output or system bus address bit 7 or data bit 7 |
| RE0/AD8 | PORTE | bit0 | Input/Output or system bus address bit 8 or data bit 8 |
| RE1/AD9 | PORTE | bit1 | Input/Output or system bus address bit 9 or data bit 9 |
| RE2/AD10 | PORTE | bit2 | Input/Output or system bus address bit 10 or data bit 10 |
| RE3/AD11 | PORTE | bit3 | Input/Output or system bus address bit 11 or data bit 11 |
| RE4/AD12 | PORTE | bit4 | Input/Output or system bus address bit 12 or data bit 12 |
| RE5/AD13 | PORTE | bit5 | Input/Output or system bus address bit 13 or data bit 13 |
| RE6/AD14 | PORTE | bit6 | Input/Output or system bus address bit 14 or data bit 14 |
| RE7/AD15 | PORTE | bit7 | Input/Output or system bus address bit 15 or data bit 15 |
| RG0/A16 | PORTG | bit0 | Input/Output or system bus address bit 16 |
| RG1/A17 | PORTG | bit1 | Input/Output or system bus address bit 17 |
| RG2/A18 | PORTG | bit2 | Input/Output or system bus address bit 18 |
| RG3/A19 | PORTG | bit3 | Input/Output or system bus address bit 19 |
| RF0/ALE | PORTF | bit0 | Input/Output or system bus Address Latch Enable (ALE) control pin |
| RF1/$\overline{OE}$ | PORTF | bit1 | Input/Output or systems bus Output Enable ($\overline{OE}$) control pin |
| RF2/$\overline{WRL}$ | PORTF | bit2 | Input/Output or system bus Write Low ($\overline{WRL}$) control pin |
| RF3/$\overline{WRH}$ | PORTF | bit3 | Input/Output or system bus Write High ($\overline{WRH}$) control pin |
| RF5/$\overline{LB}$ | PORTF | bit2 | Input/Output or system bus Lower Byte Enable ($\overline{LB}$) control pin |
| RF6/$\overline{UB}$ | PORTF | bit3 | Input/Output or system bus Upper Byte Enable ($\overline{UB}$) control pin |

Typical Port Functions

*Figure 38*

| | A<19:16> | AD<15:8> | AD<7:0> | BA0 | ALE | OE | WRH | WRL | UB | UL |
|---|---|---|---|---|---|---|---|---|---|---|
| Opcode Fetch 8-bit | PC<20:17> | PC<16:9> | Q1-2:PC<8:1><br>Q3: INST<15:8><br>Q4: INST<7:0> | Q1-2:0<br>Q3: 1<br>Q4: 0 | 1 | 0 | - | 1 | - | - |
| Opcode Fetch 16-bit | PC<20:17> | Q2:PC<17><br>Q3-4: INST<15:8> | Q1-2:PC<20:17><br>Q3-4: INST<7:0> | 0 | 1 | 0 | 1 | 1 | 0 | 0 |
| Table Read 8-bit | TBLPTR<20:17> | TBLPTR<16:9> | Q1-2:TBLPTR<8:1><br>Q3-4:DATA<7:0> | TBLPTR<0> | 1 | 0 | - | 1 | - | - |
| Table Read 16-bit | TBLPTR<20:17> | Q1-2:TBLPTR<16:9><br>Q3-4:DATA<15:8> | Q1-2:TBLPTR<8:1><br>Q3-4:DATA<7:0> | TBLPTR<0> | 1 | 0 | 1 | 1 | 0 | 0 |
| Table Write 8-bit | TBLPTR<20:17> | TBLPTR<16:9> | Q1-2:TBLPTR<8:1><br>Q3-4:TABLAT<7:0> | TBLPTR<0> | 1 | 1 | - | 0 | - | - |
| Table Write 16-bit<br>Byte Write Mode | TBLPTR<20:17> | Q1-2:TBLPTR<16:9><br>Q3-4:TABLAT<7:0> | Q1-2:TBLPTR<8:1><br>Q3-4:TABLAT<7:0> | TBLPTR<0> | 1 | 1 | $\overline{XH}$ | $\overline{XL}$ | 1 | 1 |
| Table Write16-bit<br>Byte Select Mode | TBLPTR<20:17> | Q1-2:TBLPTR<16:9><br>Q3-4:TABLAT<7:0> | Q1-2:TBLPTR<8:1><br>Q3-4:TABLAT<7:0> | TBLPTR<0> | 1 | 1 | 0 | 1 | $\overline{YH}$ | $\overline{YL}$ |
| Table Write16-bit<br>Word Write Mode<br>TABPTR<0>=0 | TBLPTR<20:17> | Q1-2:TBLPTR<16:9><br>Q3-4: Hi-Z | Q1-2:TBLPTR<8:1><br>Q3-4: Hi-Z<br>TBHREG<7:0>=<br>TABLAT<7:0> | TBLPTR<0><br>=0 | 1 | 1 | 1 | 1 | 1 | 1 |
| Table Write16-bit<br>Word Write Mode<br>TABPTR<0>=1 | TBLPTR<20:17> | Q1-2:TBLPTR<16:9><br>Q3-4:TABLAT<7:0> | Q1-2:TBLPTR<8:1><br>Q3-4:TBHREG<7:0> | TBLPTR<0><br>=1 | 1 | 1 | 0 | 1 | 0 | 0 |

TBHREG is TABLAT high byte holding register
XH= WRITE signal .AND. TBLPTR<0>
XL= WRITE signal .AND. $\overline{TBLPTR<0>}$
YH= TBLPTR<0>
YL= $\overline{TBLPTR<0>}$

External Bus Cycle Types

Figure 41

The Data Memory Map and the Instruction 'a' bit

| Addr | Name | Addr | Name | Addr | Name | Addr | Name |
|---|---|---|---|---|---|---|---|
| FFFh | TOSU | FDFh | INDF2 | FBFh | CCPR1H | F9Fh | IPR1 |
| FFEh | TOSH | FDEh | POSTINC2 | FBEh | CCPR1L | F9Eh | PIR1 |
| FFDh | TOSL | FDDh | POSTDEC2 | FBDh | CCP1CON | F9Dh | PIE1 |
| FFCh | STKPTR | FDCh | PREINC2 | FBCh | CCPR2H | F9Ch | MEMCON |
| FFBh | PCLATU | FDBh | PLUSW2 | FBBh | CCPR2L | F9Bh | |
| FFAh | PCLATH | FDAh | FSR2H | FBAh | CCP2CON | F9Ah | DDRJ |
| FF9h | PCL | FD9h | FSR2L | FB9h | CCPR3H | F99h | DDRH |
| FF8h | TBLPTRU | FD8h | STATUS | FB8h | CCPR3L | F98h | DDRG |
| FF7h | TBLPTRH | FD7h | TMR0H | FB7h | CCP3CON | F97h | DDRF |
| FF6h | TBLPTRL | FD6h | TMR0L | FB6h | CCPR4H | F96h | DDRE |
| FF5h | TABLAT | FD5h | T0CON | FB5h | CCPR4L | F95h | DDRD |
| FF4h | PRODH | FD4h | rsvd DEBUG | FB4h | CCP4CON | F94h | DDRC |
| FF3h | PRODL | FD3h | OSCCON | FB3h | TMR3H | F93h | DDRB |
| FF2h | INTCON | FD2h | LVDCON | FB2h | TMR3L | F92h | DDRA |
| FF1h | INTCON2 | FD1h | WDTCON | FB1h | T3CON | F91h | LATJ |
| FF0h | INTCON3 | FD0h | RCON | FB0h | | F90h | LATH |
| FEFh | INDF0 | FCFh | TMR1H | FAFh | COM1BRG | F8Fh | LATG |
| FEEh | POSTINC0 | FCEh | TMR1L | FAEh | COM1REC | F8Eh | LATF |
| FEDh | POSTDEC0 | FCDh | T1CON | FADh | COM1TX | F8Dh | LATE |
| FECh | PREINC0 | FCCh | TMR2 | FACh | COM1STA | F8Ch | LATD |
| FEBh | PLUSW0 | FCBh | PR2 | FABh | COM1CON | F8Bh | LATC |
| FEAh | FSR0H | FCAh | T2CON | FAAh | COM2BRG | F8Ah | LATB |
| FE9h | FSR0L | FC9h | SSPBUF | FA9h | COM2REC | F89h | LATA |
| FE8h | W | FC8h | SSPADD | FA8h | COM2TX | F88h | PORTJ |
| FE7h | INDF1 | FC7h | SSPSTAT | FA7h | COM2STA | F87h | PORTH |
| FE6h | POSTINC1 | FC6h | SSPCON1 | FA6h | COM2CON | F86h | PORTG |
| FE5h | POSTDEC1 | FC5h | SSPCON2 | FA5h | IPR3 | F85h | PORTF |
| FE4h | PREINC1 | FC4h | ADRESH | FA4h | PIR3 | F84h | PORTE |
| FE3h | PLUSW1 | FC3h | ADRESL | FA3h | PIE3 | F83h | PORTD |
| FE2h | FSR1H | FC2h | ADCON0 | FA2h | IPR2 | F82h | PORTC |
| FE1h | FSR1L | FC1h | ADCON1 | FA1h | PIR2 | F81h | PORTB |
| FE0h | BSR | FC0h | ADCON2 | FA0h | PIE2 | F80h | PORTA |

Special Function Register Map

Figure 43

| Filename | | Bit 7 | Bit 6 | Bit 5 | Bit 4 | Bit 3 | Bit 2 | Bit 1 | Bit 0 | Value on POR, BOR | Value on all other resets (note 3) |
|---|---|---|---|---|---|---|---|---|---|---|---|
| FFh | TOSU | - | - | - | Top-of-Stack upper Byte (TOS<20:16>) | | | | | - - -0 0000 | - - -0 0000 |
| FEh | TOSH | Top-of-Stack High Byte (TOS<15:8>) | | | | | | | | 0000 0000 | 0000 0000 |
| FDh | TOSL | Top-of-Stack Low Byte (TOS<7:0>) | | | | | | | | 0000 0000 | 0000 0000 |
| FCh | STKPTR | STKOVF | STKUNF | - | Return Stack Pointer | | | | | 00 - 0 0000 | 00 - 0 0000 |
| FBh | PCLATU | - | - | Holding Register for PC<21:16> | | | | | | - - 00 0000 | - - 00 0000 |
| FAh | PCLATH | Holding Register for PC<15:8> | | | | | | | | 0000 0000 | 0000 0000 |
| F9h | PCL | PC Low Byte (PC<7:0>) | | | | | | | | 0000 0000 | 0000 0000 |
| F8h | TBLPTRU | - | - | Program Memory Table Pointer Upper Byte (TBLPTR<21:16>) | | | | | | - - 00 0000 | - - 00 0000 |
| F7h | TBLPTRH | Program Memory Table Pointer High Byte (TBLPTR<15:8>) | | | | | | | | 0000 0000 | 0000 0000 |
| F6h | TBLPTRL | Program Memory Table Pointer Low Byte (TBLPTR<7:0>) | | | | | | | | 0000 0000 | 0000 0000 |
| F5h | TABLAT | Program Memory Table Latch | | | | | | | | 0000 0000 | 0000 0000 |
| F4h | PRODH | Product Register High Byte | | | | | | | | xxxx xxxx | uuuu uuuu |
| F3h | PRODL | Product Register Low Byte | | | | | | | | xxxx xxxx | uuuu uuuu |
| F2h | INTCON | GIE/GIEH | PEIE/GIEL | T0IE | INT0E | RBIE | T0IF | INT0F | RBIF | 0000 000x | 0000 000x |
| F1h | INTCON2 | RBPU | INTEDG0 | INTEDG1 | INTEDG2 | INTEDG3 | T0IP | INT3P | RPIP | 1111 1111 | 1111 1111 |
| F0h | INTCON3 | INT2P | INT1P | INT3E | INT2E | INT1E | INT3F | INT2F | INT1F | 1100 0000 | 1100 0000 |
| EFh | INDF0 | Uses contents of FSR0 to address data memory - value of FSR0 not changed (not a physical register) | | | | | | | | n/a | n/a |
| EEh | POSTINC0 | Uses contents of FSR0 to address data memory - value of FSR0 post-increment (not a physical register) | | | | | | | | n/a | n/a |
| EDh | POSTDEC0 | Uses contents of FSR0 to address data memory - value of FSR0 post-decrement (not a physical register) | | | | | | | | n/a | n/a |
| ECh | PREINC0 | Uses contents of FSR0 to address data memory - value of FSR0 pre-incremented (not a physical register) | | | | | | | | n/a | n/a |
| EBh | PLUSW0 | Uses contents of FSR0 to address data memory - value of FSR0 offset by W (not a physical register) | | | | | | | | n/a | n/a |
| EAh | FSR0H | - | - | - | - | Indirect Data Memory Address Pointer 0 High | | | | - - - - xxxx | - - - - uuuu |
| E9h | FSR0L | Indirect Data Memory Address Pointer 0 Low Byte | | | | | | | | xxxx xxxx | uuuu uuu |
| E8h | W | Working Register | | | | | | | | xxx xxxx | uuuu uuuu |
| E7h | INDF1 | Uses contents of FSR1 to address data memory - value of FSR1 not changed (not a physical register) | | | | | | | | n/a | n/a |
| E6h | POSTINC1 | Uses contents of FSR1 to address data memory - value of FSR1 post-increment (not a physical register) | | | | | | | | n/a | n/a |
| E5h | POSTDEC1 | Uses contents of FSR1 to address data memory - value of FSR1 post-decrement (not a physical register) | | | | | | | | n/a | n/a |
| E4h | PREINC1 | Uses contents of FSR1 to address data memory - value of FSR1 pre-incremented (not a physical register) | | | | | | | | n/a | n/a |
| E3h | PLUSW1 | Uses contents of FSR1 to address data memory - value of FSR1 offset by W (not a physical register) | | | | | | | | n/a | n/a |
| E2h | FSR1H | - | - | - | - | Indirect Data Memory Address Pointer 1 High | | | | - - - - xxxx | - - - - uuuu |
| E1h | FSR1L | Indirect Data Memory Address Pointer 1 Low Byte | | | | | | | | xxxx xxxx | uuuu uuuu |
| E0h | BSR | - | - | - | - | Bank Select Register | | | | - - - - 0000 | - - - - 0000 |
| DFh | INDF2 | Uses contents of FSR2 to address data memory - value of FSR2 not changed (not a physical register) | | | | | | | | n/a | n/a |
| DEh | POSTINC2 | Uses contents of FSR2 to address data memory - value of FSR2 post-increment (not a physical register) | | | | | | | | n/a | n/a |
| DDh | POSTDEC2 | Uses contents of FSR2 to address data memory - value of FSR2 post-decrement (not a physical register) | | | | | | | | n/a | n/a |
| DCh | PREINC2 | Uses contents of FSR2 to address data memory - value of FSR2 pre-incremented (not a physical register) | | | | | | | | n/a | n/a |
| DBh | PLUSW2 | Uses contents of FSR2 to address data memory - value of FSR2 offset by W (not a physical register) | | | | | | | | n/a | n/a |
| DAh | FSR2H | - | - | - | - | Indirect Data Memory Address Pointer 2 High | | | | - - - - xxxx | - - - - uuuu |
| D9h | FSR2L | Indirect Data Memory Address Pointer 2 Low Byte | | | | | | | | xxxx xxxx | uuuu uuuu |
| D8h | STATUS | - | - | - | N | OV | Z | DC | C | - - - x xxxx | - - - u uuuu |

Core Special Function Register Summary

Figure 44

| Filename | Bit 7 | Bit 6 | Bit 5 | Bit 4 | Bit 3 | Bit 2 | Bit 1 | Bit 0 | Value on POR, BOR | Value on all other resets (note 3) |
|---|---|---|---|---|---|---|---|---|---|---|
| D3h OSCCON | - | - | - | - | - | - | - | SCS | ---- ---0 | ---- ---0 |
| D2h LVDCON | - | - | BGST | LVDEN | LVV3 | LVV2 | LVV1 | LVV0 | --00 0101 | --00 0101 |
| D1h WDTCON | - | - | - | - | - | - | - | SWDTE | ---- ---0 | ---- ---0 |
| D0h RCON | IPE | LWRT | - | RI | TO | PD | POR | BOR | 00-1 11qq | 00-q qquu |
| A5h IPR3 | - | - | - | - | - | - | - | - | ---- ---- | ---- ---- |
| A4h PIR3 | - | - | - | - | - | - | - | - | ---- ---- | ---- ---- |
| A3h PIE3 | - | - | - | - | - | - | - | - | ---- ---- | ---- ---- |
| A2h IPR2 | - | - | - | - | BCLIP | LVDIP | TMR3IP | CCP2IP | ---- 1111 | ---- 1111 |
| A1h PIR2 | - | - | - | - | BCLIF | LVDIF | TMR3IF | CCP2IF | ---- 0000 | ---- 0000 |
| A0h PIE2 | - | - | - | - | BCLIE | LVDIE | TMR3IE | CCP2IE | ---- 0000 | ---- 0000 |
| 9Fh IPR1 | PSPIP | ADIP | RCIP | TXIP | SSPIP | CCP1IP | TMR2IP | TMR1IP | 1111 1111 | 1111 1111 |
| 9Eh PIR1 | PSPIF | ADIF | RCIF | TXIF | SSPIF | CCP1IF | TMR2IF | TMR1IF | 0000 0000 | 0000 0000 |
| 9Dh PIE1 | PSPIE | ADIE | RCIE | TXIE | SSPIE | CCP1IE | TMR2IE | TMR1IE | 0000 0000 | 0000 0000 |
| 9Ch MEMCON | EBDIS | - | WAIT1 | WAIT0 | - | - | WM1 | WM0 | 0-00 --00 | 0-00 --00 |

Figure 45

Direct Short Addressing Mode

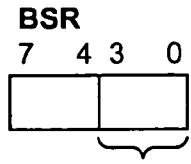
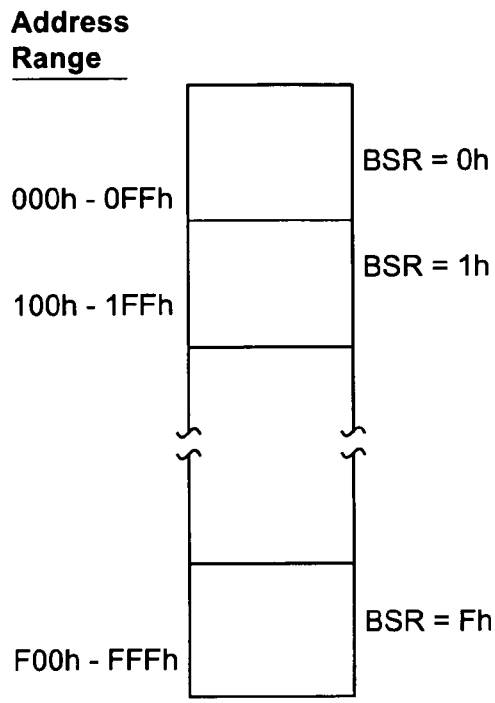
BSR Operation
Figure 47
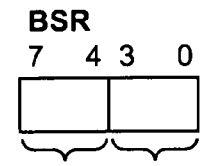
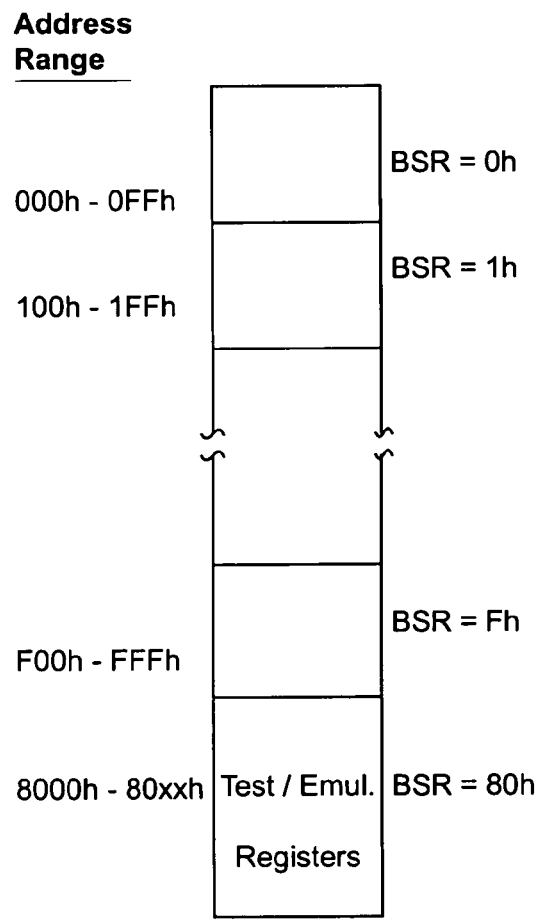
BSR Operation During Emulation/Test Modes
Figure 48

Direct Forced Addressing Mode

Direct Forced Addressing Mode

Indirect Addressing Mode

| Field | Description |
|---|---|
| f<br>f<sub>s</sub><br>f<sub>d</sub> | Register file address (00h to FFh) in current or virtual bank, except MOVFF (000h to FFFh) |
| a | Virtual bank select<br>0 = override BSR and force virtual bank<br>1 = do not override BSR<br>Default is a = '1' |
| s | Fast call/return select<br>0 = do not update into/from shadow registers<br>1 = certain registers loaded into/from shadow registers<br>Default is s = '0' |
| W | Working register (accumulator) |
| b | Bit address within an 8-bit file register |
| k | Literal field, constant data or label |
| n | 2's complement number for relative branch instructions |
| x | Don't care location (= '0' or '1')<br>The assembler will generate code with x = '0'. It is the recommended form of use for compatibility with all Microchip software tools. |
| d | Destination select<br>0 = store result in W<br>1 = store result in file register f<br>Default is d = '1' |
| u | Unused, encoded as '0' |
| label | Label name |
| C, DC, Z, OV, N | ALU status bits Carry, Digit Carry, Zero, Overflow, Negative |
| GIE/<br>GIEH | Global Interrupt Enable bit (INTCON<7>) |
| PEIE/<br>GIEL | Low Priority Interrupt Enable bit (INTCON<6>) |
| TBLPTRU<br>TBLPTRH<br>TBLPTRL | Table Pointer (21-bit) |
| TABLAT | Table Latch (8-bit) |
| PRODL | Product of Multiply low byte |
| PRODH | Product of Multiply high byte |
| TOSU<br>TOSH<br>TOSL | Top of Stack |

| Field | Description |
|---|---|
| PCU<br>PCH<br>PCL | Program Counter |
| BSR | Bank Select Register |
| WDT | Watchdog Timer Counter |
| $\overline{TO}$ | Time-out bit |
| $\overline{PD}$ | Power-down bit |
| dest | Destination either the W register or the specified register file location |
| * | No Change to TBLPTR |
| *+ | Post-Increment TBLPTR |
| *- | Post-Decrement TBLPTR |
| +* | Pre-Increment TBLPTR |
| [ ] | Options |
| ( ) | Contents |
| → | Assigned to |
| < > | Register bit field |

Opcode Field Descriptions

Figure 54

| Field | Description |
|---|---|
| *FSRn | Selects INDFn Register |
| *FSRn++ | Selects POSTINCn Register |
| *FSRn-- | Selects POSTDECn Register |
| *(++FSRn) | Selects PREINCn Register |
| *(FSRn+W) | Selects PLUSWn Register |

Indirect Addressing Symbols

Figure 55

Figures 54 and 55 list the symbols recognized by the MPASM assembler.

Note 1: Any unused opcode is Reserved. Use of any reserved opcode may cause unexpected operation.

All instruction examples use the following format to represent a hexadecimal number:
0xnn
where 0x signifies a hexadecimal digit.
To represent a binary number:
nnnnnnnnb
where b signifies a binary string.

Byte-oriented file register operations

```
15       10 9  8 7           0
┌──────────┬──┬──┬────────────┐
│ OPCODE   │ d│ a│ f (FILE #) │
└──────────┴──┴──┴────────────┘
``` d = 0 for destination W
d = 1 for destination f
a = 0 for force Virtual bank
a = 1 for BSR to select bank
f = 8-bit file register address

Byte to Byte move operations (2-word)

```
15        12 11              0
┌──────────┬──────────────────┐
│ OPCODE   │ f (Source FILE #)│
└──────────┴──────────────────┘

15        12 11              0
┌──────────┬──────────────────────┐
│  1111    │ f (Destination FILE #)│
└──────────┴──────────────────────┘
``` f = 12-bit file register address

Bit-oriented file register operations

```
15      12 11    9 8 7        0
┌────────┬───────┬──┬──────────┐
│ OPCODE │b (BIT#)│ a│f (FILE #)│
└────────┴───────┴──┴──────────┘
``` b = 3-bit address
a = 0 for force Virtual bank
a = 1 for BSR to select bank
f = 8-bit file register address

Literal and control operations

```
15              8 7           0
┌────────────────┬─────────────┐
│   OPCODE       │  k (literal)│
└────────────────┴─────────────┘
``` k = 8-bit immediate value

CALL and GOTO operations

```
15              8 7           0
┌────────────────┬─────────────┐
│   OPCODE       │k<7:0> (literal)│
└────────────────┴─────────────┘

15        12 11              0
┌──────────┬──────────────────┐
│  1111    │ k<19:8> (literal)│
└──────────┴──────────────────┘
``` k = 20-bit immediate value

General Format for Instructions

*Figure 56*

| Mnemonic, Operands | Description | Cycles | 16-bit Opcode MSb … LSb | Status Affected | Notes |
|---|---|---|---|---|---|
| BYTE-ORIENTED FILE REGISTER OPERATIONS | | | | | |
| ADDWF f,d,a | ADD W to f | 1 | 0010 01da ffff ffff | C,DC,N,OV,Z | 3 |
| ADDWFC f,d,a | ADD W and Carry bit to f | 1 | 0010 00da ffff ffff | C,D,C,N,OV,Z | 3 |
| ANDWF f,d,a | AND W with f | 1 | 0001 01da ffff ffff | N,Z | 3 |
| CLRF f,a | Clear f | 1 | 0110 101a ffff ffff | Z | 3 |
| COMF f,d,a | Complement f | 1 | 0001 11da ffff ffff | N,Z | 3 |
| CPFSEQ f,a | Compare f with W, skip if f = W | 1 (2) | 0110 001a ffff ffff | None | 3,5,7,8 |
| CPFSGT f,a | Compare f with W, skip if f > W | 1 (2) | 0110 010a ffff ffff | None | 2,3,5,7,8 |
| CPFSLT f,a | Compare f with W, skip if f < W | 1 (2) | 0110 000a ffff ffff | None | 2,3,5,7,8 |
| DECF f,d,a | Decrement f | 1 | 0000 01da ffff ffff | C,DC,N,OV,Z | 3 |
| DECFSZ f,d,a | Decrement f, skip if 0 | 1 (2) | 0010 11da ffff ffff | None | 3,5,7,8 |
| DCFSNZ f,d,a | Decrement f, skip if not 0 | 1 (2) | 0100 11da ffff ffff | None | 3,5,7,8 |
| INCF f,d,a | Increment f | 1 | 0010 10da ffff ffff | C,DC,N,OV,Z | 3 |
| INCFSZ f,d,a | Increment f, skip if 0 | 1 (2) | 0011 11da ffff ffff | None | 3,5,7,8 |
| INFSNZ f,d,a | Increment f, skip if not 0 | 1 (2) | 0100 10da ffff ffff | None | 3,5,7,8 |
| IORWF f,d,a | Inclusive OR W with f | 1 | 0001 00da ffff ffff | N,Z | 3 |
| MOVF f,d,a | Move f | 1 | 0101 00da ffff ffff | N,Z | 3 |
| MOVFF $f_s,f_d$ | Move $f_s$ (1st word) to $f_d$ (2nd word) | 2 | 1100 ffff ffff ffff<br>1111 ffff ffff ffff | None | 6 |
| MOVWF f,a | Move W to f | 1 | 0110 111a ffff ffff | None | 3 |
| MULWF f,a | Multiply W with f | 1 | 0000 001a ffff ffff | None | 3 |
| NEGF f,a | Negate f | 1 | 0110 110a ffff ffff | C,DC,N,OV,Z | 1,3 |
| NOP --- | No Operation | 1 | 0000 0000 0000 0000 | None | |
| NOP --- | No Operation (2nd Word) | 1 | 1111 xxxx xxxx xxxx | None | |
| RLCF f,d,a | Rotate left f though Carry | 1 | 0011 01da ffff ffff | C,N,Z | 3 |
| RLNCF f,d,a | Rotate left f (no carry) | 1 | 0100 01da ffff ffff | N,Z | 3 |
| RRCF f,d,a | Rotate right f through Carry | 1 | 0011 00da ffff ffff | C,N,Z | 3 |
| RRNCF f,d,a | Rotate right f (no carry) | 1 | 0100 00da ffff ffff | N,Z | 3 |
| SETF f,a | Set f | 1 | 0110 100a ffff ffff | None | 3 |

Legend: Refer to Table 3-6 for opcode field descriptions.
Note 1: 2's Complement method.
  2: Unsigned arithmetic.
  3: If a = '0', the Bank Select Register (BSR) will be overridden and Virtual bank is selected: If a = '1', the BSR is used.
  4: Multiple cycle instruction for EPROM programming when table pointer selects internal EPROM. The instruction is terminated by an interrupt event. Writing to external program memory is a two-cycle instruction.
  5: Two-cycle instruction when condition is true, else single cycle instruction.
  6: Two-cycle instruction except for MOVFF to PCL (program counter low byte) in which case it takes 3 cycles.
  7: A "skip" means that the instruction fetched during execution of the current instruction is not executed, instead an NOP is executed.
  8: When a "skip" instruction executes a skip and is followed by a 2-word instruction, 3 cycles will be executed.
  9: If s = '1', certain registers will be loaded from/into shadow registers. If s = '0' no update occurs.

Instruction S t Summary

*Figure 57*

| Mnemonic, Operands | | Description | Cycles | 16-bit Opcode MSb          LSb | Status Affected | Notes |
|---|---|---|---|---|---|---|
| SUBFWB | f,d,a | Subtract f from W with Borrow | 1 | 0101 01da ffff ffff | C,DC,N,OV,Z | 1,3 |
| SUBWF | f,d,a | Subtract W from f | 1 | 0101 11da ffff ffff | C,DC,N,OV,Z | 1,3 |
| SUBWFB | f,d,a | Subtract W from f with Borrow | 1 | 0101 10da ffff ffff | C,DC,N,OV,Z | 1,3 |
| SWAPF | f,d,a | Swap f | 1 | 0011 10da ffff ffff | None | 3 |
| TSTFSZ | f,a | Test f, skip if 0 | 1 (2) | 0110 011a ffff ffff | None | 3,5,7,8 |
| XORWF | f,d,a | Exclusive OR W with f | 1 | 0001 10da ffff ffff | N,Z | 3 |
| BIT-ORIENTED FILE REGISTER OPERATIONS | | | | | | |
| BCF | f,b,a | Bit Clear f | 1 | 1001 bbba ffff ffff | None | 3 |
| BSF | f,b,a | Bit Set f | 1 | 1000 bbba ffff ffff | None | 3 |
| BTFSC | f,b,a | Bit test f, skip if clear | 1 (2) | 1011 bbba ffff ffff | None | 3,5,7,8 |
| BTFSS | f,b,a | Bit test f, skip if set | 1 (2) | 1010 bbba ffff ffff | None | 3,5,7,8 |
| BTG | f,b,a | Bit Toggle f | 1 | 0111 bbba ffff ffff | None | 3 |
| LITERAL AND CONTROL OPERATIONS | | | | | | |
| ADDLW | k | ADD literal to W | 1 | 0000 1111 kkkk kkkk | C,DC,N,OV,Z | |
| ANDLW | k | AND literal with W | 1 | 0000 1011 kkkk kkkk | N,Z | |
| BC | n | Branch if Carry | 1 (2) | 1110 0010 nnnn nnnn | None | |
| BN | n | Branch if Negative | 1 (2) | 1110 0110 nnnn nnnn | None | |
| BNC | n | Branch if Not Carry | 1 (2) | 1110 0011 nnnn nnnn | None | |
| BNN | n | Branch if Not Negative | 1 (2) | 1110 0111 nnnn nnnn | None | |
| BNV | n | Branch if Not Overflow | 1 (2) | 1110 0101 nnnn nnnn | None | |
| BNZ | n | Branch if Not Zero | 1 (2) | 1110 0001 nnnn nnnn | None | |
| BRA | n | Unconditional branch | 2 | 1101 0nnn nnnn nnnn | None | |
| BV | n | Branch if Overflow | 1 (2) | 1110 0100 nnnn nnnn | None | |
| BZ | n | Branch if Zero | 1 (2) | 1110 0000 nnnn nnnn | None | |
| CALL | k,s | Subroutine Call (1st word) (2nd word) | 2 | 1110 110s kkkk kkkk 1111 kkkk kkkk kkkk | None | 9 |
| CLRWDT | - | Clear Watchdog Timer | 1 | 0000 0000 0000 0100 | $\overline{TO},\overline{PD}$ | |
| DAW | - | Decimal Adjust W Register | 1 | 0000 0000 0000 0111 | C | |
| GOTO | k | Unconditional Branch (1st word) (2nd word) | 2 | 1110 1111 kkkk kkkk 1111 kkkk kkkk kkkk | None | |
| HALT | - | Halt processor | 1 | 0000 0000 0000 0001 | None | |
| IORLW | k | Inclusive OR literal with W | 1 | 0000 1001 kkkk kkkk | N,Z | |

Legend: Refer to Table 3-6 for opcode field descriptions.
Note 1: 2's Complement method.
  2: Unsigned arithmetic.
  3: If a = '0', the Bank Select Register (BSR) will be overridden and Virtual bank is selected: If a = '1', the BSR is used.
  4: Multiple cycle instruction for EPROM programming when table pointer selects internal EPROM. The instruction is terminated by an interrupt event. Writing to external program memory is a two-cycle instruction.
  5: Two-cycle instruction when condition is true, else single cycle instruction.
  6: Two-cycle instruction except for MOVFF to PCL (program counter low byte) in which case it takes 3 cycles.
  7: A "skip" means that the instruction fetched during execution of the current instruction is not executed, instead an NOP is executed.
  8: When a "skip" instruction executes a skip and is followed by a 2-word instruction, 3 cycles will be executed.
  9: If s = '1', certain registers will be loaded from/into shadow registers. If s = '0' no update occurs.

Instruction Set Summary (Continued)

*Figure 58*

| Mnemonic, Operands | Description | Cycles | 16-bit Opcode MSb          LSb | Status Affected | Notes |
|---|---|---|---|---|---|
| LFSR   f,k | Move Literal to FSR (second word) | 2 | 1110 1110 00ff kkkk<br>1111 0000 kkkk kkkk | None | |
| MOVLB  k | Move literal to low nibble in BSR | 1 | 0000 0001 0000 kkkk | None | |
| MOVLW  k | Move literal to W | 1 | 0000 1110 kkkk kkkk | None | |
| MULLW  k | Multiply literal with W | 1 | 0000 1101 kkkk kkkk | None | |
| POP    --- | Pop Top of return stack (TOS) | 1 | 0000 0000 0000 0110 | None | |
| PUSH   --- | Push Top of return stack (TOS) | 1 | 0000 0000 0000 0101 | None | |
| RCALL  n | Unconditional subroutine branch | 2 | 1101 1nnn nnnn nnnn | None | |
| RESET  --- | Generate a Reset (same as MCLR reset) | 1 | 0000 0000 1111 1111 | All - Reset | |
| RETFIE s | Return from interrupt (and enable interrupts) | 2 | 0000 0000 0001 000s | GIEH,GIEL All if s=1 | 9 |
| RETLW  k | Return literal to W | 2 | 0000 1100 kkkk kkkk | None | |
| RETURN s | Return from Subroutine | 2 | 0000 0000 0001 001s | None if s=0 All if s=1 | 9 |
| SLEEP  --- | Enter SLEEP Mode | 1 | 0000 0000 0000 0011 | TO, PD | |
| SUBLW  k | Subtract W from literal | 1 | 0000 1000 kkkk kkkk | N,OV,C,DC,Z | |
| TBLRD* --- | Table Read (no change to TBLPTR) | 2 | 0000 0000 0000 1000 | None | |
| TBLRD*+ --- | Table Read (post-increment TBLPTR) | 2 | 0000 0000 0000 1001 | None | |
| TBLRD*- --- | Table Read (post-decrement TBLPTR) | 2 | 0000 0000 0000 1010 | None | |
| TBLRD+* --- | Table Read (pre-increment TBLPTR) | 2 | 0000 0000 0000 1011 | None | |
| TBLWT* --- | Table Write (no change to TBLPTR) | 2 | 0000 0000 0000 1100 | None | 4 |
| TBLWT*+ --- | Table Write (post-increment TBLPTR) | 2 | 0000 0000 0000 1101 | None | 4 |
| TBLWT*- --- | Table Write (post-decrement TBLPTR) | 2 | 0000 0000 0000 1110 | None | 4 |
| TBLWT+* --- | Table Write (pre-increment TBLPTR) | 2 | 0000 0000 0000 1111 | None | 4 |
| XORLW  k | Exclusive OR literal with W | 1 | 0000 1010 kkkk kkkk | N,Z | |

Legend: Refer to Table 3-6 for opcode field descriptions.
Note 1: 2's Complement method.
    2: Unsigned arithmetic.
    3: If a = '0', the Bank Select Register (BSR) will be overridden and Virtual bank is selected: If a = '1', the BSR is used.
    4: Multiple cycle instruction for EPROM programming when table pointer selects internal EPROM. The instruction is terminated by an interrupt event. Writing to external program memory is a two-cycle instruction.
    5: Two-cycle instruction when condition is true, else single cycle instruction.
    6: Two-cycle instruction except for MOVFF to PCL (program counter low byte) in which case it takes 3 cycles.
    7: A "skip" means that the instruction fetched during execution of the current instruction is not executed, instead an NOP is executed.
    8: When a "skip" instruction executes a skip and is followed by a 2-word instruction, 3 cycles will be executed.
    9: If s = '1', certain registers will be loaded from/into shadow registers. If s = '0' no update occurs.

Instruction Set Summary (Continued)

*Figure 59*

Opcode <11:8>

| Opcode <15:12> | 0 | 1 | 2 | 3 | 4 | 5 | 6 | 7 | 8 | 9 | A | B | C | D | E | F |
|---|---|---|---|---|---|---|---|---|---|---|---|---|---|---|---|---|
| 0 | *** | MOVLB | MULWF | | DECF | | | | SUBLW | IORLW | XORLW | ANDLW | RETLW | MULLW | MOVLW | ADDLW |
| 1 | IORWF | | | | ANDWF | | | | XORWF | | | | COMF | | | |
| 2 | ADDWFC | | | | ADDWF | | | | INCF | | | | DECFSZ | | | |
| 3 | RRCF | | | | RLCF | | | | SWAPF | | | | INCFSZ | | | |
| 4 | RRNCF | | | | RLNCF | | | | INFSNZ | | | | DCFSNZ | | | |
| 5 | MOVF | | | | SUBFWB | | | | SUBWFB | | | | SUBWF | | | |
| 6 | CPFSLT | CPFSEQ | CPFSGT | TSTFSZ | SETF | | CLRF | | NEGF | | MOVWF | | | | | |
| 7 | BTG | | | | | | | | | | | | | | | |
| 8 | BSF | | | | | | | | | | | | | | | |
| 9 | BCF | | | | | | | | | | | | | | | |
| A | BTFSS | | | | | | | | | | | | | | | |
| B | BTFSC | | | | | | | | | | | | | | | |
| C | MOVFF | | | | | | | | | | | | | | | |
| D | BRA | | | | | | | | RCALL | | | | | | | |
| E | BZ | BNZ | BC | BNC | BV | BNV | BN | BNN | open | | | | CALL | | LFSR | GOTO |
| F | NOP (2ND WORD) | | | | | | | | | | | | | | | |

***Special Instructions

```
0000       NOP
0001       HALT  (NOTE: Emulation mode only.)

0003       SLEEP
0004       CLRWDT
0005       PUSH
0006       POP
0007       DAW
0008       TBLRD *
0009       TBLRD *+
000A       TBLRD *-
000B       TBLRD +*
000C       TBLWT *
000D       TBLWT *+
000E       TBLWT *-
000F       TBLWT +*
0010, 0011 RETFIE
0012, 0013 RETURN
00E0       TRAP
00E1       TRET
00FF       RESET
```

*Figure 114*

MICROCONTROLLER INSTRUCTION SET

CROSS REFERENCE TO RELATED APPLICATION

This application is a continuation of U.S. Ser. No. 09/280,112 that was filed on Mar. 26, 1999 now U.S. Pat. No. 6,708,268 under the same title and to the same inventors as the present application. This application is related to the following applications: U.S. Pat. No. 6,055,211 for "FORCE PAGE ZERO PAGING SCHEME FOR MICROCONTROLLERS USING DATA ACCESS MEMORY" by Randy L. Yach, et al.; U.S. Pat. No. 5,905,880 for "ROBUST MULTIPLE WORK INSTRUCTION AND METHOD THEREFOR" by Rodney J. Drake, et al.; U.S. Pat. No. 6,192,463 for "PROCESSOR ARCHITECTURE SCHEME WHICH USES VIRTUAL ADDRESS REGISTERS TO IMPLEMENT DIFFERENT ADDRESSING MODES AND METHOD THEREFOR" by Sumit Mitra, et al.; U.S. Pat. No. 6,243,798 for "COMPUTER SYSTEM FOR ALLOWING A TWO WORD INSTRUCTION TO BE EXECUTED IN THE SAME NUMBER OF CYCLES AS A SINGLE WORD JUMP INSTRUCTION" by Rodney J. Drake, et al.; U.S. Pat. No. 6,029,241 entitled "PROCESSOR ARCHITECTURE SCHEME HAVING MULTIPLE BANK ADDRESS OVERRIDE SOURCES FOR SUPPLYING ADDRESS VALUES AND METHOD THEREFORE" by Igor Wojewoda, Sumit Mitra, and Rodney J. Drake; U.S. Pat. No. 6,098,160 for "DATA POINTER FOR OUTPUTTING INDIRECT ADDRESSING MODE ADDRESSES WITHIN A SINGLE CYCLE AND METHOD THEREFOR" by Rodney J. Drake, et al.; U.S. Pat. No. 5,958,039 for "MASTER-SLAVE LATCHES AND POST INCREMENT/DECREMENT OPERATION" by Allen, et al.; and U.S. Pat. No. 5,987,583 for "PROCESSOR ARCHITECTURE SCHEME AND INSTRUCTION SET FOR MAXIMIZING AVAILABLE OPCODES AND ADDRESSING SELECTION MODES" by Triece, et al. which are hereby incorporated herein by reference for all purposes.

BACKGROUND OF THE INVENTION

1. Field of the Invention

The present invention relates to microcontrollers and, more specifically, the present invention relates to opcode instructions that are gathered into an instruction set which are used to manipulate the behavior of the microcontroller.

2. Description of the Related Technology

Microcontroller units (MCU) have been used in the manufacturing and electrical industries for many years. FIG. 1 shows a typical core memory bus arrangement for mid-range MCU devices. In many cases, microcontrollers utilize reduced instruction set computing (RISC) microprocessors. The high performance of some of these devices can be attributed to a number of architectural features commonly found in RISC microprocessors. These features include:

Harvard architecture
Long Word Instructions
Single Word Instructions
Single Cycle Instructions
Instruction Pipelining
Reduced Instruction Set
Register File Architecture
Orthogonal (Symmetric) Instructions Harvard Architecture:

As shown in FIG. 2, the Harvard architecture has the program memory 26 and data memory 22 as separate memories and are accessed by the CPU 24 from separate buses. This improves bandwidth over traditional von Neumann architecture (shown in FIG. 3) in which program and data are fetched by the CPU 34 from the same memory 36 using the same bus. To execute an instruction, a von Neumann machine must make one or more (generally more) accesses across the 8-bit bus to fetch the instruction. Then data may need to be fetched, operated on, and possibly written. As can be seen from this description, that bus can become extremely congested.

In contrast to the von Neumann machine, under the Harvard architecture, all 14 bits of the instruction are fetched in a single instruction cycle. Thus, under the Harvard architecture, while the program memory is being accessed, the data memory is on an independent bus and can be read and written. These separated buses allow one instruction to execute while the next instruction is being fetched.

Long Word Instructions:

Long word instructions have a wider (more bits) instruction bus than the 8-bit Data Memory Bus. This is possible because the two buses are separate. This further allows instructions to be sized differently than the 8-bit wide data word which allows a more efficient use of the program memory, since the program memory width is optimized to the architectural requirements.

Single Word Instructions:

Single Word instruction opcodes are 14-bits wide making it possible to have all single word instructions. A 14-bit wide program memory access bus fetches a 14-bit instruction in a single cycle. With single word instructions, the number of words of program memory locations equals the number of instructions for the device. This means that all locations are valid instructions. Typically in the von Neumann architecture (shown in FIG. 3), most instructions are multi-byte. In general however, a device with 4-KBytes of program memory would allow approximately 2K of instructions. This 2:1 ratio is generalized and dependent on the application code. Since each instruction may take multiple bytes, there is no assurance that each location is a valid instruction.

Instruction Pipeline:

The instruction pipeline is a two-stage pipeline which overlaps the fetch and execution of instructions. The fetch of the instruction takes one machine cycle (TCY), while the execution takes another TCY. However, due to the overlap of the fetch of current instruction and execution of previous instruction, an instruction is fetched and another instruction is executed every single TCY.

Single Cycle Instructions:

With the Program Memory bus being 14-bits wide, the entire instruction is fetched in a single TCY. The instruction contains all the information required and is executed in a single cycle. There may be a one-cycle delay in execution if the result of the instruction modified the contents of the Program Counter. This requires that the pipeline be flushed and a new instruction fetched.

Reduced Instruction Set:

When an instruction set is well designed and highly orthogonal (symmetric), fewer instructions are required to perform all needed tasks. With fewer instructions, the whole set can be more rapidly learned.

Register File Architecture:

The register files/data memory can be directly or indirectly addressed. All special function registers, including the program counter, are mapped in the data memory.

Orthogonal (Symmetric) Instructions:

Orthogonal instructions make it possible to carry out any operation on any register using any addressing mode. This symmetrical nature and lack of "special instructions" make programming simple yet efficient. In addition, the learning curve is reduced significantly. The mid-range instruction set uses only two non-register oriented instructions, which are used for two of the cores features. One is the SLEEP instruction that places the device into the lowest power use mode. The other is the CLRWDT instruction which verifies the chip is operating properly by preventing the on-chip Watchdog Timer (WDT) from overflowing and resetting the device.

Clocking Scheme/Instruction Cycle:

The clock input (from OSC1) is internally divided by four to generate four non-overlapping quadrature clocks, namely Q1, Q2, Q3, and Q4. Internally, the program counter (PC) is incremented every Q1, and the instruction is fetched from the program memory and latched into the instruction register in Q4. The instruction is decoded and executed during the following Q1 through Q4. The clocks and instruction execution flow are illustrated in FIGS. 4 and 5.

Instruction Flow/Pipelining:

An "Instruction Cycle" consists of four Q cycles (Q1, Q2, Q3, and Q4) as shown in FIG. 4 that comprise the TCY as shown in FIGS. 4 and 5. Note that in FIG. 5, all instructions are performed in a single cycle, except for any program branches. Program branches take two cycles because the fetch instruction is "flushed" from the pipeline while the new instruction is being fetched and then executed.

Fetch takes one instruction cycle while decode and execute takes another instruction cycle. However, due to Pipelining, each instruction effectively executes in one cycle. If an instruction causes the program counter to change (e.g. GOTO) then an extra cycle is required to complete the instruction (FIG. 5). The instruction fetch begins with the program counter incrementing in Q1. In the execution cycle, the fetched instruction is latched into the "Instruction Register (IR)" in cycle Q1. This instruction is then decoded and executed during the Q2, Q3, and Q4 cycles. Data memory is read during Q2 (operand read) and written during Q4 (destination write). FIG. 5 shows the operation of the two-stage pipeline for the instruction sequence shown. At time TCY0, the first instruction is fetched from program memory. During TCY1, the first instruction executes while the second instruction is fetched. During TCY2, the second instruction executes while the third instruction is fetched. During TCY3, the fourth instruction is fetched while the third instruction (CALL SUB_1) is executed. When the third instruction completes execution, the CPU forces the address of instruction four onto the Stack and then changes the Program Counter (PC) to the address of SUB_1. This means that the instruction that was fetched during TCY3 needs to be "flushed" from the pipeline. During TCY4, instruction four is flushed (executed as a NOP) and the instruction at address SUB_1 is fetched. Finally during TCY5, instruction five is executed and the instruction at address SUB_1+1 is fetched.

While the prior art microcontrollers were useful, the various modules could not be emulated. Moreover, the type of microcontroller as described in FIG. 1 could not linearize the address space. Finally, the prior art microcontrollers are susceptible to compiler-error problems. What is needed is an apparatus, method, and system for a microcontroller that is capable of linearizing the address space in order to enable modular emulation. There is also a need in the art for reducing compiler errors.

SUMMARY OF THE INVENTION

The present invention overcomes the above-identified problems as well as other shortcomings and deficiencies of existing technologies by providing a microcontroller instruction set that eliminates many of the compiler errors experienced in the prior art. Moreover, an apparatus and system is provided that enables a linearized address space that makes modular emulation possible.

The present invention can directly or indirectly address its register files or data memory. All special function registers, including the Program Counter (PC) and Working Register (W), are mapped in the data memory. The present invention has an orthogonal (symmetrical) instruction set that makes it possible to carry out any operation on any register using any addressing mode. This symmetrical nature and lack of 'special optimal situations' make programming with the present invention simple yet efficient. In addition, the learning curve for writing software applications is reduced significantly. One of the present invention's enhancements over the prior art allows two file registers to be used in some two operand instructions. This allows data to be moved directly between two registers without going through the W register; and thus increasing performance and decreasing program memory usage.

The preferred embodiment of the present invention includes an ALU/W register, a PLA, an 8-bit multiplier, a program counter (PC) with stack, a table latch/table pointer, a ROM latch/IR latch, FSRs, interrupt vectoring circuitry, and most common status registers. Unlike the prior art, the design of the present invention obviates the need for a timer in a separate module, all reset generation circuitry (WDT, POR, BOR, etc.), interrupt flags, enable flags, INTCON registers, RCON registers, configuration bits, device ID word, ID locations, and clock drivers.

Additional embodiments will be clear to those skilled in the art upon reference to the detailed description and accompanying drawings.

BRIEF DESCRIPTION OF THE DRAWINGS

FIG. 9 is an instruction pipeline flow diagram of the present invention;

FIG. 10 is an instruction pipeline flow diagram of the present invention;

FIG. 11 is an instruction pipeline flow diagram of the present invention;

FIG. 12 is an instruction pipeline flow diagram of the present invention;

FIG. 13 is an instruction pipeline flow diagram of the present invention;

FIG. 14 is an instruction pipeline flow diagram of the present invention;

FIG. 15 is a block diagram of the status register of the present invention;

FIG. 18 is a block diagram of the stack pointer register of the present invention;

FIG. 19 is a block diagram of the top of stack upper register of the present invention;

FIG. 20 is a block diagram of the top of stack high register of the present invention;

FIG. 21 is a block diagram of the top of stack low register of the present invention;

FIG. 22 illustrates the stack reset operation of the present invention;

FIG. 23 illustrates the first CALL on an initialized stack of the present invention;

FIG. 24 illustrates the second consecutive CALL on a stack of the present invention;

FIG. 25 illustrates a $31^{st}$ and $32^{nd}$ consecutive CALL on a stack of the present invention;

FIG. 28 illustrates a PUSH instruction on a stack of the present invention;

FIG. 29 illustrates a POP instruction on a stack of the present invention;

FIG. 31 is a block diagram of the memory map of the present invention;

FIG. 32 is a block diagram of instructions in the memory of the present invention;

FIG. 33 is a block diagram that illustrates the device memory map of the present invention in different program modes;

FIG. 34 is a block diagram describing the MEMCON register of the present invention;

FIG. 35 is a block diagram describing the CONFIG7 configuration byte of the present invention;

FIG. 38 is a listing of the typical port functions of the present invention;

FIG. 41 is a listing of the external bus cycle types of the present invention;

FIG. 43 is a map of the special function register of the present invention;

FIG. 44 is a schematic of the core special function register of the present invention;

FIG. 45 is a continuation of the schematic of the core special function register of FIG. 44;

FIG. 47 is a schematic block diagram of the BSR operation of the present invention;

FIG. 48 is a schematic block diagram of the BSR operation of the present invention during emulation/test modes;

FIG. 54 is a descriptive listing opcode fields of the present invention;

FIG. 55 is a listing of indirect addressing symbols of the present invention;

FIG. 56 illustrates the general format for the instructions of the present invention;

FIG. 57 is a partial listing of the instruction set of the present invention;

FIG. 58 is a partial listing of the instruction set of the present invention;

FIG. 59 is a partial listing of the instruction set of the present invention;

FIG. 114 is an instruction decode map of the present invention.

DETAILED DESCRIPTION OF THE PREFERRED EMBODIMENTS

The present invention is an apparatus, method and system for providing, in several embodiments, a microcontroller instruction set and microcontroller architecture that includes a linearized address space that enables modular emulation.

The architecture of the apparatus of the preferred embodiment of the present invention modifies the prior art Harvard architecture in that the data path is 8-bit and the instruction length is 16-bit with a four-phase internal clocking scheme. Moreover, the preferred embodiment has a linearized memory addressing scheme that eliminates the need for paging and banking. The memory addressing scheme of the present invention allows for program memory addressability up to 2M bytes. Emulation of modules is also supported by the present invention.

The present invention overcomes the above-identified problems as well as other shortcomings and deficiencies of existing technologies by providing a microcontroller instruction set that eliminates many of the compiler errors experienced in the prior art. Moreover, an apparatus and system is provided that enables a linearized address space that makes modular emulation possible.

Figure 1:
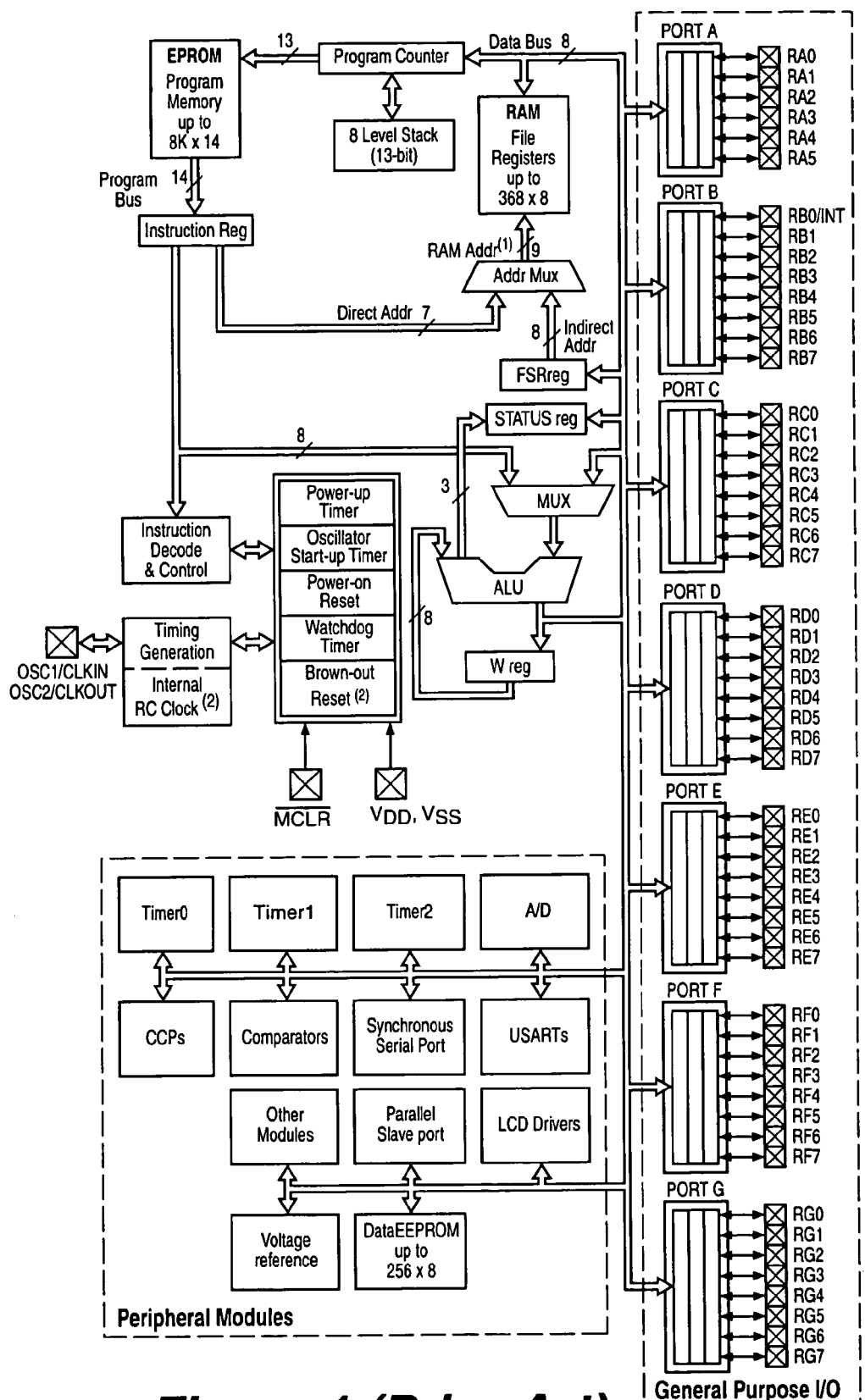
FIG. 1 is a schematic block diagram of a prior art, mid-range microcontroller unit.
Figure 2:
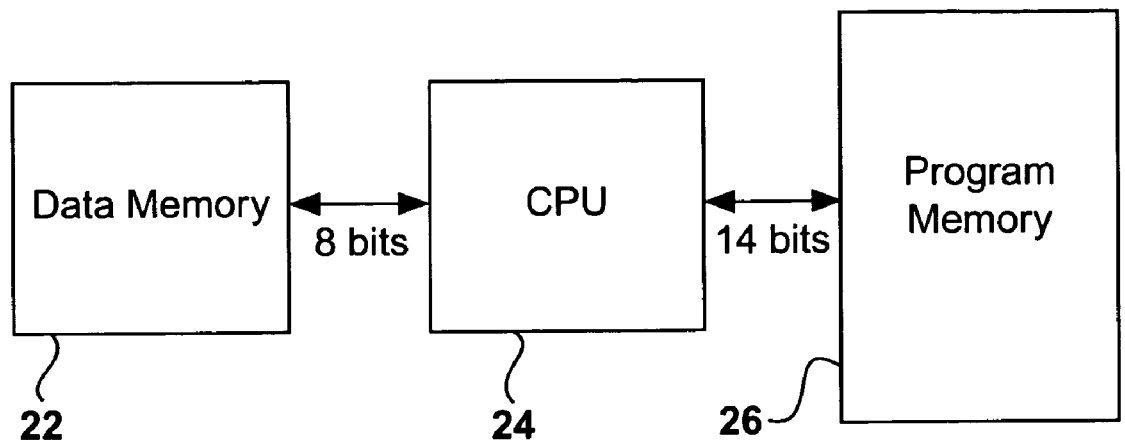
FIG. 2 is a schematic block diagram of the prior art Harvard architecture.
Figure 3:
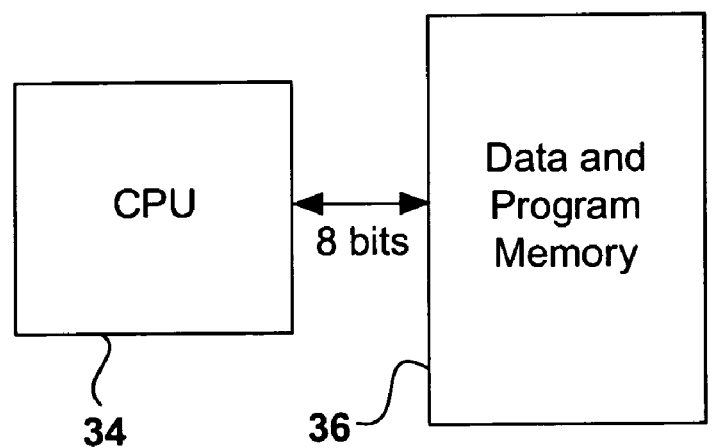
FIG. 3 is a schematic block diagram of the prior art von Neumann architecture.
Figure 4:
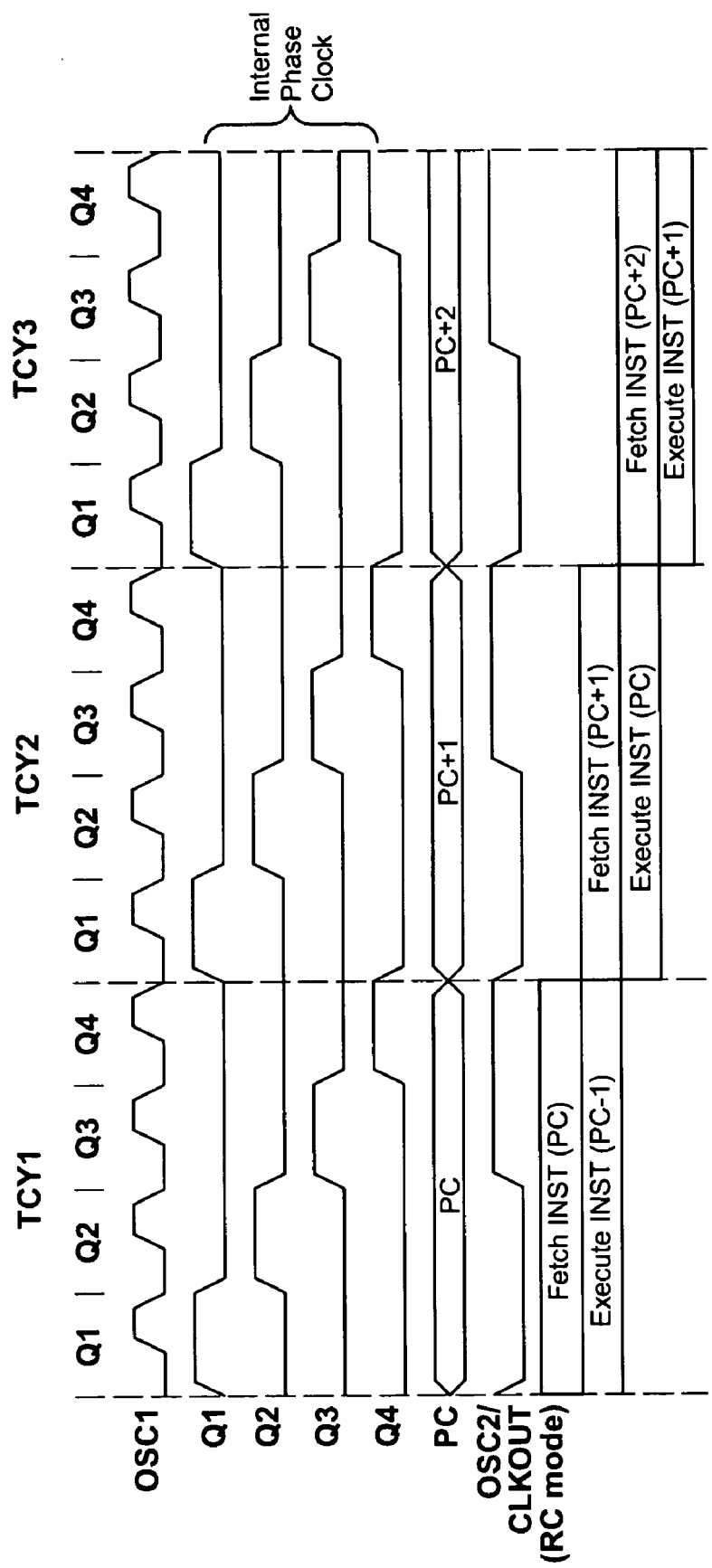
FIG. 4 is a timing diagram of a prior art clock/instruction cycle.
Figure 5:
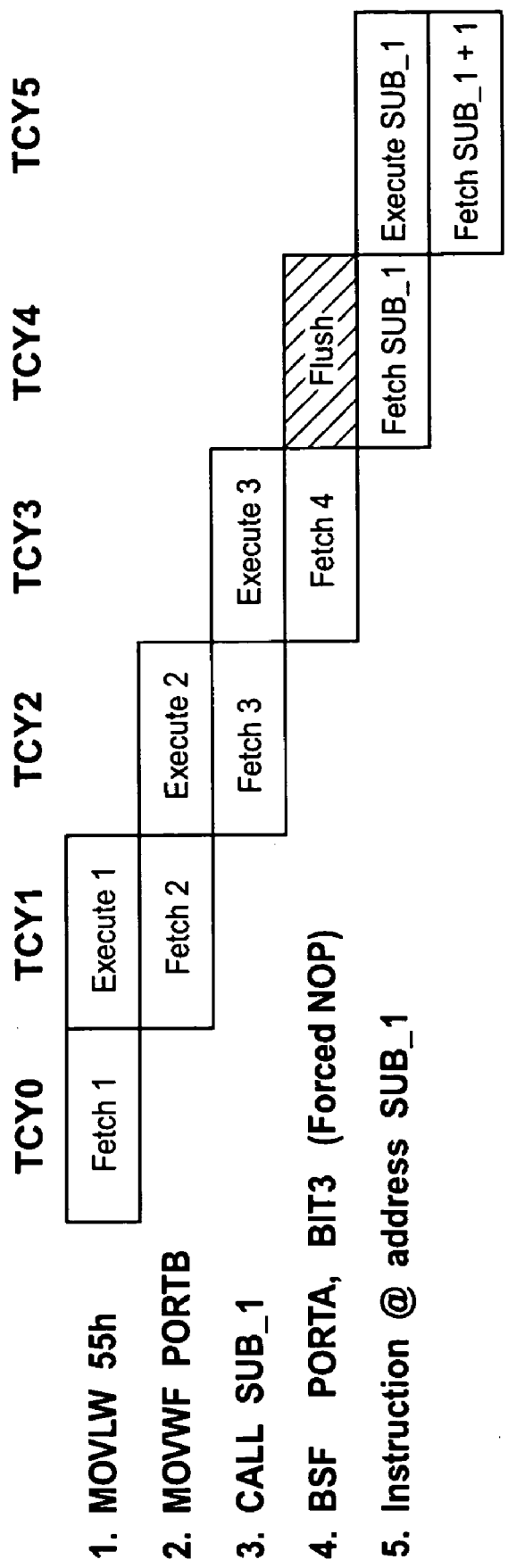
FIG. 5 is a schematic illustration of the execution of multiple instructions.
Figure 6:
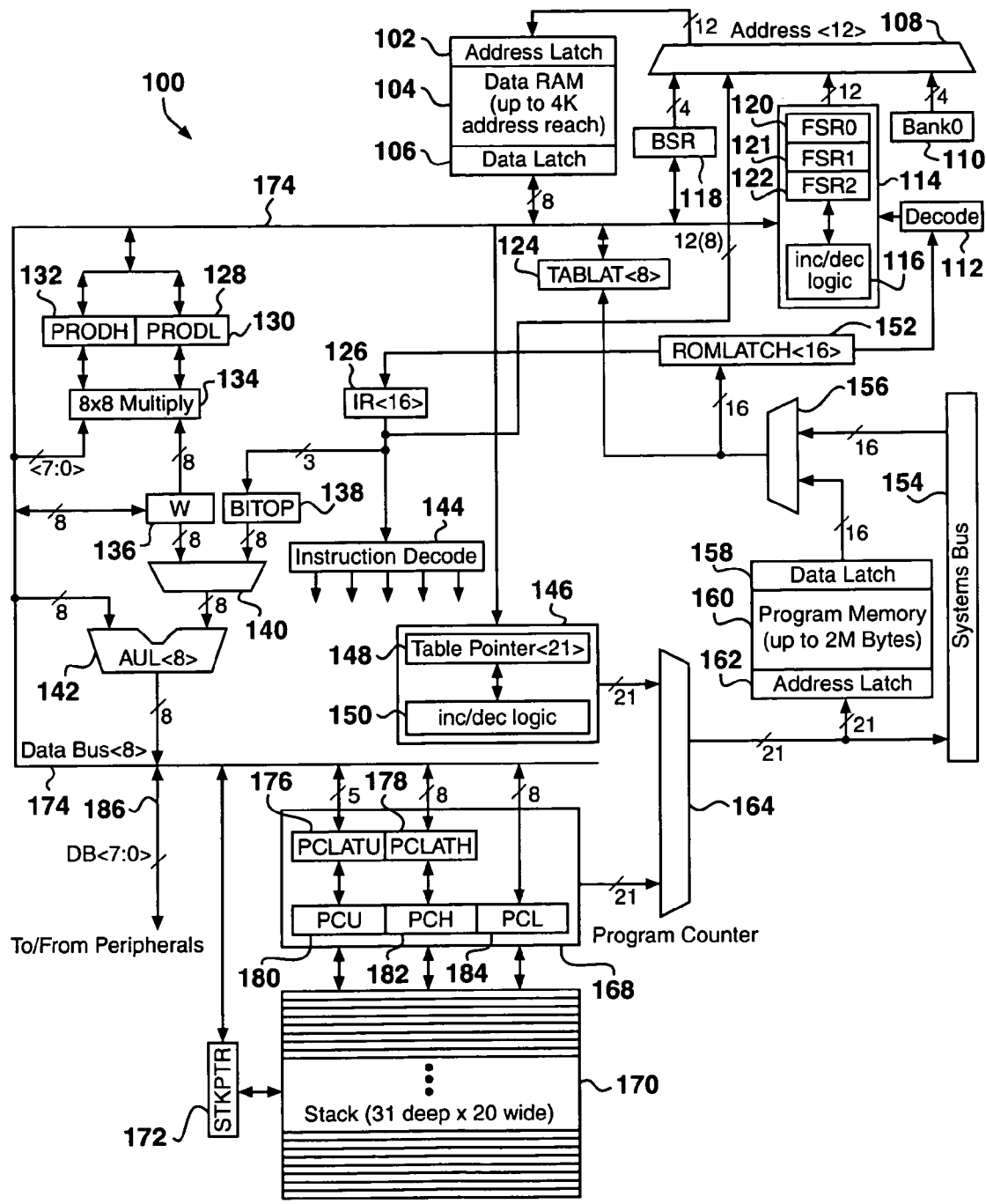
FIG. 6 is a schematic block diagram of the microcontroller core of the present invention.

The present invention can directly or indirectly address its register files or data memory. All special function registers, including the Program Counter (PC) and Working Register (W), are mapped in the data memory. The present invention has an orthogonal (symmetrical) instruction set that makes it possible to carry out any operation on any register using any addressing mode. This symmetrical nature and lack of 'special optimal situations' make programming with the present invention simple yet efficient. In addition, the learning curve is reduced significantly. One of the present invention family architectural enhancements from the prior art allows two file registers to be used in some two operand instructions. This allows data to be moved directly between two registers without going through the W register. Thus increasing performance and decreasing program memory usage. FIG. 6 shows a block diagram for the microcontroller core of the present invention.

The microcontroller core 100 of the present invention is illustrated in FIG. 6. By convention, connecting signal lines in FIG. 6 can contain a slash with an adjacent number indicating the bandwidth (in bits) of the signal line. Referring to the upper right corner of FIG. 6, we find a data memory 104 that is used for storing and transferring data to and from a central processing unit (described below). The data memory 104 is composed of a plurality of address locations. In the preferred embodiment of the present invention, the data memory 104 is a linearized 4K memory which is divided into a plurality of sixteen pages or banks. Typically, each bank has 256 address locations. In the preferred embodiment, one of the plurality of banks is a dedicated to general and specific purpose registers, in this case the topmost bank, bank 0.

The preferred embodiment of the present invention includes an ALU 140 with working (W) register 136, a PLA, an 8-bit multiplier, a program counter (PC) 168 with stack 170, a table latch 124, table pointer 148, a ROM latch 152 with IR latch 126, FSRs 120, 121, 122, interrupt vectoring circuitry, and most common status registers. Unlike the prior art, the design of the present invention obviates the need for a timer in a separate module, all reset generation circuitry (WDT, POR, BOR, etc.), interrupt flags, enable flags, INTCON registers, RCON registers, configuration bits, device ID word, ID locations, and clock drivers.

I/O List:

A generous list of input/output (I/O) commands are available with the present invention, the I/O list is shown in Table 1.

TABLE 1

I/O List

| Name | Count I/O | Normal Operation | Operation Test Module | Program Module | Emulation Module |
|---|---|---|---|---|---|
| addr<21:0> | 22/O | Program Memory address | | | |
| nqbank<3:0> | 4/O | Active low RAM bank selection | | | |
| d<15:0> | 16/I | Program memory data | | | |
| db<7:0> | 8/I/O | Data bus | | | |
| forcext | 1/I | | Force external instruction test mode | | |
| irp<7:0> | 8/O | Peripheral Address | | | |
| irp9 | 1/O | Instruction register bit 9 | | | |
| ncodeprt | 1/I | Active low code protect | | | |
| neprtim | 1/I | Active low end of EPROM write | | | |
| nhalt | 1/I | | | | Active low halt |
| nintake | 1/I | Active low interrupt acknowledge early and wake up from sleep | | | |
| np<7:0> | 8/O | Table latch data | | | |
| npcmux | 1/O | Active low PC mulitplex | | | |
| npchold | 1/O | Active low PC hold | | | |
| nprtchg | 1/I | Active low port change interrupt | | | |
| nq4clrwdt | 1/O | Active low clear wdt | | | |
| nq4sleep | 1/O | Active low sleep | | | |
| nqrd | 1/O | Active low read file | | | |
| nreset | 1/I | Active low reset | | | |
| nwrf | 1/O | Active low write file | | | |
| q1:q4 | 4/I | 4-phase Q clocks | | | |
| q13 | 1/I | Combination of Q clocks | | | |
| q23 | 1/I | Combination of Q clocks | | | |
| q41 | 1/I | Combination of Q clocks | | | |
| test0 | 1/I | | Test mode 0 | | |
| tsthvdet | 1/I | High voltage detect | | | |
| wreprom | 1/O | Write eprom | | | |
| writem | 1/O | Write memory | | | |
| wrtbl | 1/O | Table write instruction | | | |
| nintakd | 1/I | Interrupt acknowledge delayed | | | |
| intak | 1/I | Interrupt acknowledge | | | |

A selection circuit 108 is coupled to the data memory 104 through an address latch 102. The selection circuit 108 is used for selecting one of the plurality of sources that supply the bank address values in the data memory 104.

Clocking Scheme/Instruction Cycle

Figure 7:
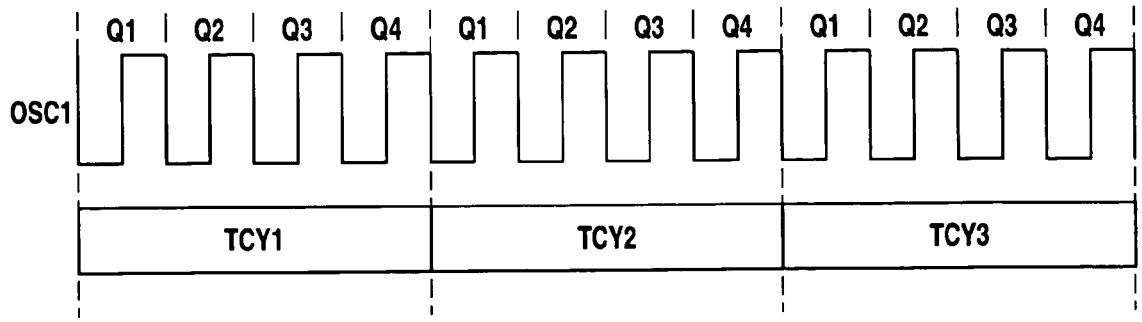
FIG. 7 is a timing diagram of the Q cycle activity of the present invention.
Figure 8:
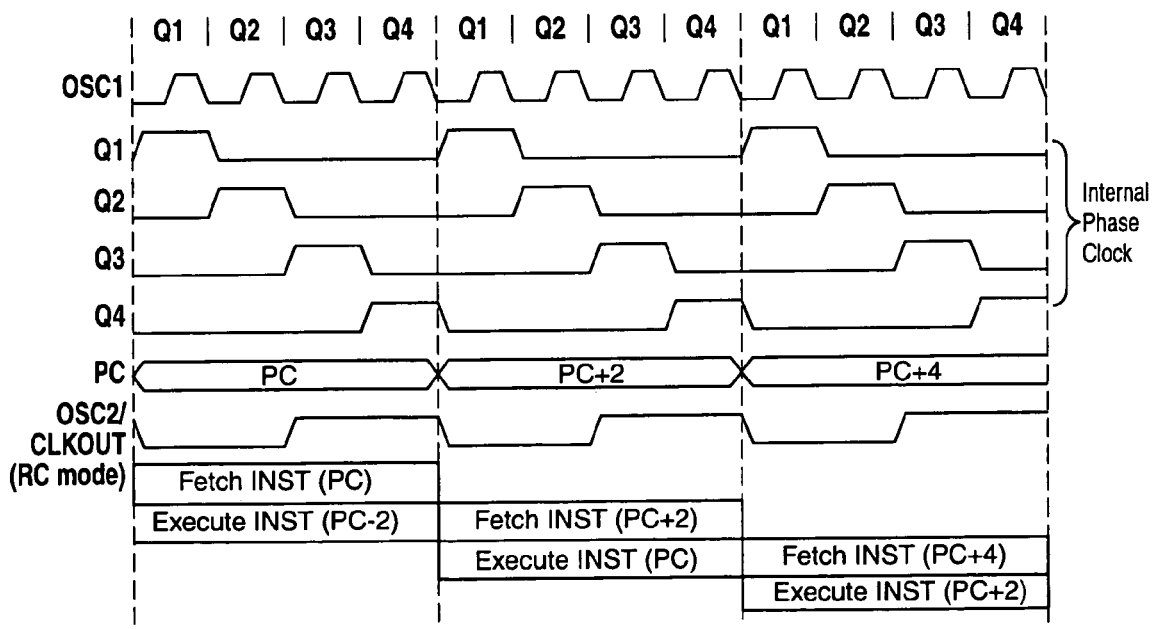
FIG. 8 is a timing diagram of the clock/instruction cycle of the present invention.

The clock input (from OSC1) is internally divided by four to generate four non-overlapping quadrature clocks, namely Q1, Q2, Q3, and Q4 as shown in FIG. 7. Internally, the program counter (PC) is incremented every Q1, and the instruction is fetched from the program memory and latched into the instruction register using Q4. The instruction is decoded and executed during the following Q1 through Q4. The PLA decoding is done during Q1. During the Q2 and Q3 cycle, the operand is read from memory or peripherals and the ALU performs the computation. During Q4 the results are written to the destination location. The clocks and instruction execution flow are shown in FIG. 8.

Q Cycle Activity

Each instruction cycle (TCY) is comprised of four Q cycles (Q1–Q4) as shown in FIG. 7. The Q cycle is the same as the device oscillator cycle (TOSC). The Q cycles provide the timing/designation for the Decode, Read, Process Data, Write etc., of each instruction cycle. The following diagram (FIG. 7) shows the relationship of the Q cycles to the instruction cycle. The four Q cycles that make up an execution instruction cycle (TCY) can be generalized as:

Q1: Instruction Decode Cycle or forced NOP
Q2: Instruction Read Cycle or NOP
Q3: Process the Data
Q4: Instruction Write Cycle or NOP Each instruction will show the detailed Q cycle operation for the instruction.

Instruction Flow/Pipelining

An "Instruction Cycle" consists of four Q cycles (Q1, Q2, Q3, and Q4). The instruction fetch and execute are pipelined such that fetch takes one instruction cycle while decode and execute takes another instruction cycle. However, due to the pipelining, each instruction effectively executes in one cycle. There are 4 types of instruction flows. First is a normal 1-word 1 cycle pipelined instruction. These instructions will take one effective cycle to execute as shown in FIG. 9. Second is a 1 word 2 cycle pipeline flush instruction. These instructions include the relative branches, relative call, skips and returns. When an instruction changes the PC, the pipelined fetch is discarded. This makes the instruction take two effective cycles to execute as shown in FIG. 10. Third are the table operation instructions. These instructions will suspend the fetching to insert and read or write cycle to the program memory. The instruction fetched while executing the table operation is saved for 1 cycle and executed in the cycle immediately after the table operation as shown in FIG. 11. Fourth are new two word instructions. These instructions include MOVFF and MOVLF. In these instructions, the fetch after the instruction contains the remainder of the addresses. For a MOVFF instruction during execution of the first word, the machine will execute a read of the source register. During execution of the second word, the source address is obtained, and then the instruction will complete the move as shown in FIG. 12. The MOVLF is similar although it moves 2 literal values into FSRnH and FSRnL in 2 cycles as shown in FIG. 13. Fifth, is the two word instructions for CALL and GOTO. In these instructions, the fetch after the instruction contains the remainder of the jump or call destination addresses. Normally, these instructions would require 3 cycles to execute, 2 for fetching the 2 instruction words and 1 for the subsequent pipeline flush. However, by providing a high-speed path on the second fetch, the PC can be updated with the complete value in the first cycle of instruction execution, resulting in a 2 cycle instruction as shown in FIG. 14. Sixth, is the interrupt recognition execution. Instruction cycles during interrupts are discussed in the interrupts section below.

The ALU

The present invention contains an 8-bit Arithmetic and Logic Unit (ALU) 142 and working register 136 as shown in FIG. 6. The ALU 142 is a general purpose arithmetic unit. It performs arithmetic and Boolean functions between data in the working register and any register file. The ALU 142 is 8-bits wide and capable of addition, subtraction, shift, and logical operations. Unless otherwise mentioned, arithmetic operations are two's complement in nature. The working (W) register 136 is an 8-bit working register used for ALU 140 operations. The W register 136 is addressable and can be directly written or read. The ALU 140 is capable of carrying out arithmetic or logical operations on two operands or a single operand. All single operand instructions operate either on the W register 136 or the given file register. For two operand instructions, one of the operands is the W register 136 and the other one is either a file register or an 8-bit immediate constant, or an equivalent storage medium.

Depending on the instruction executed, the ALU 140 may affect the values of the Carry (C), Digit Carry (DC), Zero (Z), Overflow (OV), and Negative (N) bits in the STATUS register (discussed below). The C and DC bits operate as a borrow and digit borrow out bit, respectively, in subtraction.

The preferred embodiment of the present invention includes an 8×8 hardware multiplier 134 included in the ALU 142 of the device as shown in FIG. 6. By making the multiply a hardware operation, the operation completes in a single instruction cycle. This hardware operation is an unsigned multiply that gives a 16-bit result. The result is stored into the 16-bit product register (PRODH:PRODL). The multiplier does not affect any flags in the STATUS register.

Status Registers

The STATUS register contains the status bits of the ALU 140. The status register is shown in FIG. 15. In the preferred embodiment of the present invention, bit 7–5 are unimplemented and are read as '0'.

bit 4 is "N", the Negative bit. This bit is used for signed arithmetic (2's complement). It indicates whether the result was negative, (ALU MSb=1), 1=Result was negative, 0=Result was positive.

bit 3 is the "OV" Overflow bit. This bit is used for signed arithmetic (2's complement). It indicates an overflow of the 7-bit magnitude, which causes the sign bit (bit 7) to change state. For this bit, 1=Overflow occurred for signed arithmetic, (in this arithmetic operation), and 0=No overflow occurred.

bit 2 is the "Z" Zero bit. For this bit, 1=The result of an arithmetic or logic operation is zero, and 0=The results of an arithmetic or logic operation is non-zero.

bit 1 is the "DC" Digit carry/borrow bit. For this bit, 1=A carry-out from the 4th low order bit of the result occurred, and 0=No carry-out from the 4th low order bit of the result It should be noted that, for borrow, the polarity is reversed.

bit 0 is the "C" carry/borrow bit. For this bit, 1=A carry-out from the most significant bit of the result occurred, and 0=No carry-out from the most significant bit of the result. As with bit 1, for borrow the polarity is reversed.

The C and DC bits operate as a borrow and digit borrow bit, respectively, in subtraction. Carry is ALU bit 7 carry out. Digit Carry is ALU bit 3 carry out. Zero is true if ALU result bit <7:0> is '0'. N is ALU result bit 7. The overflow bit will be set if the 2's complement result exceeds +127 or is less than −128. Overflow is ALU bit 6 carry out XOR ALU bit 7 carry out. As with all the other registers, the STATUS register can be the destination for any instruction. If the STATUS register is the write destination for an instruction that affects any of the status bits, then the write to the status bits is disabled. The bits are set or cleared according to the ALU results and the instruction specification. Therefore, the result of an instruction with the STATUS register as destination may be different than intended.

For example, the CLRF REG instruction normally writes the register to 0 and sets the Z bit. The CLRF STATUS instruction will disable the write to the N, OV, DC and C bits and set the Z bit. This leaves the STATUS register as 000u u1uu. It is recommended, therefore, that only the BCF, BSF, SWAPF and MOVWF instructions be used to alter the STATUS register because these instructions do not affect any status bit. To see how other instructions affect the status bits, see the "Instruction Set Summary."

Program Counter Module

The program counter (PC) 168 (see FIG. 6) is modified to allow expansion up to a maximum of 21 bits. This is done by adding a 5-bit wide PCLATU register that operates similarly to the PCLATH register. The PC 168 is also modified to address bytes rather than words in the program memory. To implement this, there is a byte addressing bit at the LSb of the PC 168 that is always 0. The LSb bit of the PCL is readable but not writeable. Should the user attempt to write a '1' into the LSb, the result will be a '0'. To allow hidden test EPROM, there is a hidden 22nd bit (bit 21) of PC 168 (see FIG. 16). This PC bit is normally 0. When entering test mode or programming mode, this bit is set and the instructions will be fetched from the test area. Once this bit is set, it cannot be cleared by program execution, the device must be reset.

Figure 16:
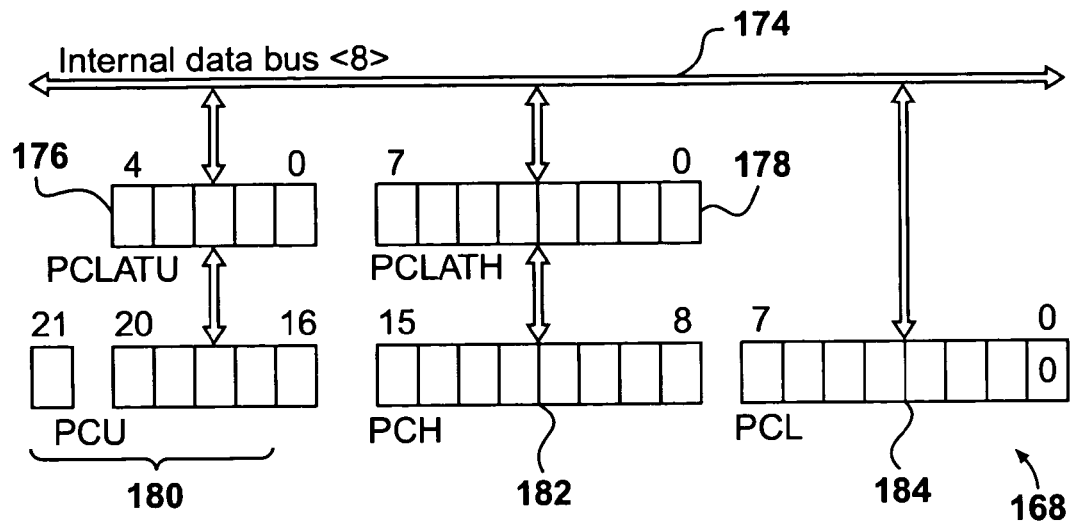
FIG. 16 is a block diagram of the program counter of the present invention.

The Program Counter (PC) 168 is up to a 21-bit register as shown in FIG. 16. PCL 184, the low byte of the PC 168, is mapped in the data memory 104 (see FIG. 6). PCL 184 is readable and writeable just as is any other register. PCH 182 and PCU 180 are the high bytes of the PC and are not directly addressable. Since PCH 182 and PCU 184 are not mapped in data or program memory 160, registers PCLATH 178 (PC high latch) and PCLATU 176 (PC upper latch) are used as holding latches for the high bytes of the PC 168.

PCLATH 178 and PCLATU 176 are mapped into data memory 104. The user can read and write PCH 182 through PCLATH 178 and PCU 180 through PCLATU 176. The PC 168 is word incremented by 2 after each instruction fetch during Q1 unless:

Modified by a GOTO, CALL, RETURN, RETLW, RETFIE, or Branch instruction.

Modified by an interrupt response.

Due to destination write to PCL 168 by an instruction.

Figure 17:
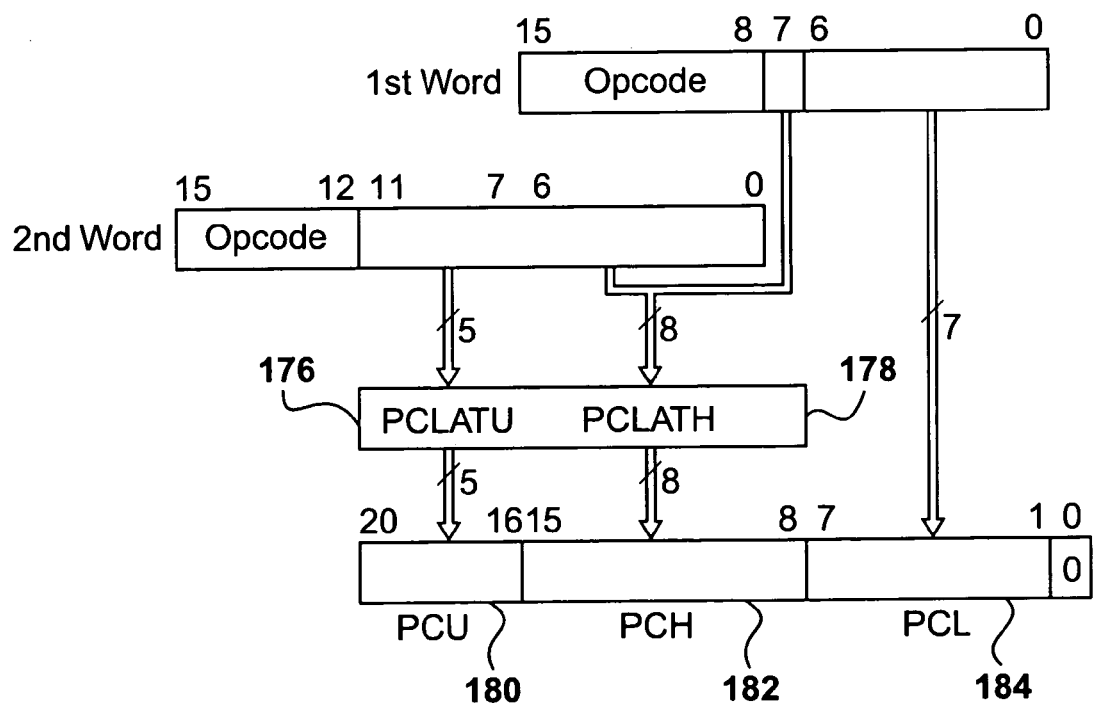
FIG. 17 is a block diagram of the program counter of the present invention using the CALL and GOTO instructions.
Figure 26:
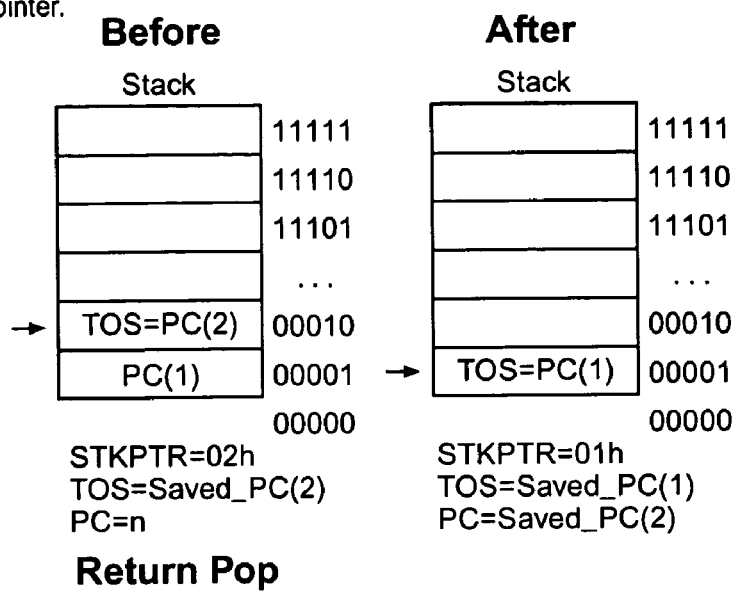
FIG. 26 illustrates a return POP operation on a stack of the present invention.
Figure 27:
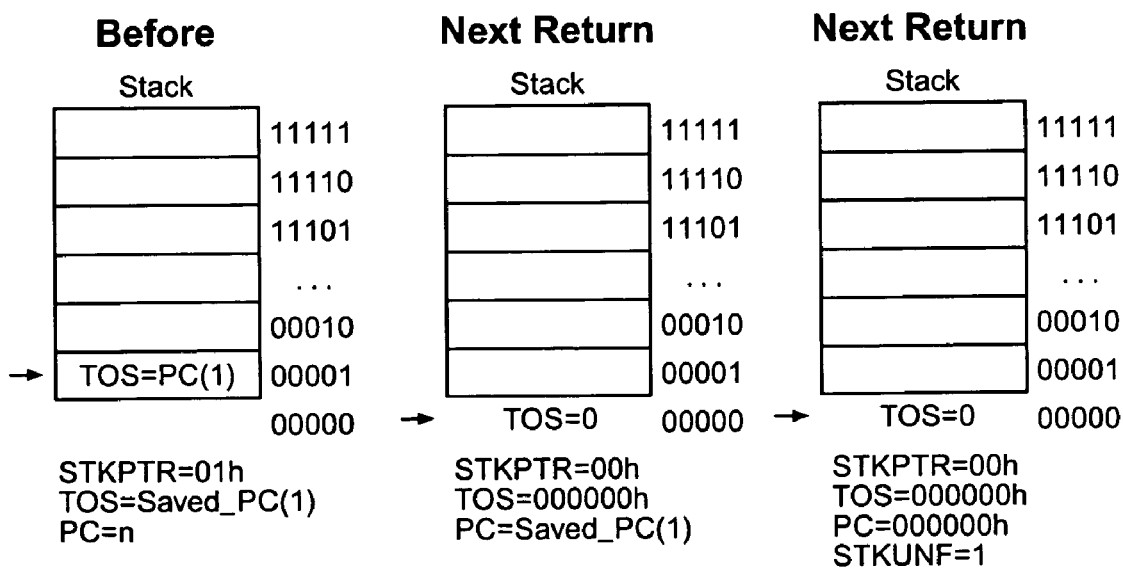
FIG. 27 illustrates a stack return pop causing a stack underflow condition within the present invention.

"Skips" are equivalent to a forced NOP cycle at the skipped address. FIGS. 16 and 17 show the operation of the program counter for various situations.

Referring to FIG. 16, the operations of the PC 168, PCLATH 178, and PCLATU 176 for different instructions are as follows:

a. Read Instructions on PCL:

For any instruction that reads PCL 184. All byte instructions with d=0; MOVFF PCL, X; CPFSEQ; CPFSGT; CPFSLT; MULWF; TSTFSZ then PCL to data bus then to ALU or to the destination. Finally, PCH to PCLATH and PCU to PCLATU.

b. Write Instructions on PCL:

Any instruction that writes to PCL 184. For example, MOVWF; CLRF; SETF, then write 8-bit data to the data bus 174 and then to PCL 184. Also, PCLATH to PCH, and PCLATU to PCU.

c. Read-Modify-Write Instructions on PCL:

Any instruction that does a read-write-modify operation on PCL. All byte instructions with d=1; Bit Instructions; NEGF. Read: PCL to data bus to ALU. Write: write the 8-bit result to data bus and to PCL; then PCLATH to PCH; and finally PCLATU to PCU.

The read-modify-write only affects the PCL 184 with the result. PCH 182 and PCU 180 are loaded with the value in the PCLATH 178 and PCLATU 176 respectively. For example, for the instruction "ADDWF", PCL 184 will result in the following jump. If PC=0003F0h, W=30h, PCLATH=05h and PCLATU=1h before the instruction, PC=010520h after the instruction. To accomplish a true 20-bit computed jump, the user needs to compute the 20-bit destination address, write to PCLATH 178 and PCLATU 176, and then write the low value to PCL 168.

d. RETURN Instruction:

Stack<MRU> to PC<20:0> Using FIG. 17, the operation of the PC 168, PCLATH 178, and PCLATU 176 for the GOTO and the CALL instructions is as follows:

e. CALL, GOTO Instructions:

A destination address is provided in the 2-word instruction (opcode). The first Word Opcode<6:0> to PCL<7:1>. The first Word Opcode<7> to PCLATH<0> and to PCH<0>. The second Word Opcode<6:0> to PCLATH<7:1> and PCH <7:1>. The second Word Opcode<11:7> to PCLATU<4:0> and PCU <4:0>.

It should be noted that the following PC 168 related operations do not change PCLATH 178 and PCLATU 176:

a. RETLW, RETURN, and RETFIE instructions.

b. Interrupt vector is forced onto the PC.

c. Read-modify-write instructions on PCL (e.g. BSF PCL, 2).

Return Stack Operation

The present invention has a 31 level deep return (or hardware) stack. The depth of the stack was increased over the prior art in order to allow more complex programs. The stack is not part of either the program or data memory space.

The PC 168 is pushed onto the stack when a CALL or RCALL instruction is executed or an interrupt is acknowledged. The PC 168 value is pulled off the stack on a RETURN, RETLW, or a RETFIE instruction. PCLATU 176 and PCLATH 178 are not affected by any of the return instructions.

The stack operates as a 31 word by 21 bit RAM and a 5-bit stack pointer, with the stack pointer initialized to 00000b after all resets. There is no RAM word associated with stack pointer 000h. This is only a reset value. During a CALL type instruction causing a push onto the stack, the stack pointer is first incremented and the RAM location pointed to by the stack pointer is written with the contents of the PC. During a RETURN type instruction causing a pop from the stack, the contents of the RAM location pointed to by the STKPTR is transferred to the PC and then the stack pointer is decremented.

Top Of Stack Access

The top of the stack is readable and writeable. Three register locations, TOSU, TOSH and TOSL address the stack RAM location pointed to by the STKPTR. This allows users to implement a software stack if necessary. After a CALL or RCALL instruction or an interrupt, the software can read the pushed value by reading the TOSU, TOSH and TOSL registers. These values can be placed on a user defined software stack. At return time, the software can replace the TOSU, TOSH and TOSL and do a return. It should be noted that the user must disable the global interrupt enable bits during this time to prevent inadvertent stack operations.

PUSH and POP Instructions

Since the Top-of-stack (TOS) is readable and writeable, the ability to push values onto the stack and pull values off the stack without disturbing normal program execution is a desirable option. To push the current PC value onto the stack, a PUSH instruction can be executed. This will push the current PC value onto the stack; setting the TOS=PC and PC=PC+2. The ability to pull the TOS value off of the stack and replace it with the value that was previously pushed onto the stack, without disturbing normal execution, is achieved by using the POP instruction. The POP instruction pulls the TOS value off the stack, but this value is not written to the PC; the previous value pushed onto the stack then becomes the TOS value.

Return Stack Pointer (STKPTR)

The STKPTR register contains the return stack pointer value and the overflow and underflow bits. The stack overflow bit (STKOVF) and underflow bit (STKUNF) allow software verification of a stack condition. The STKOVF and STKUNF bits are cleared after a POR reset only.

After the PC is pushed onto the stack 31 times (without popping any values off the stack), the 32nd push over-writes the value from the 31st push and sets the STK-OVF bit while the STKPTR remains at 11111b. The $33^{rd}$ push overwrites the 32nd push (and so on) while STKPTR remains 11111b.

After the stack is popped enough times to unload the stack, the next pop will return a value of zero to the PC and sets the STKUNF bit while the STKPTR remains at 00000b. The next pop returns zero again (and so on) while STKPTR remains 00000b. Note that returning a zero to the PC on an underflow has the effect of vectoring the program to the reset vector where the stack conditions can be verified and appropriate actions can be taken.

The stack pointer can be accessed through the STKPTR register. The user may read and write the stack pointer values. This can be used by RTOS for return stack maintenance. FIG. 18 shows the STKPTR register. The value of the stack pointer will be 0 through 31. At reset the stack pointer value will be 0. The stack pointer when pushing will increment and when popping will decrement.

Stack Overflow/Underflow Resets

At the user's option, the overflow and underflow can cause a device reset to interrupt the program code. The reset is enabled with a configuration bit, STVRE. When the STVRE bit is disabled, an overflow or underflow will set the appropriate STKOVF or STKUNF bit and not cause a reset. When the STVRE bit is enabled, a over-flow or underflow will set the appropriate STKOVF or STKUNF bit and then cause a device reset very similar in nature to the WDT reset. In either case, the STKOVF or STKUNF bits are not cleared unless the user software clears them or a POR reset clears them. FIGS. 18–21 illustrate stack registers. FIGS. 22–29 illustrate stack operations.

Program Memory

The preferred embodiment of the present invention has up to a 2 Megabyte (2M)×8 user program memory space. The program memory space is primarily to contain instructions for execution, however, data tables may be stored and accessed using the table read and write instructions. Another 2M×8 test program memory space is available for test ROM, configuration bits, and identification words.

The devices have up to a 21-bit program counter capable of addressing the 2M×8 program memory space. There is also a 22nd PC bit that is hidden during normal operation, and when it is set, it is possible to access configuration bits, device ID and test ROM. This bit can be set in test mode or programming mode, and the device must be reset to clear this bit. User program memory space cannot be accessed with this bit set. Because the PC must access the instructions in program memory on an even byte boundary, the LSb of the PC is an implied '0' and the PC increments by two for each instruction.

Figure 30:
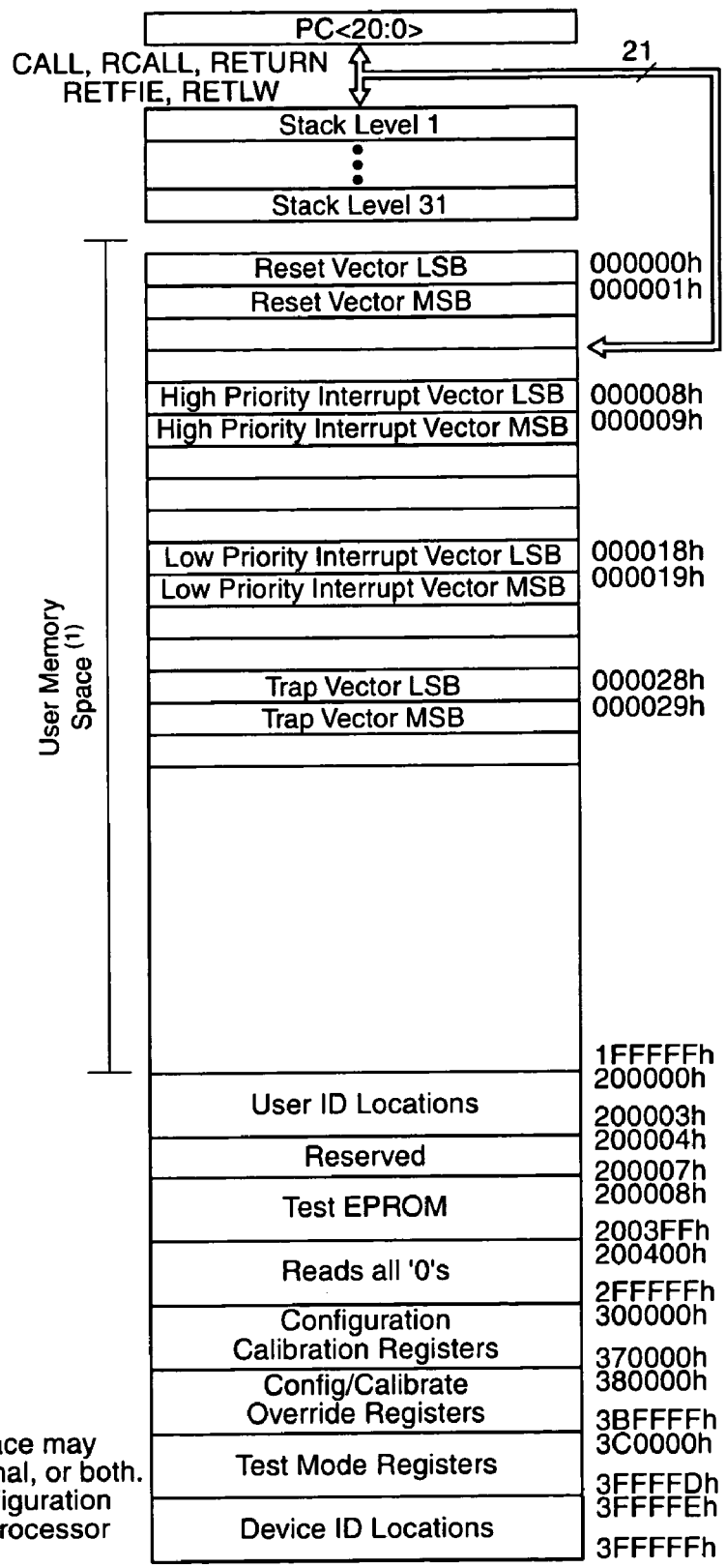
FIG. 30 is a block diagram of a program memory map and stack of the present invention.

The reset vector is at 000000h and the high priority interrupt vector is at 000008h and the low priority interrupt vector is at 000018h (see FIG. 30).

Program Memory Organization

Each location in the program memory has a byte address. In addition, each 2 adjacent bytes have a word address. FIG. 31 shows the map of the program memory with byte and word addresses shown. Within the program memory, the instructions must be word aligned. FIG. 32 shows the map of the program memory with several example instructions and the hex codes for those instructions placed into the map. Table operations will work with byte entities. A table block is not required to be word aligned, so a table block can start and end at any byte address. The exception to this is if a table write is being used to program the internal program memory or an external word wide flash memory. When programming, the write data may need to be aligned to the word width used by the programming method.

Program Memory Modes

The present invention can operate in one of five possible program memory configurations. The configuration is selected by configuration bits. The possible modes are:

MP—Microprocessor

EMC—Extended Microcontroller

PEMC—Protected Extended Microcontroller

MC—Microcontroller

PMC—Protected Microcontroller

The microcontroller and protected microcontroller modes only allow internal execution. Any access beyond the program memory reads all zeros. The protected microcontroller mode also enables the code protection feature. Microcontroller is the default mode of an un-programmed device.

The extended microcontroller mode accesses both the internal program memory as well as external program memory. Execution automatically switches between internal and external memory. The 21-bits of address allow a program memory range of 2M-bytes. The protected extended microcontroller mode will code protect the internal program memory by preventing table reads/writes to the internal memory while still allowing execution and table reads/writes of the external program memory.

The microprocessor mode only accesses the external program memory. The on-chip program memory is ignored. The 21-bits of address allow a program memory range of 2M-bytes.

Test memory and configuration bits are readable during normal operation of the device by using the TBLRD instruction. These areas are only modifiable using the TBLWT instruction if the LWRT bit in the RCON register is set or the device is in test and programming mode.

These areas can only be executed from in test and programming mode.

The extended microcontroller mode and microprocessor modes are available only on devices which have the external memory bus defined as part of the I/O pins. Table 2 lists which modes can access internal and external memory. FIG. 33 illustrates the device memory map in the different program modes.

TABLE 2

Device Mode Memory Access

| Operating Mode | Internal Program Memory | External Program Memory |
|---|---|---|
| Microprocessor | No Access | Execution/TBLRD/TBLWT |
| Extended Microcontroller | Execution/TBLRD/TBLWT | Execution/TBLRD/TBLWT |
| Protected Extended Microcontroller | Execution | Execution/TBLRD/TBLWT |
| Microcontroller | Execution/TBLRD/TBLWT | No Access |
| Protected Microcontroller | Execution/TBLRD | No Access |

External Program Memory Interface

When either microprocessor or extended microcontroller mode is selected, up to four ports are configured as the system bus. Two ports and part of a third are the multiplexed address/data bus and part of one other port is used for the control signals. External components are needed to demultiplex the address and data. The external memory interface can run in 8-bit data mode or 16-bit data mode. Addresses on the external memory interface are byte addresses always.

Figure 36:
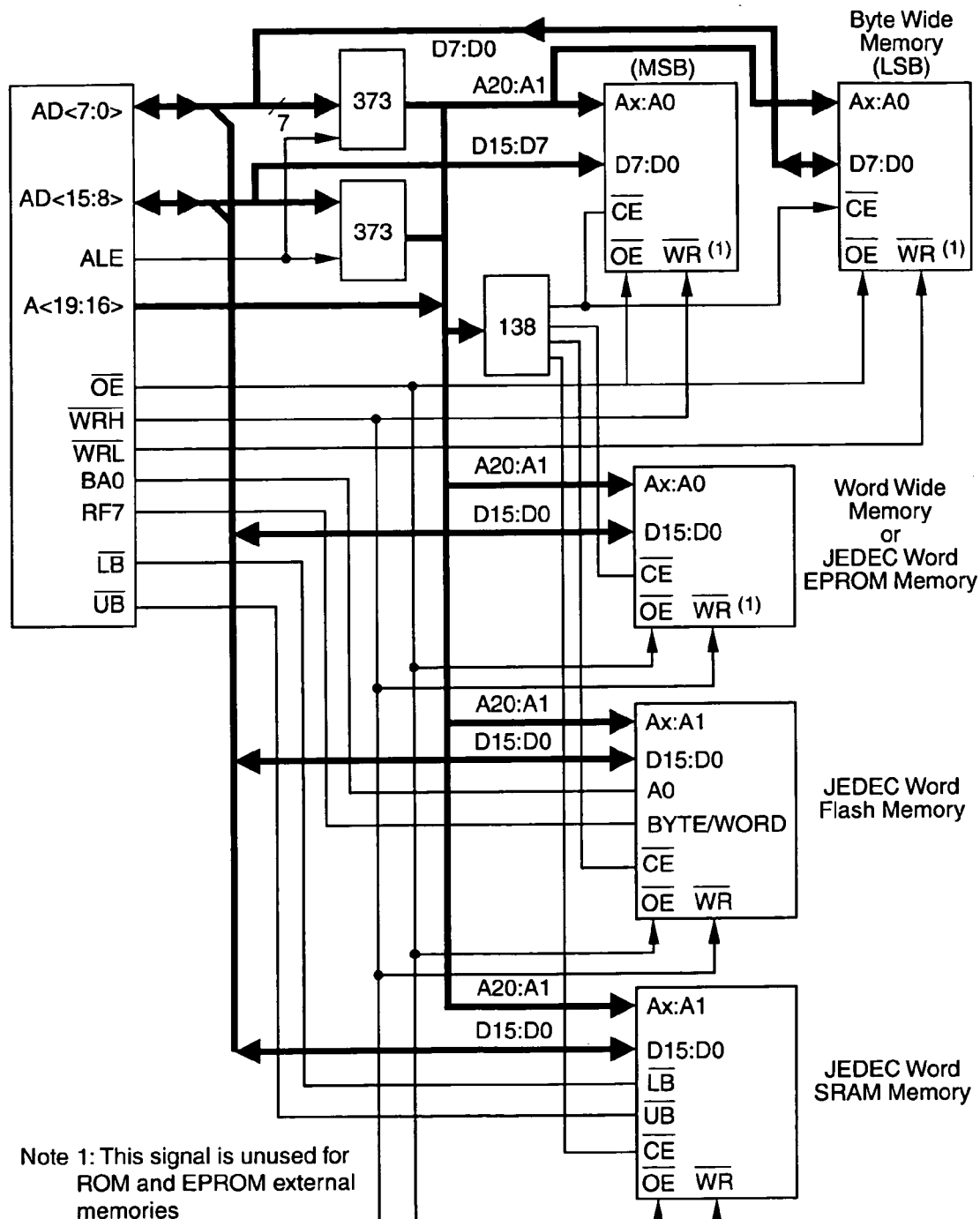
FIG. 36 is a schematic block diagram of the 16-bit external memory connection configuration of the present invention.
Figure 37:
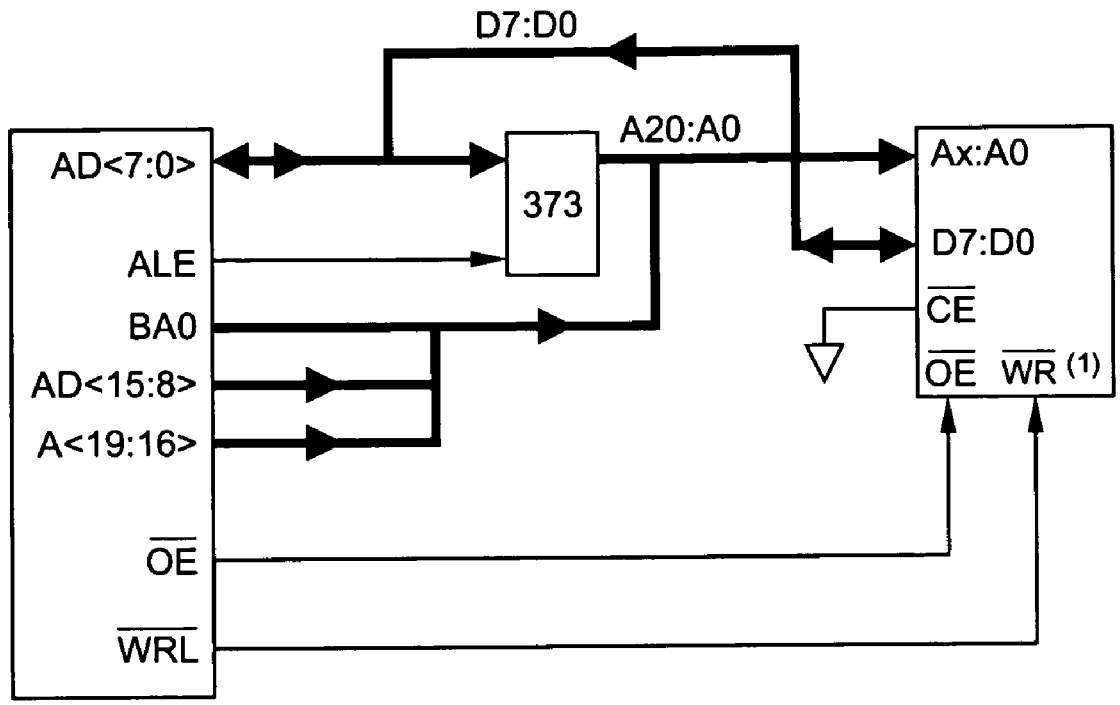
FIG. 37 is a block diagram of the 8-bit external memory connection configuration of the present invention.

FIGS. 36 and 37 describe the external memory connections for 16-bit and 8-bit data respectively. The external program memory bus shares I/O port functions on the pins. FIG. 38 lists a typical mapping of external bus functions on I/O pin functions. In extended microcontroller mode, when the device is executing out of internal memory, the control signals will NOT be active. They will go to a state where the AD<15:0>, A<19:0>are tri-state; the OE, WRH, WRL, UB and LB signals are '1'; UBA0 and ALE is '0'.

16-Bit External Interface

If the external interface is 16-bit, the instructions will be fetched as 16-bit words. The OE output enable signal will enable both bytes of program memory at once to output a 16-bit word. The least significant bit of the address, BA0, need not be connected to the memory devices.

An external table read is logically performed one byte at a time, although the memory will read a 16-bit word externally. The least significant bit of the address will internally select between high and low bytes (LSb=0 to lower byte, LSb=1 to upper byte). The external address in microprocessor and extended microcontroller modes is 21-bits wide; this allows addressing of up to 2M-bytes.

An external table write on a 16-bit bus is logically performed one byte at a time. The actual write will depend on the type of external device connected and the WM<1:0> bits in the MEMCON register, shown in FIG. 34. The Table Operations section details the actual write cycles.

8-Bit External Interface

If the external interface is 8-bit, the instructions will be fetched as 2 8-bit bytes. The two bytes are fetched within one instruction cycle. The least significant bit of the address must be connected to the memory devices. The OE output enable signal and BA0=1 will enable the most significant byte of the instruction to read from program memory for the Q3 portion of the cycle, then BA0 will change to 0 and the least significant byte will be read for the Q4 portion of the cycle; to form the 16-bit instruction word.

An external table read is also performed one byte at a time. An external table write is performed one byte at a time. The WRL is active on every external write.

When 8-bit interface is selected, the WRH, UB and UL lines are not used and the pins revert to I/O port functions. A configuration bit selects the 8-bit mode of the external interface.

External Wait Cycles

The external memory interface supports wait cycles. The external memory wait cycles only apply to the table read and table write operations over the external bus. Since the device execution is tied to instruction fetches, there is no sense to execute faster than the fetch rate. So if the program fetches need to be slowed, the processor speed must be slowed with a different Tcy time.

The $WAIT_{13}<1:0>$ bits in the MEMCON register will select 0,1,2 or 3 extra TCY cycles per memory fetch cycle. The wait cycles will be effective for table reads and writes on a 16-bit interface. On an 8-bit interface, for table reads and writes, the wait will only occur on the Q4.

Figure 39:
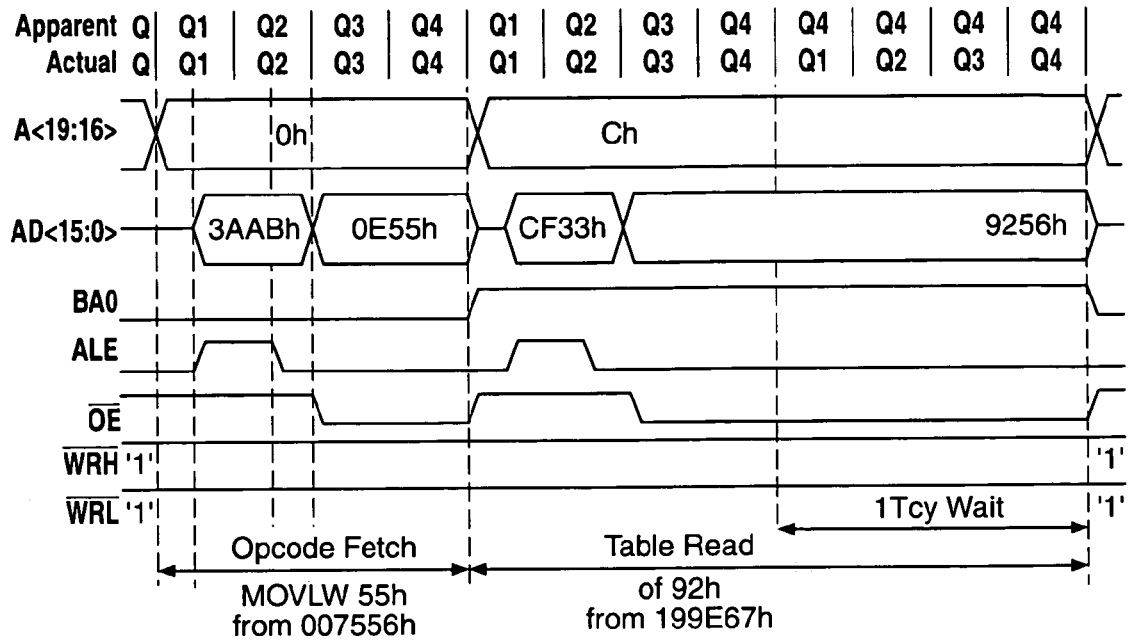
FIG. 39 is a timing diagram of the external program memory bus in 16-bit mode of the present invention.
Figure 40:
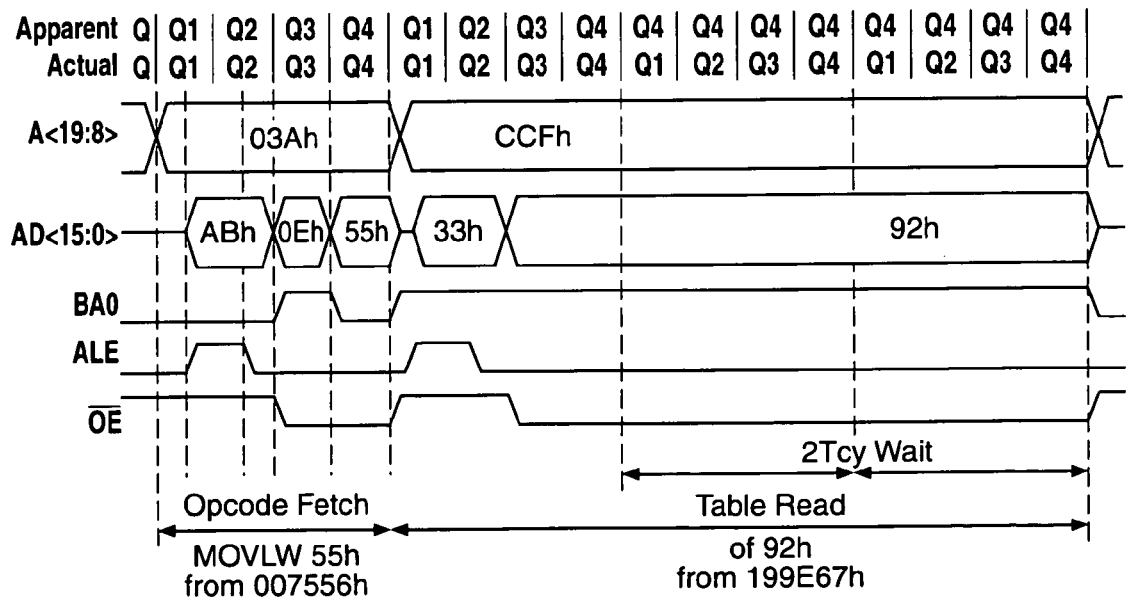
FIG. 40 is a timing diagram of the external program memory bus in 8-bit mode of the present invention.

The default setting of the wait on power up is to assert a wait of the maximum of the 3 TCY cycles. This insures that slow memories will work in microprocessor mode immediately after reset. A configuration bit, called WAIT, will enable or disable the wait states. FIG. 39 illustrates the 16-bit interface and FIG. 40 illustrates the 8-bit, in both cases showing program memory instruction fetches with no waits and table reads with wait states.

External Bus Signal Disables

To allow flexibility in the utilization of the pins committed to the external bus, several disables are provided in configuration bits. Also, to disable the entire external bus, as might be done while in extended microcontroller mode and allowing a DMA function, the EBDIS bit in the MEM-CON, shown in FIG. 35, register. This disable will allow the user to tri-state the entire external bus inter-face. This will allow DMA operations as well as direct control of external devices by program control through the I/O pin functions.

In emulator systems, the -ME devices must have inputs to represent the bus disable configuration bits to allow the I/O port functions to detect the status of the pins as external interface. The -ME device also has a special input pin that indicates if the emulator system is in the microprocessor or extended microcontroller mode.

Data Memory

The data memory and general purpose RAM size can be extended to 4096 bytes in the present invention. The data memory address is 12-bits wide. The data memory is partitioned into 16 banks of 256 bytes which contain the General Purpose Registers (GPRs) and Special Function Registers (SFRs).

The GPR's are mechanized into a byte wide RAM array of the size of the combined GPR registers. The SFR's are typically distributed among the peripherals whose functions they control.

The bank is selected by the bank select register (BSR<3: 0>). The BSR register can potentially access more than 16 banks, however the direct long addressing mode is limited to 12-bit addresses or 16 banks. The BSR is limited accordingly.

Figure 42:
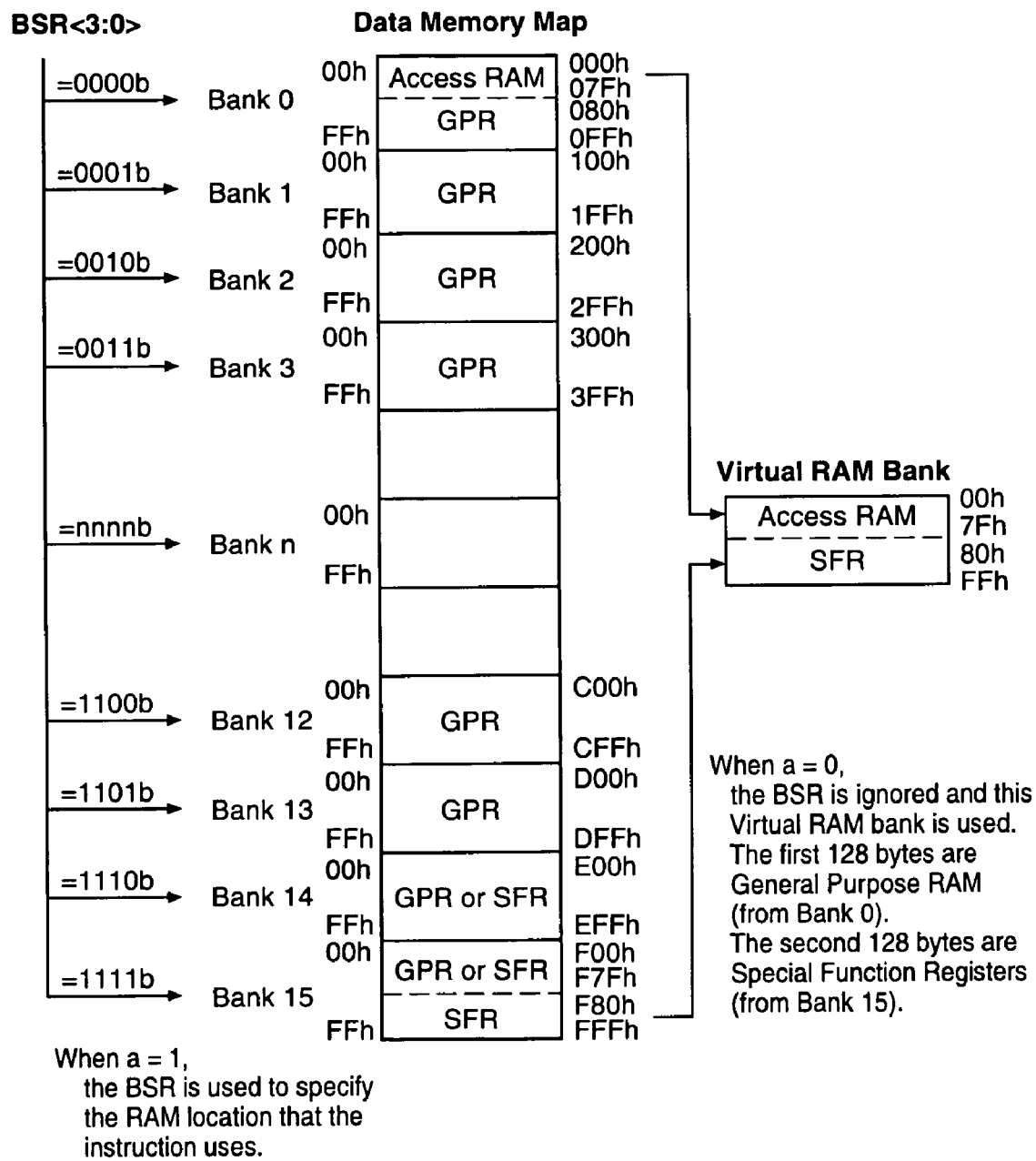
FIG. 42 is a schematic block diagram of the data memory map and the instruction "a" bit of the present invention.
Figure 46:
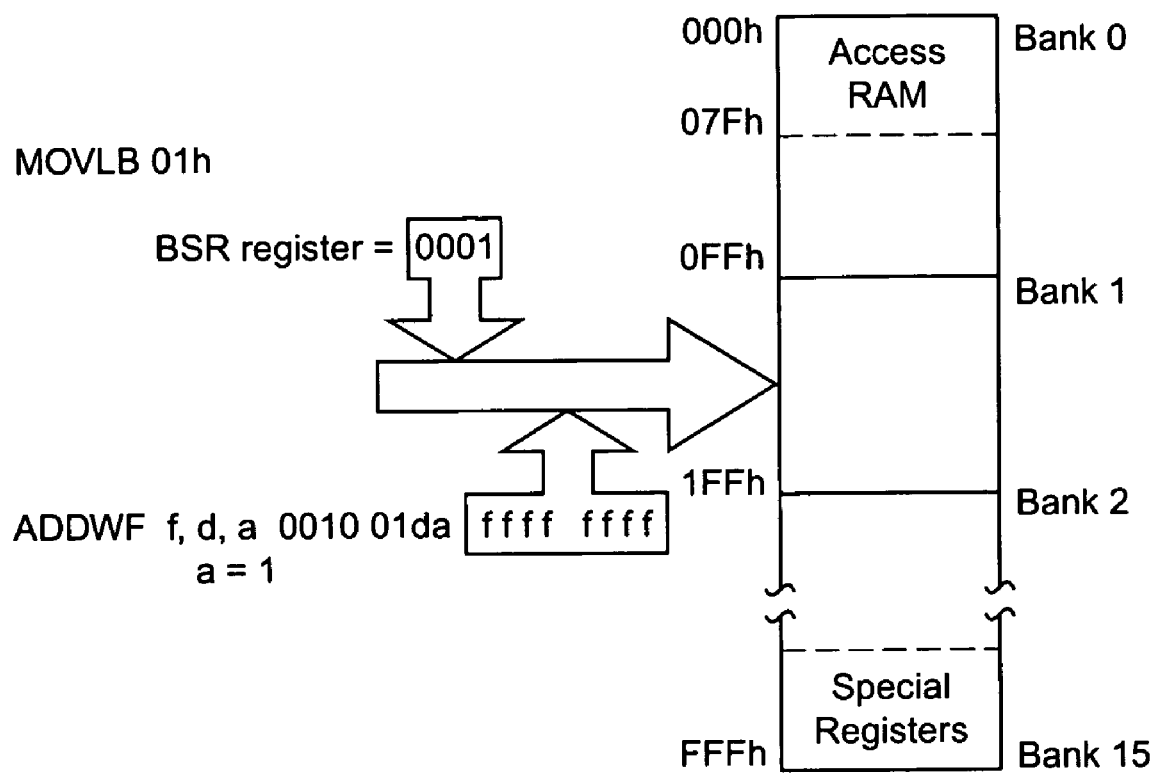
FIG. 46 is a schematic block diagram of the direct short addressing mode of the present invention.
Figure 49:
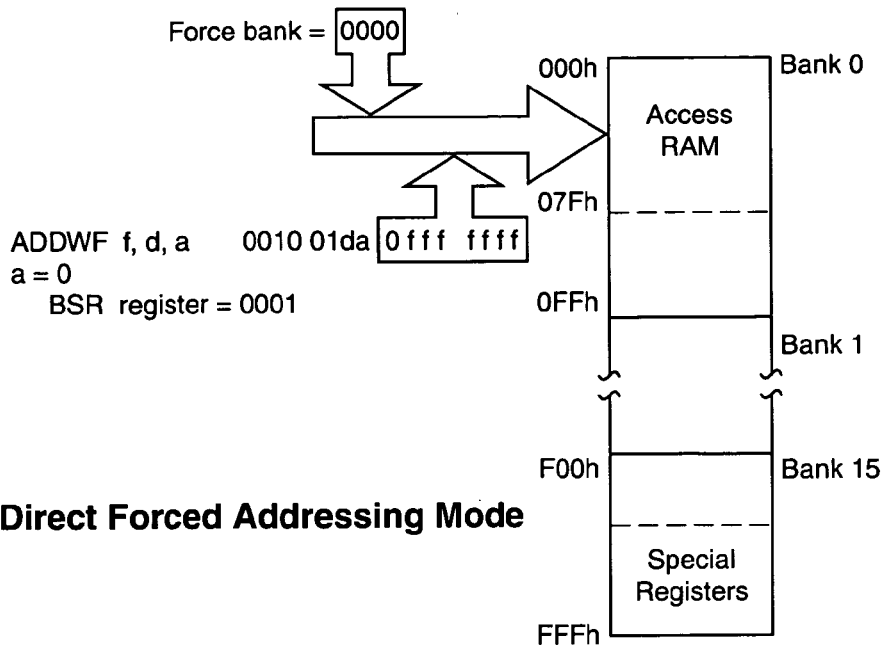
FIG. 49 is a schematic block diagram of the direct forced addressing mode of the present invention.
Figure 50:
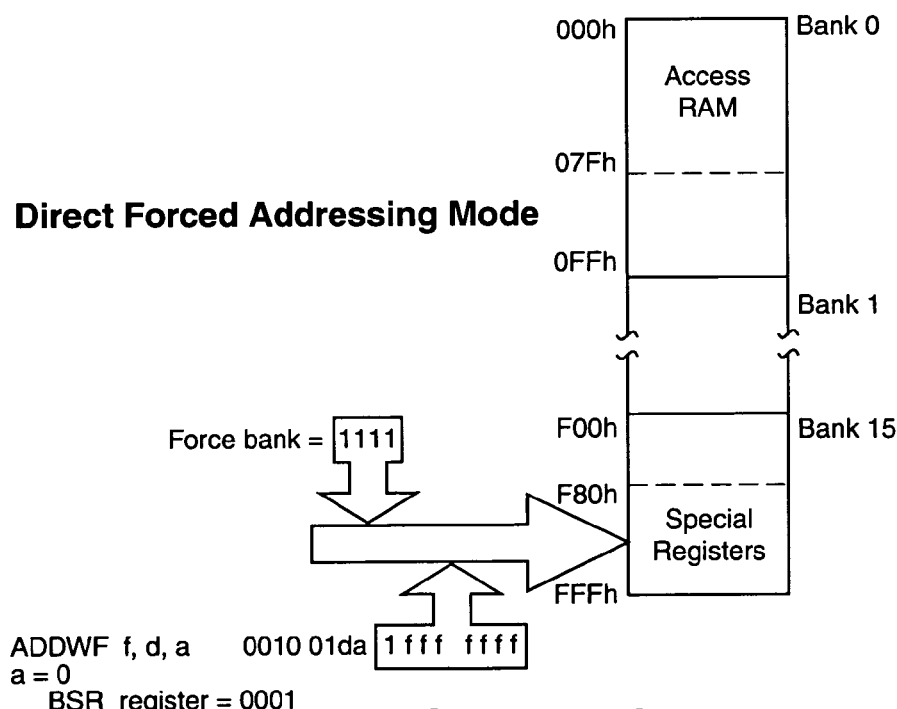
FIG. 50 is a schematic block diagram of the direct forced addressing mode of the present invention.
Figure 51:
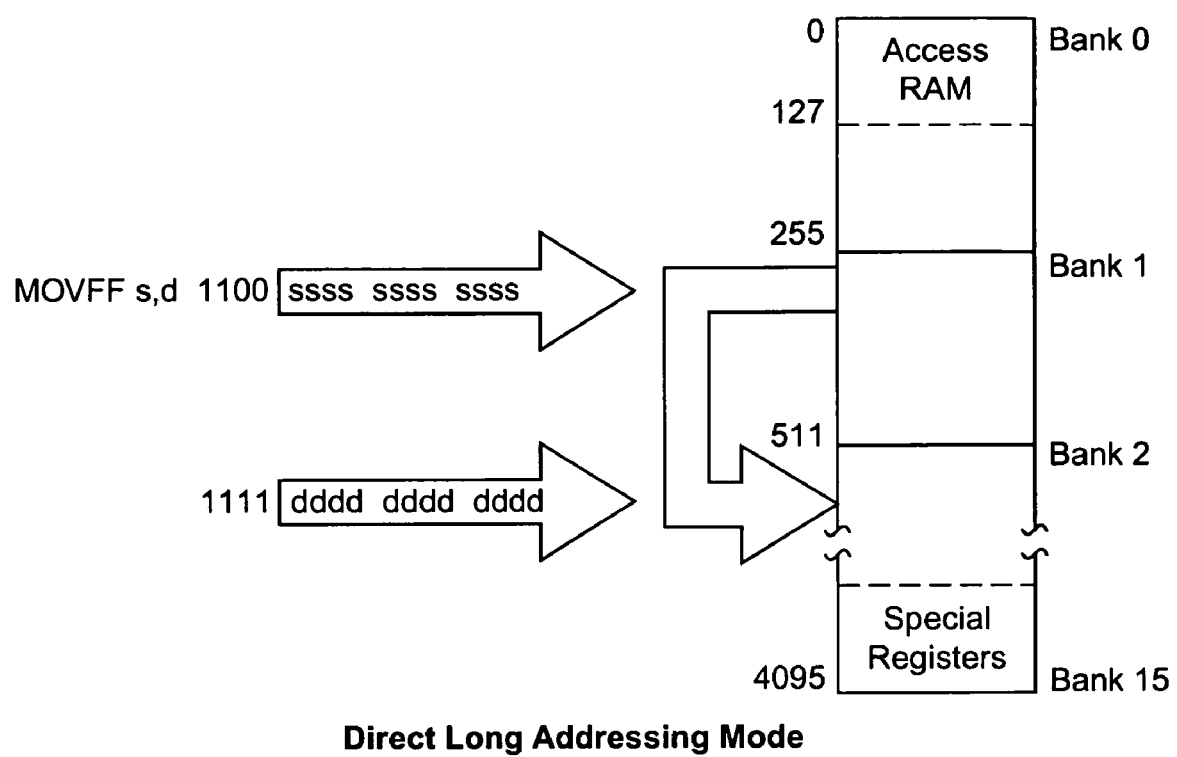
FIG. 51 is a schematic block diagram of the direct long addressing mode of the present invention.
Figure 52:
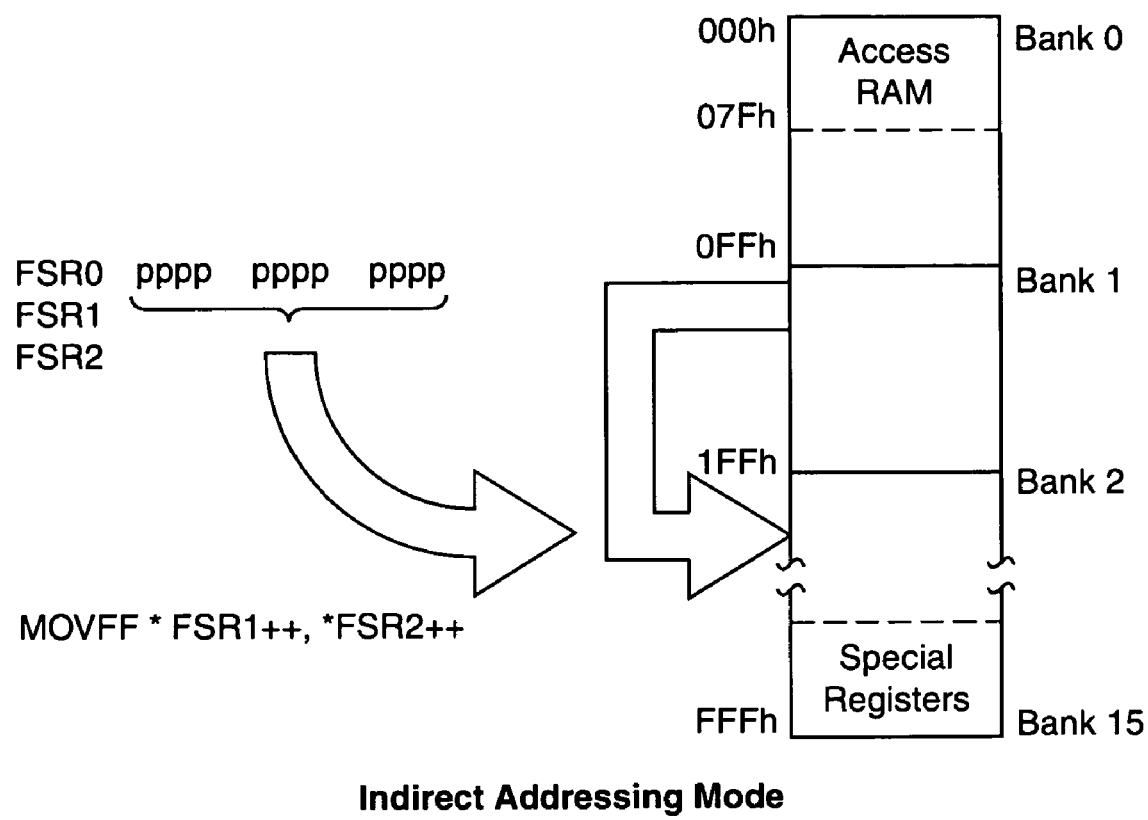
FIG. 52 is a schematic block diagram of the indirect addressing mode of the present invention.

Device instructions can read, modify and write a particular location in one instruction cycle. There is only one address generation per cycle, so it is not possible to read one location and modify/write another in a single cycle. FIG. 42 shows an example data memory map.

General Purpose Registers

In all PIC devices, all data RAM is available for use as registers by all instructions. Most banks of data memory only contain GPR memory. There must be GPR memory included in bank 0 on all devices.

The absolute minimum for the number of GPRs in bank 0 is 128. This GPR area, called the Access RAM, is essential for allowing programmers to have a data structure that is accessible regardless of the setting of the BSR.

Special Function Registers

SFR are special registers, typically used for device and peripheral control and status functions. They are accessible by all instructions. All SFRs should be contained in the upper 128 bytes of bank 15, if possible. If the SFRs do not use all the available locations on a particular device, the unused locations will be unimplemented and read as '0's. Certain devices, such as LCD controllers may have SFR areas in other banks than bank 15.

The boundary of the SFR's in bank 15 can be modified from device to device. At least 16 GPR's must be included in the Access Bank. FIG. 43 displays a possible Special Function Register map. FIGS. 44 and 45 displays a summary of the core Special Function Registers.

Addressing Modes

There are 7 data addressing modes supported by the present invention:
 inherent
 literal
 direct short
 direct forced
 direct long
 indirect
 indexed indirect offset Three of the modes, direct forced, direct long and indirect indexed, are new to the PIC architecture.

Inherent

Some instructions such as DAW do not require addressing other than that explicitly defined in the opcode.

Literal

Literal instructions contain a literal constant field, typically used in a mathematical operation such as ADDLW. Literal addressing is also used for GOTO, CALL, and branch opcodes.

Direct Short

Most mathematical and move instructions operate in the direct short addressing mode. In this addressing mode, the instruction contains eight bits of least significant address for the data. The remaining four bits of address are from the Bank Select Register or BSR. The BSR is used to switch between banks in the data memory area (see FIG. 47).

The need for a large general purpose memory space dictated a general purpose RAM banking scheme. The lower nibble of the BSR selects the currently active general purpose RAM bank. To assist this, a MOVLB bank instruction has been provided in the instruction set.

If the currently selected bank is not implemented (such as Bank 13), any read will read all '0's. Any write is completed to the bit bucket and the STATUS register bits will be set/cleared as appropriate.

Direct Forced

All the Special Function Registers (SFRs) are mapped into the data memory space. In order to allow easy access to the SFR's, they are all, generally, mapped in Bank 15. To simplify access, there is a 1 bit field in the instruction that points the address to the lower half of bank 0 for common RAM and the upper half of bank 15 for the SFR's regardless of the contents of the BSR. With the BSR set to BSR=n then, it is possible to address 3 banks with any instruction; Bank 0 and 15 in direct forced mode and Bank "n" in direct short mode.

Direct Long

The direct long addressing codes all twelve bits of the data address into the instruction. Only the MOVFF instruction uses this mode.

Indirect Addressing

Figure 53:
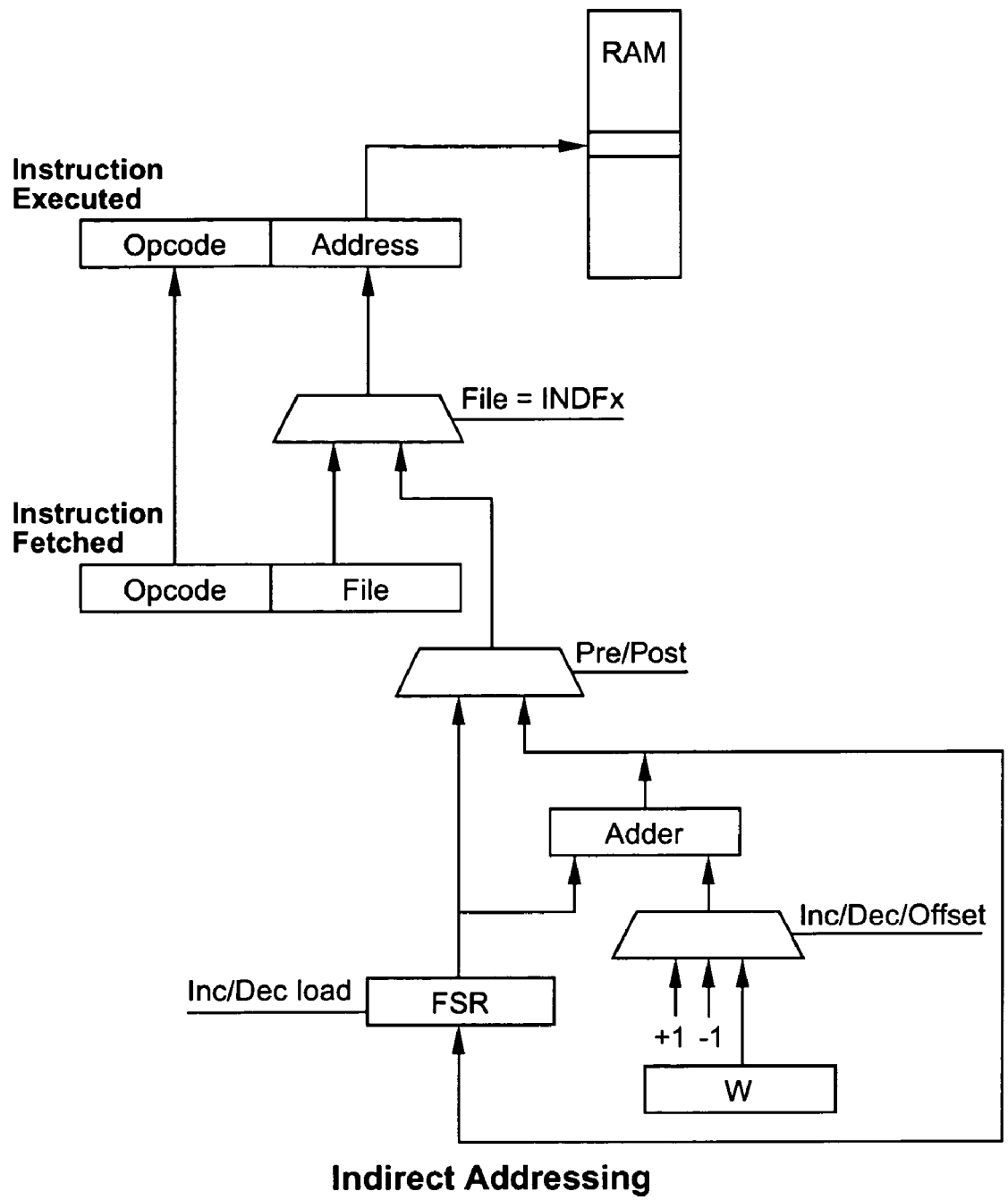
FIG. 53 is a schematic block diagram of the indirect addressing mode of the present invention.

Indirect addressing is a mode of addressing data memory where the data memory address in the instruction is determined by another register. This can be useful for data tables or stacks in the data memory. FIG. 53 shows the operation of indirect addressing. The value of the FSR register is used as the data memory address.

Indirect Addressing Registers

The present invention has three 12-bit registers for indirect addressing. These registers are:
 FSR0H and FSR0L
 FSR1H and FSR1L
 FSR2H and FSR2L The FSR's are 12-bit registers and allow addressing anywhere in the 4096-byte data memory address range.

In addition, there are registers INDF0, INDF1 and INDF2 which are not physically implemented. Reading or writing to these registers activates indirect addressing, with the value in the corresponding FSR register being the address of the data. If file INDF0 (or INDF1,2) itself is read indirectly via an FSR, all '0's are read (Zero bit is set). Similarly, if INDF0 (or INDF1,2) is written to indirectly, the operation will be equivalent to a NOP, and the STATUS bits are not affected.

Indirect Addressing Operation

Each INDF register has four addresses associated with it. When a data access is done to the one of the four INDF locations, the address selected will configure the FSR register to:
 Auto-decrement the value (address) in the FSR after an indirect access (post-decrement)
 Auto-increment the value (address) in the FSR after an indirect access (post-increment)
 Auto-increment the value (address) in the FSR before an indirect access (pre-increment)
 No change to the value (address) in the FSR after an indirect access (no change)

When using the auto-increment or auto-decrement features, the effect on the FSR is not reflected in the STATUS register. For example, if the indirect address causes the FSR to equal '0', the Z bit will not be set. Adding these features allows the FSR to be used as a stack pointer in addition to its uses for data table operations.

Indexed Indirect Addressing

Each INDF has an address associated with it that performs an indexed indirect access. When a data access to this INDF location occurs, the FSR is configured to:
 Add the signed value in the W register and the value in FSR to form the address before an indirect access.
 The FSR value is not changed.

Indirect Writing of Indirect Addressing (INDF) Registers

If an FSR register contains a value that points to one of the indirecting registers (FEFh-FEBh, FE7h-FE3h, FDFh-FDBh), an indirect read will read 00h (Zero bit is set) while an indirect write will be equivalent to a NOP (STATUS bits are not affected).

Indirect Writing of Pointer (FSR) Registers

If an indirect addressing operation is done where the target address is an FSRnH or FSRnL register, the write operation will dominate over the pre or post increment/decrement functions. For example:

FSR0=FE8h (one less than the location of FSR0L)
W=50h
MOVWF*(++FSR0); (PREINC0)

will increment FSR0 by one to FE9h, pointing to FSR0L. Then write of W into FSR0L will change FSR0L to 50h. However, FSR0=FE9h (the location of FSR0L)
W=50h
MOVWF*FSR0++; (POSTINC0)

will attempt to write W into the FSR0L at the same time the increment of FSR0 is to occur. The write of W will prevail over the post increment and FSR0L will be 50h.

Instruction Set Summary

The instruction set of the present invention consists of 77 instructions. Due to excessive page and bank switching in prior art architectures, the Program and Data memory maps needed to be linearized, and the instruction set was modified to facilitate this linearization. The Data Memory space of the preferred embodiment of the present invention has a maximum of 4K bytes, which is made up of 16 banks of 256 bytes each. In the preferred embodiment of the present invention, with all Special Function Registers located in one bank, it is preferred to designate a bit in the opcode of all the instructions that perform file manipulation that could force a virtual bank. Therefore, it is not necessary to switch banks in order to access Special Function Registers.

The Program Memory space was modified over the prior art systems to be a maximum of 2M bytes in the preferred embodiment. The PC was increased from 13 bits to up to 21 bits, and some instructions that cause a jump (CALL, GOTO) were changed to two-word instructions to load the 21-bit value for the PC. Another improvement over the prior art was the inclusion of a modular emulator. This requires communication between two chips for emulation, and to achieve the desired speeds, it is not possible to have different source and destination registers within the same instruction cycle. Therefore, the MOVPF and MOVFP instructions in the prior art were eliminated. To keep this functionality, a two-word instruction, MOVFF, was added.

The instruction set of the present invention can be grouped into three types:
  byte-oriented
  bit-oriented
  literal and control operations.

These formats are shown in FIG. 56. FIG. 54 shows the field descriptions for the opcodes. These descriptions are useful for understanding the opcodes in FIGS. 57–59 and in each specific instruction description found in Appendix A. FIG. 114 shows the instruction decode map.

For byte-oriented instructions, 'f' represents a file register designator and 'd' represents a destination designator. The file register designator specifies which file register is to be used by the instruction. The destination designator specifies where the result of the operation is to be placed. If 'd'='0', the result is placed in the W register. If 'd'='1', the result is placed in the file register specified by the instruction.

Again, for byte-oriented instructions, 'a' represents the virtual bank select bit. If 'a'='0', the BSR is overridden and virtual bank is selected. If 'a'='1', the bank select register (BSR) is not overridden.

For bit-oriented instructions, 'b' represents a bit field designator which selects the number of the bit affected by the operation, while 'f' represents the address of the file in which the bit is located.

For literal and control operations, 'k' represents an 8-, 12-, 16- or 20-bit constant or literal value. Moreover, 's' represents the fast call/return select bit. If 's'='0', the shadow registers are unused. If 's'='1', the W, BSR and STATUS registers are updated from shadow registers on a RETURN or RETFIE instruction, or the shadow registers are loaded from their corresponding register on a CALL instruction. Finally, 'n' is a 2's complement number that determines the direction and magnitude of the jump for relative branch instructions.

The instruction set is highly orthogonal and is grouped into:
  byte-oriented operations
  bit-oriented operations
  literal and control operations All instructions are executed within one single instruction cycle, unless:
  a conditional test is true
  the program counter is changed as a result of an instruction
  a file to file transfer is executed
  a table read or a table write instruction is executed which in that case, the execution takes two instruction cycles with the second cycle executed as a NOP.

Special Function Registers as Source/Destination

The orthogonal instruction set of the present invention allows read and write of all file registers, including special function registers. There are some special situations the user should be aware of:

STATUS as Destination

If an instruction writes to the STATUS register, the Z, C, DC, OV and N bits may be set or cleared as a result of the instruction and overwrite the original data bits written.

PCL as Source or Destination

Read, write or read-modify-write on PCL may have the following results:
  For a Read PCL, first PCU to PCLATU; then PCH to PCLATH; and then PCL to dest.
  For a Write PCL, first PCLATU to PCU; then PCLATH to PCH; and then 8-bit result value to PCL.
  For a Read-Modify-Write: first PCL to ALU operand, then PCLATH to PCH, then PCLATU to PCU, and then 8-bit result to the PCL.

Where:
  PCL=program counter low byte
  PCH=program counter high byte
  PCLATH=program counter high holding latch
  PCU=program counter upper byte
  PCLATU=program counter upper holding latch
  dest=destination, W or f.

Bit Manipulation

All bit manipulation instructions are done by first reading the entire register, operating on the selected bit and writing the result back (read-modify-write (R-M-W)). The user should keep this in mind when operating on some special function registers, such as ports. It should be noted that the Status bits that are manipulated by the device (including the Interrupt flag bits) are set or cleared in the Q1 cycle. So there is no issue on doing R-M-W instructions on registers which contain these bits.

Figure 60:
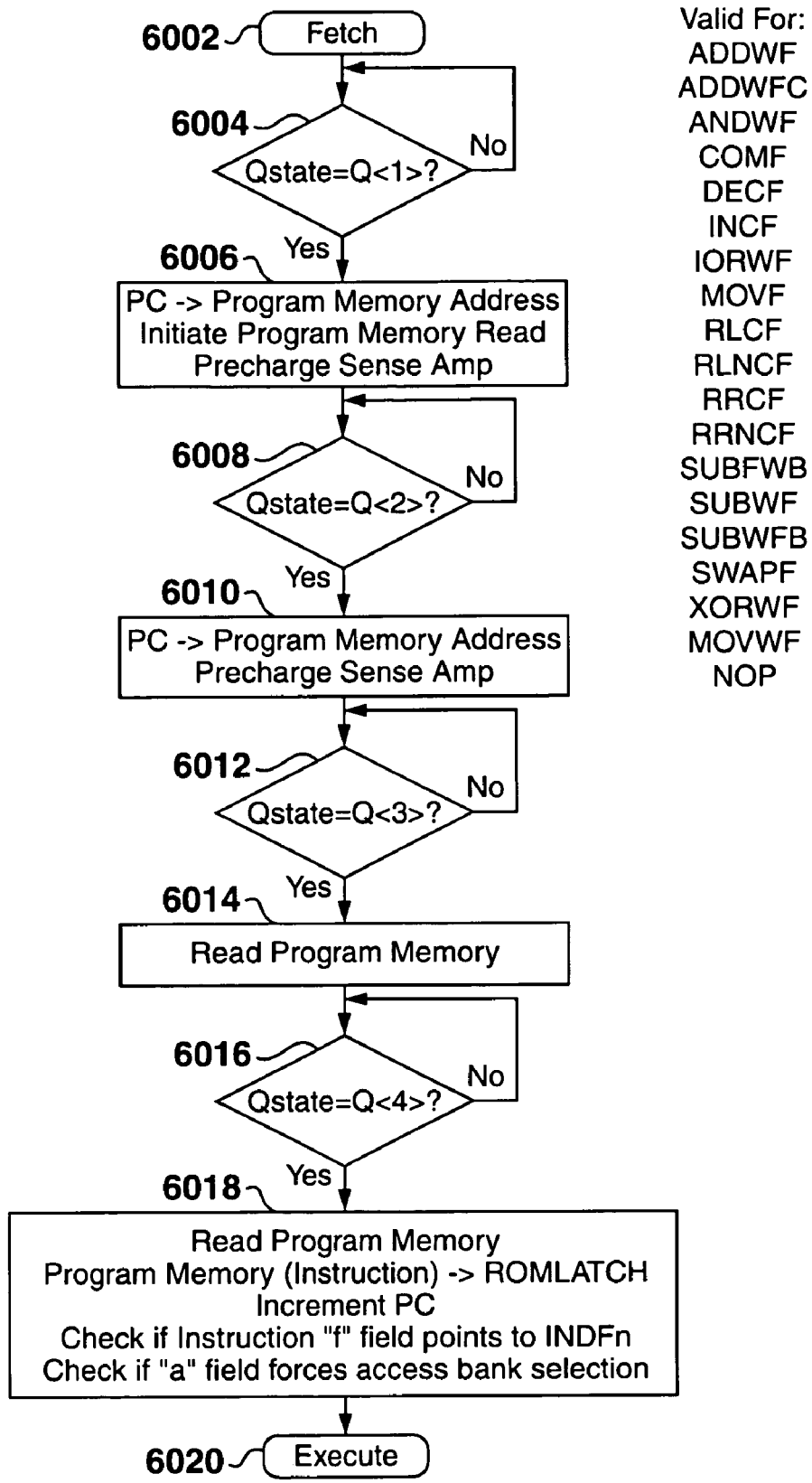
FIG. 60 is a flowchart for the byte oriented file register operations of the present invention.
Figure 61:
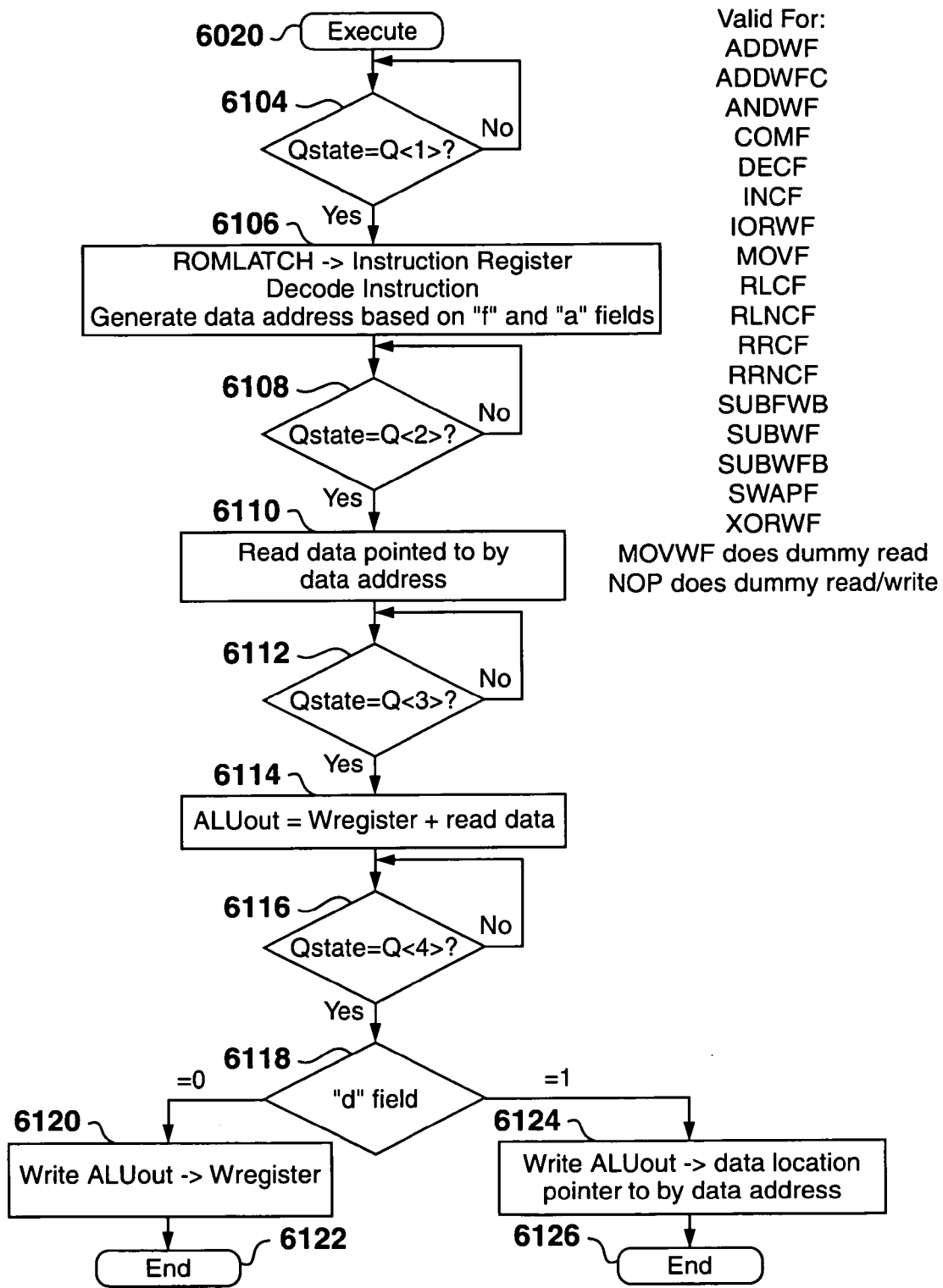
FIG. 61 is a flowchart for the byte oriented file register operations (execute) of the present invention.
Figure 62:
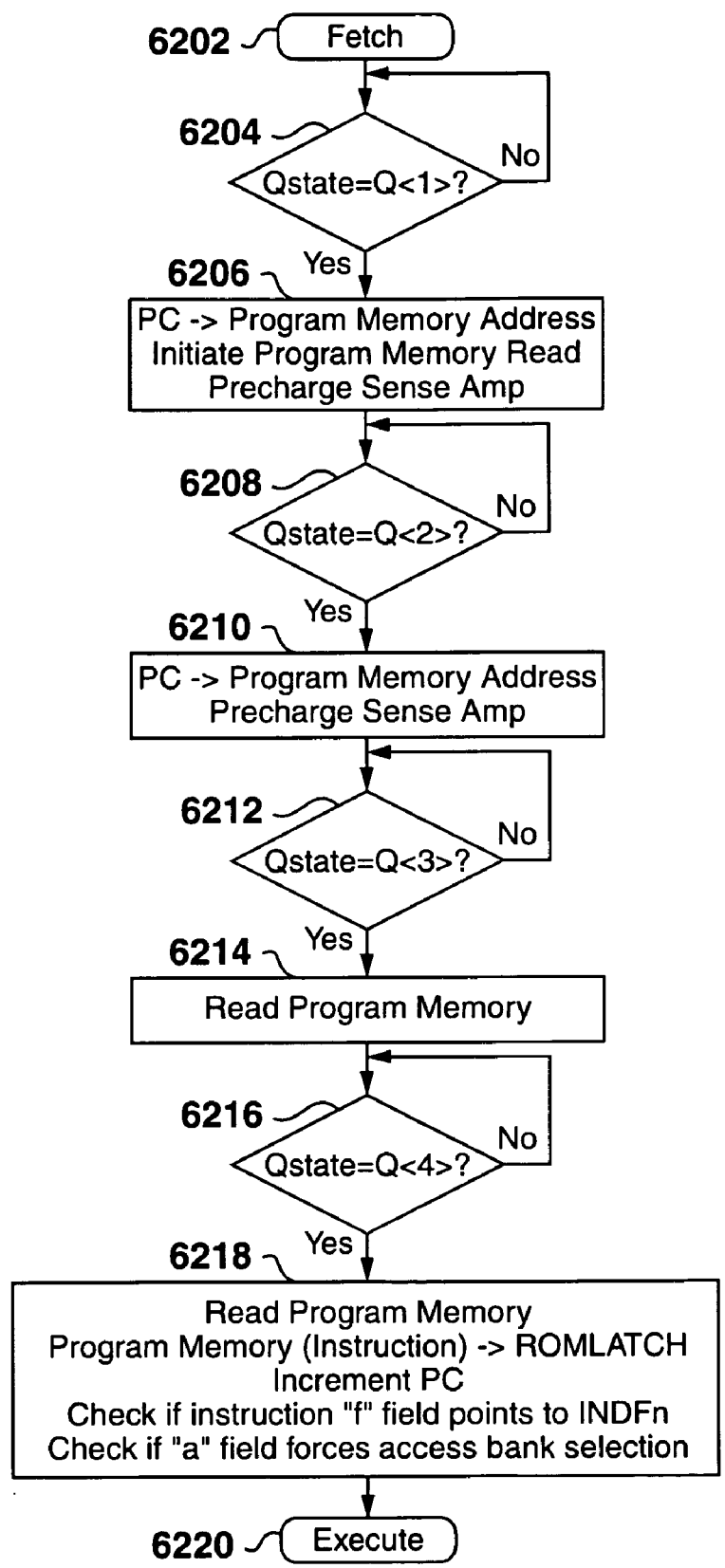
FIG. 62 is a flowchart for the CLRF, NEGF, SETF (Fetch) instructions of the present invention.
Figure 63:
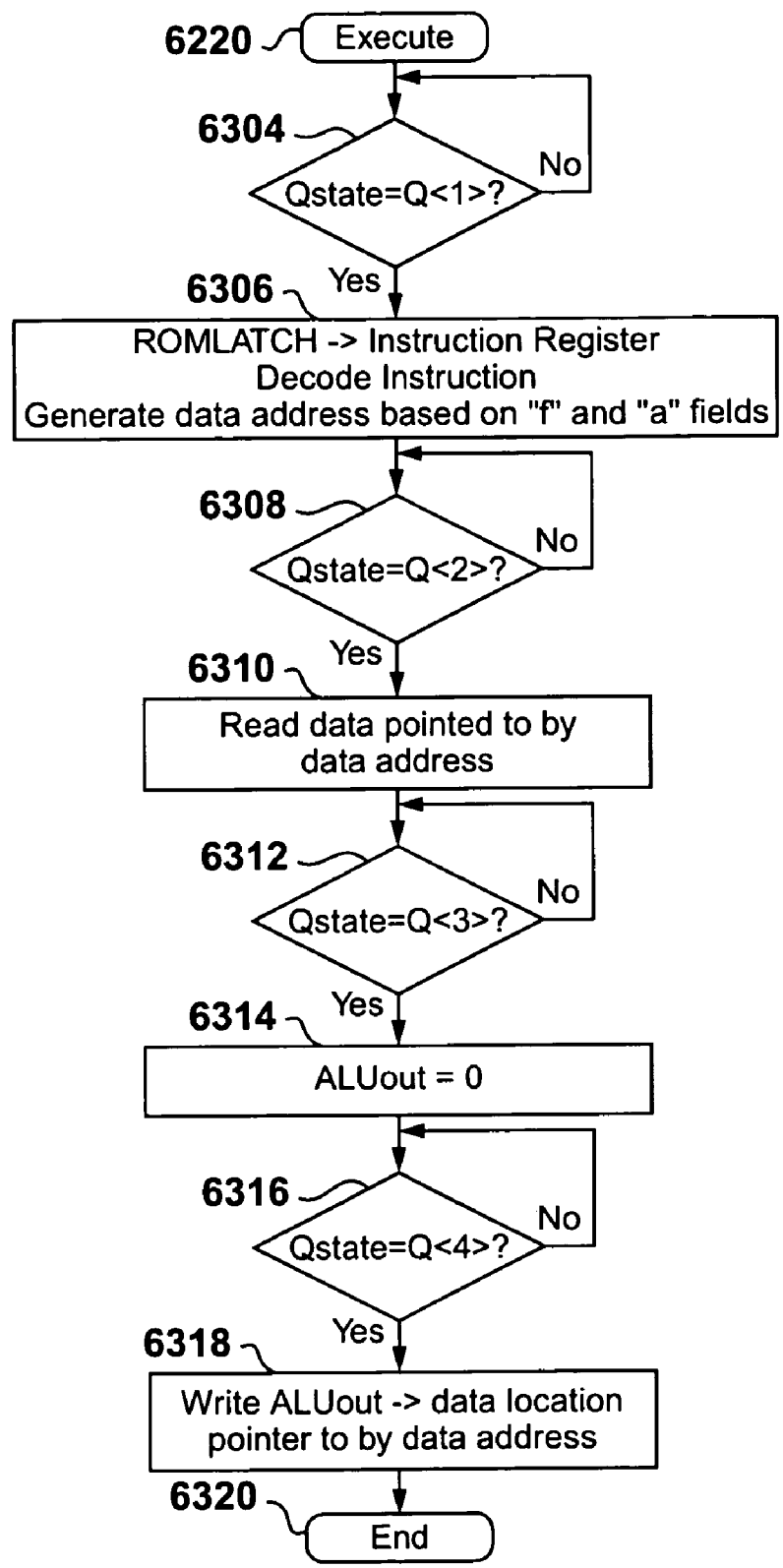
FIG. 63 is a flowchart for the CLRF, NEGF, SETF (Execute) instructions of the present invention.
Figure 64:
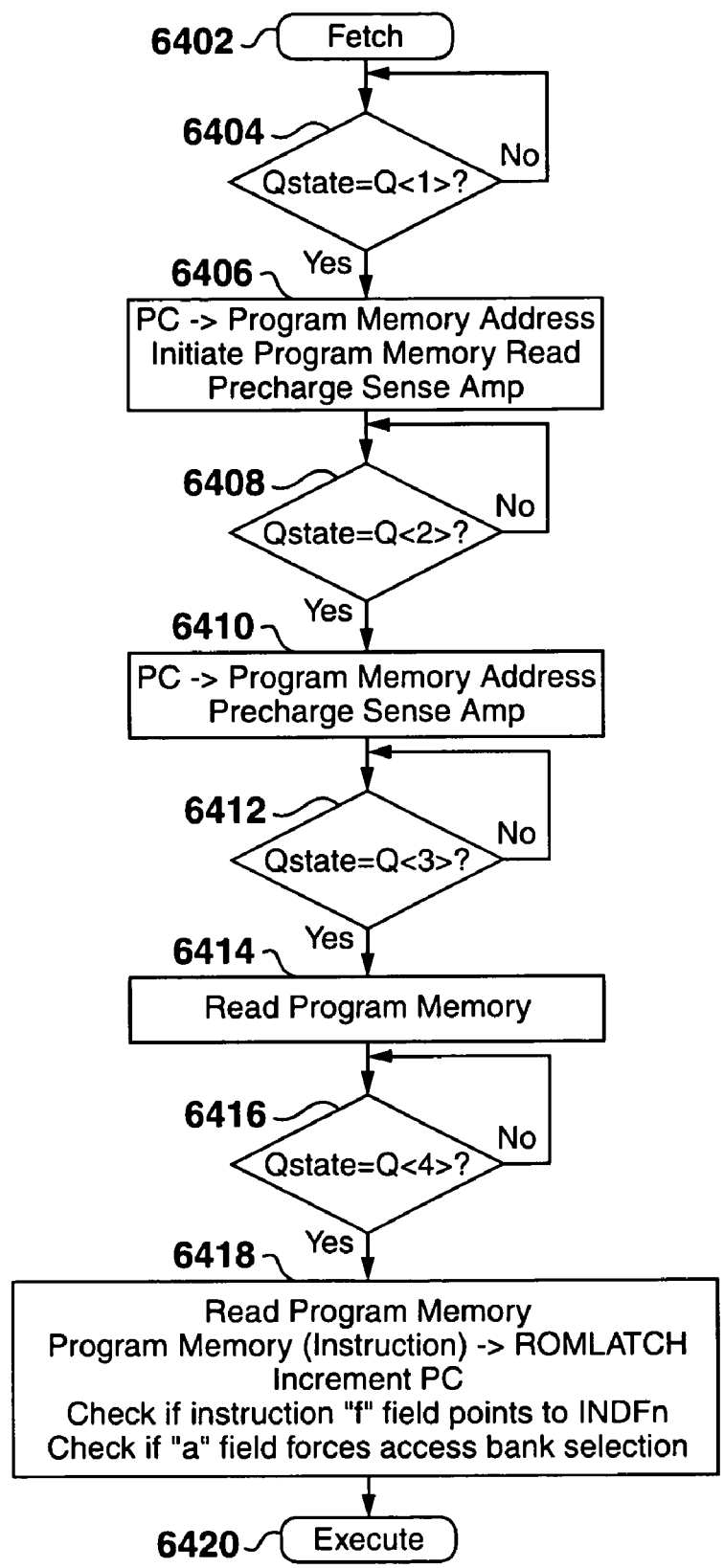
FIG. 64 is a flowchart for the DECFSZ, DCFSNZ, INCFSZ, ICFSNZ (Fetch) instructions of the present invention.
Figure 65:
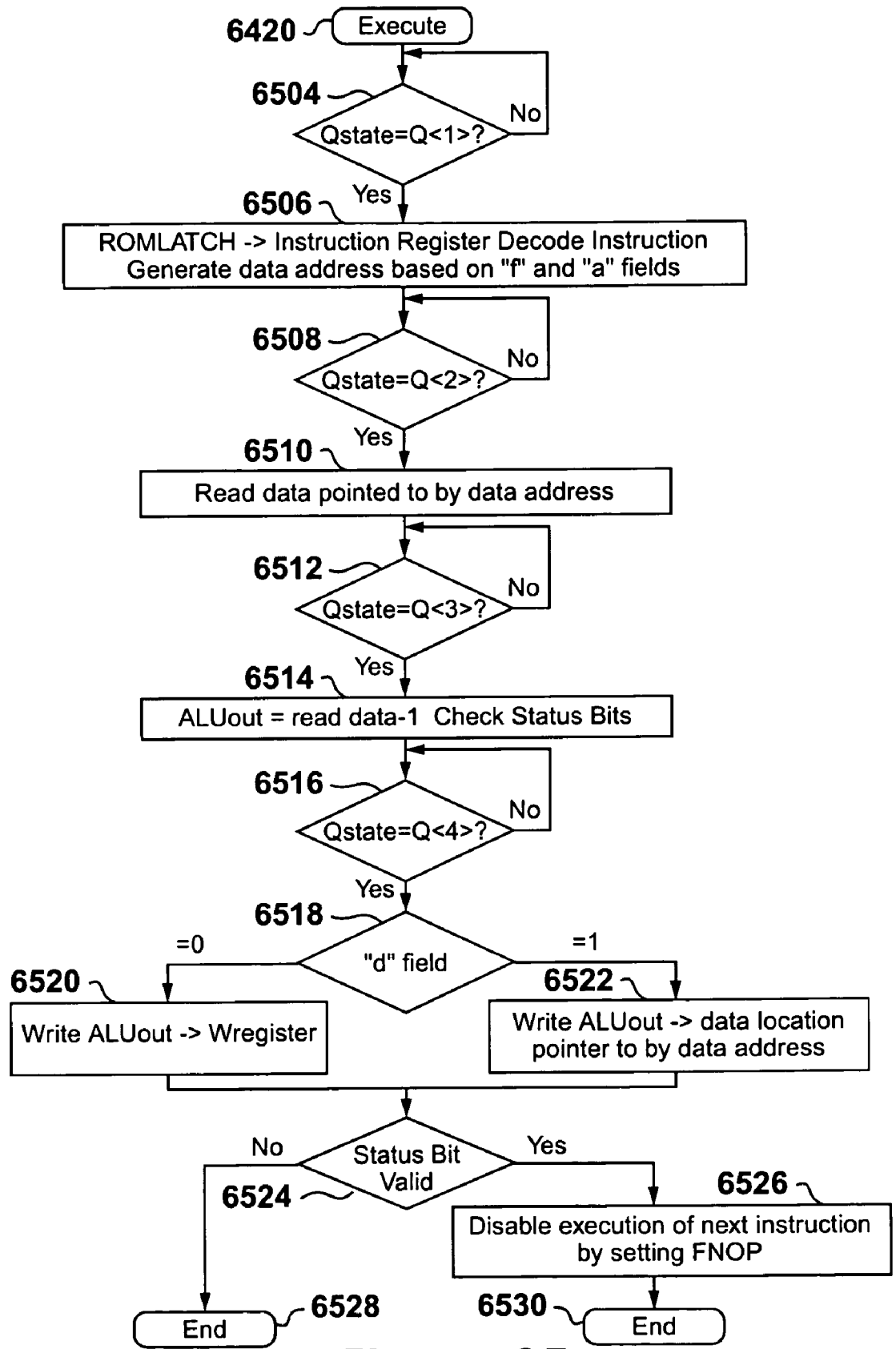
FIG. 65 is a flowchart for the DECFSZ, DCFSNZ, INCFSZ, ICFSNZ (Fetch) instructions of the present invention.
Figure 66:
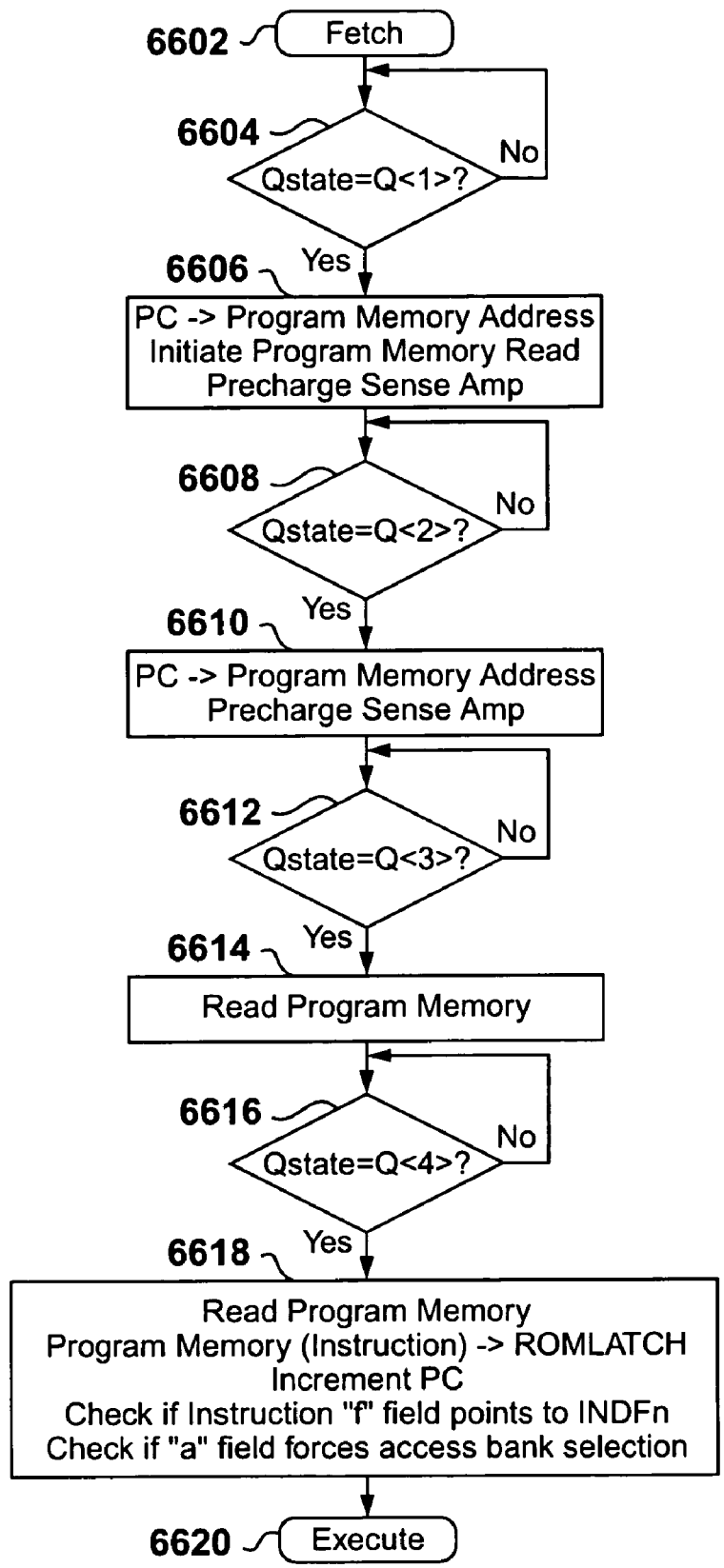
FIG. 66 is a flowchart for the CPFSEQ, CPFSQT, CPFSLT, and TSTFSZ (Fetch) instructions of the present invention.
Figure 67:
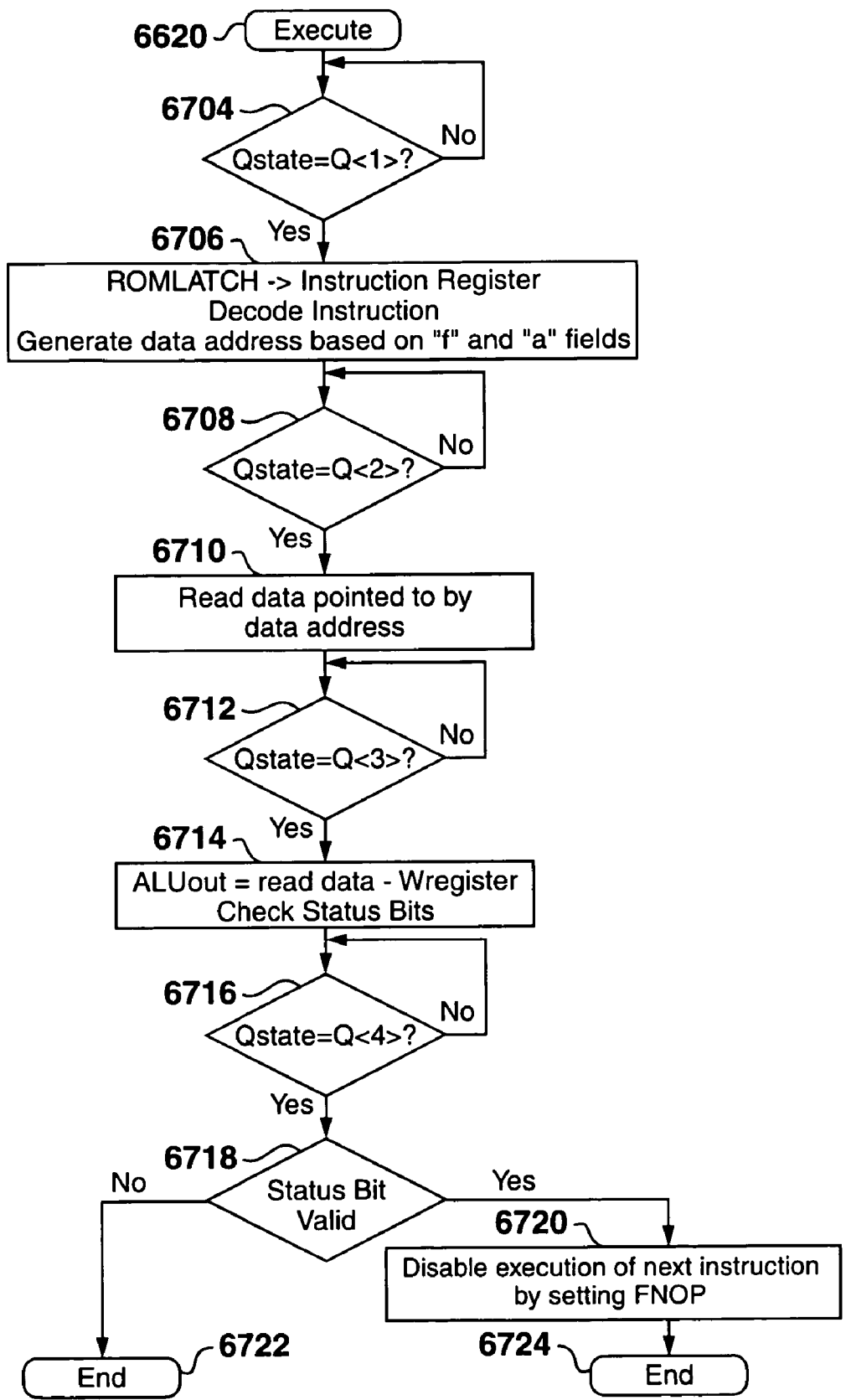
FIG. 67 is a flowchart for the CPFSEQ, CPFSQT, CPFSLT, and TSTFSZ (Execute) instructions of the present invention.
Figure 68:
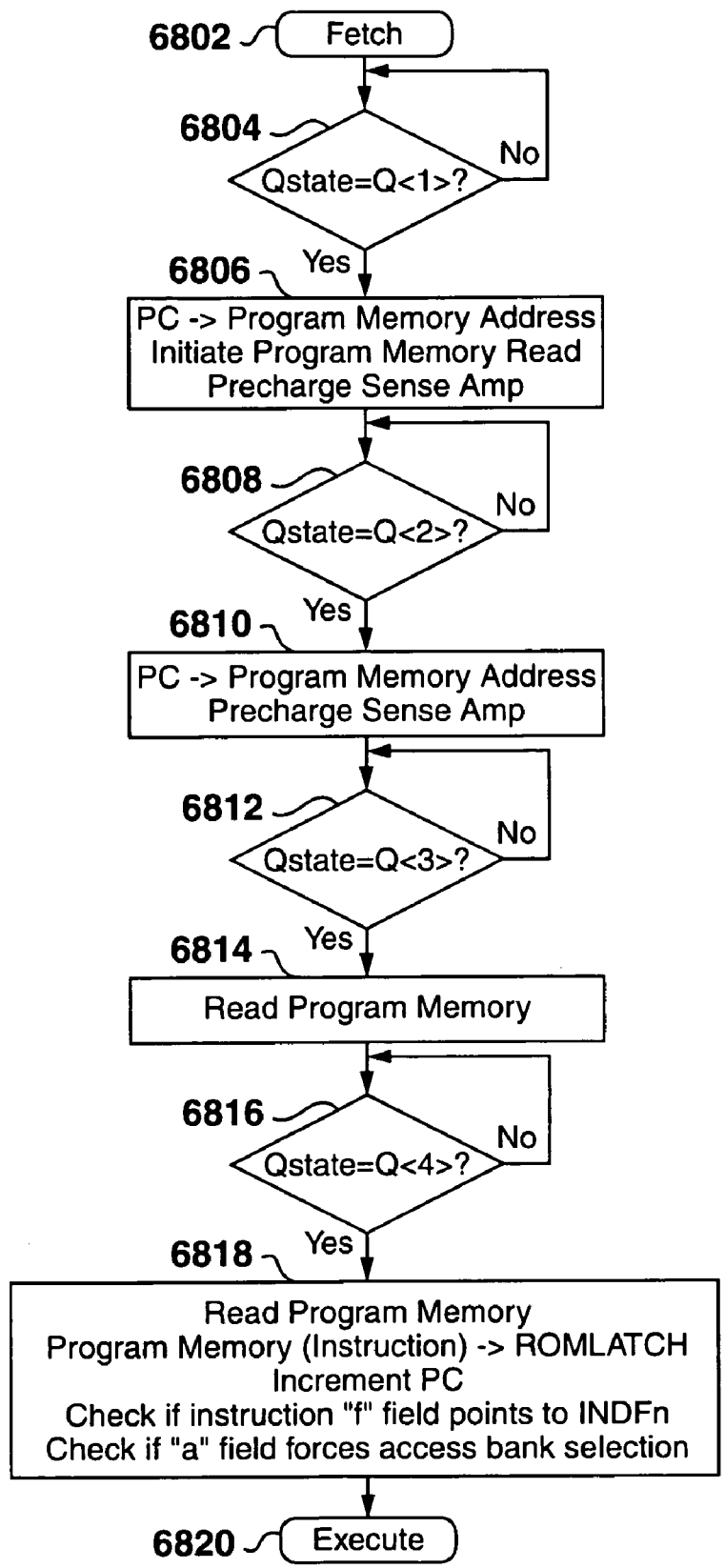
FIG. 68 is a flowchart for the MULWF (Fetch) instruction of the present invention.
Figure 69:
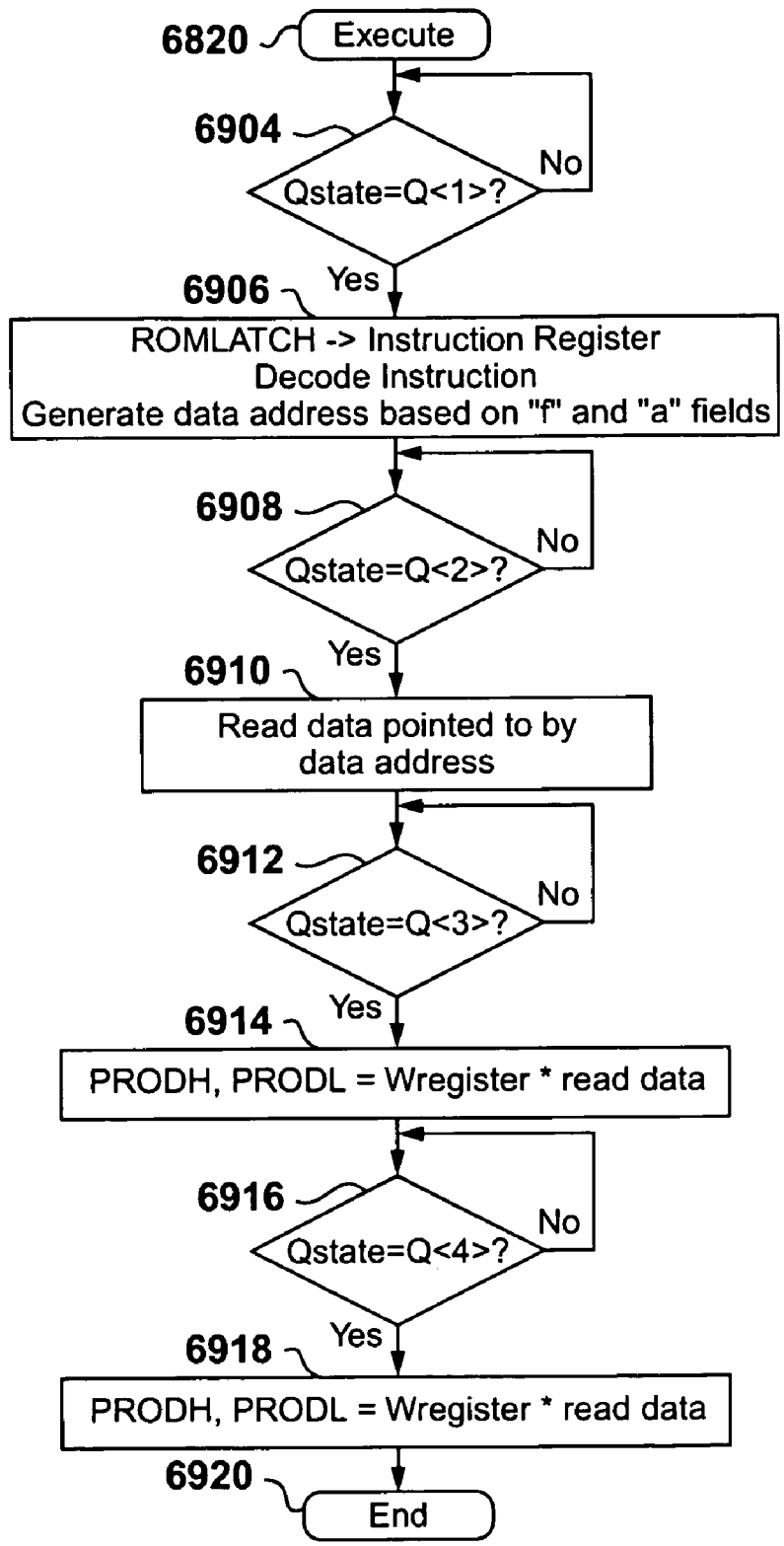
FIG. 69 is a flowchart for the MULWF (Execute) instruction of the present invention.
Figure 113:
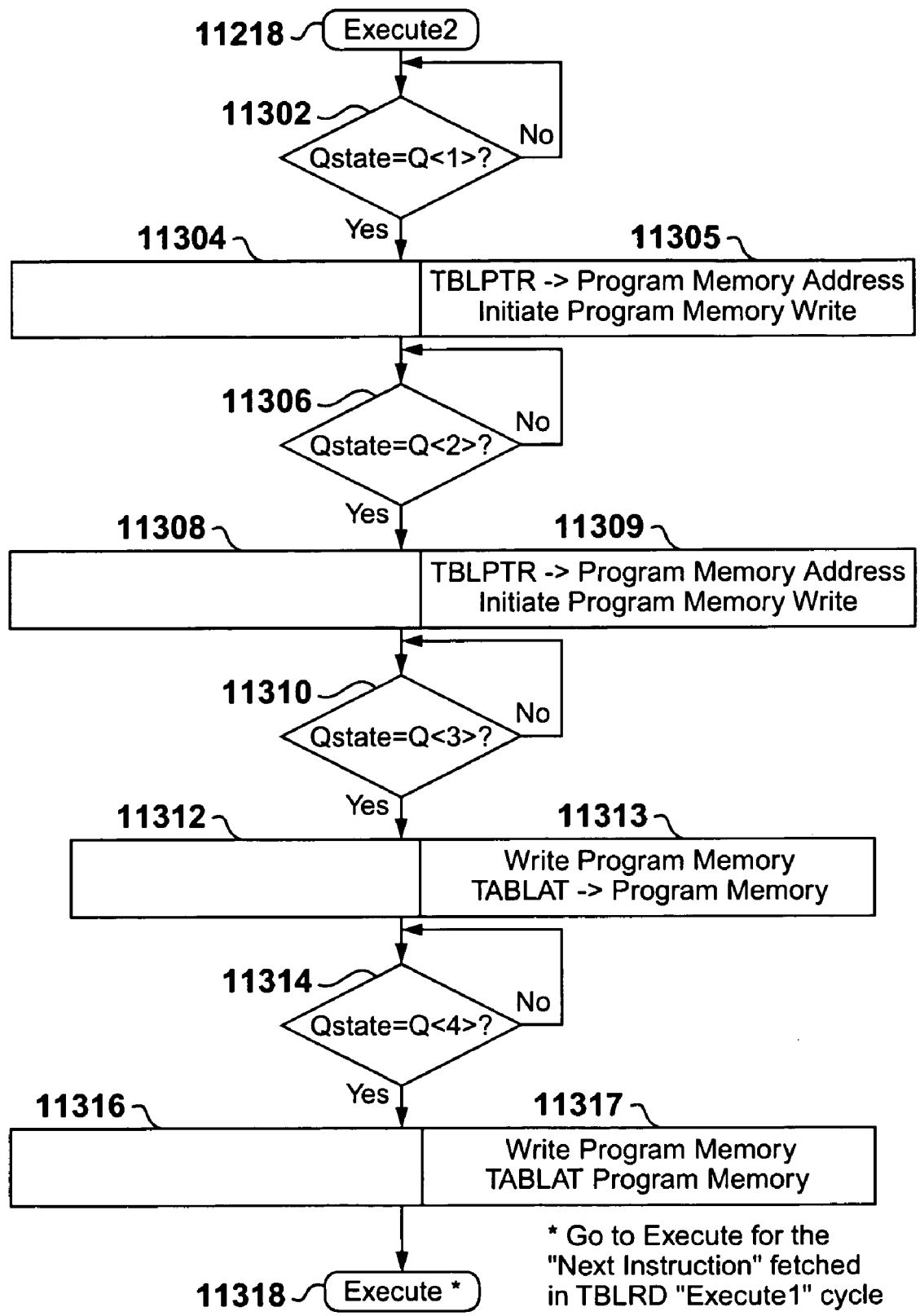
FIG. 113 is a flow chart for TBLWT*, TBLWT*+, TBLWT*−, and TBLWT+* (Execute2) instructions of the present invention.

FIGS. 60–113 contain flowcharts for the general operation of each of the instructions within the instruction set of the present invention. The various Figures show generalized as well as specific steps for the fetching and the execution of the instructions within the instruction set of the present invention. For example, FIG. 60 shows the steps for the fetching of byte oriented file register operations, which includes the instructions ADDWF, ADDWFC, ANDWF, COMF, DECF, INCF, IORWF, MOVF, RLCF, RLNCF, RRCF, RRNCF, SUBFWB, SUBWF, SUBWFB, SWAPF, XORWF, MOVWF, and NOP. Similarly, FIG. 61 shows the steps for the execution of the byte oriented file register operations, which includes the instructions ADDWF, ADDWFC, ANDWF, COMF, DECF, INCF, IORWF, MOVF, RLCF, RLNCF, RRCF, RRNCF, SUBFWB, SUBWF, SUBWFB, SWAPF, and XORWF (but MOVWF does only a dummy read and NOP does a dummy read and a dummy write).

Figure 77:
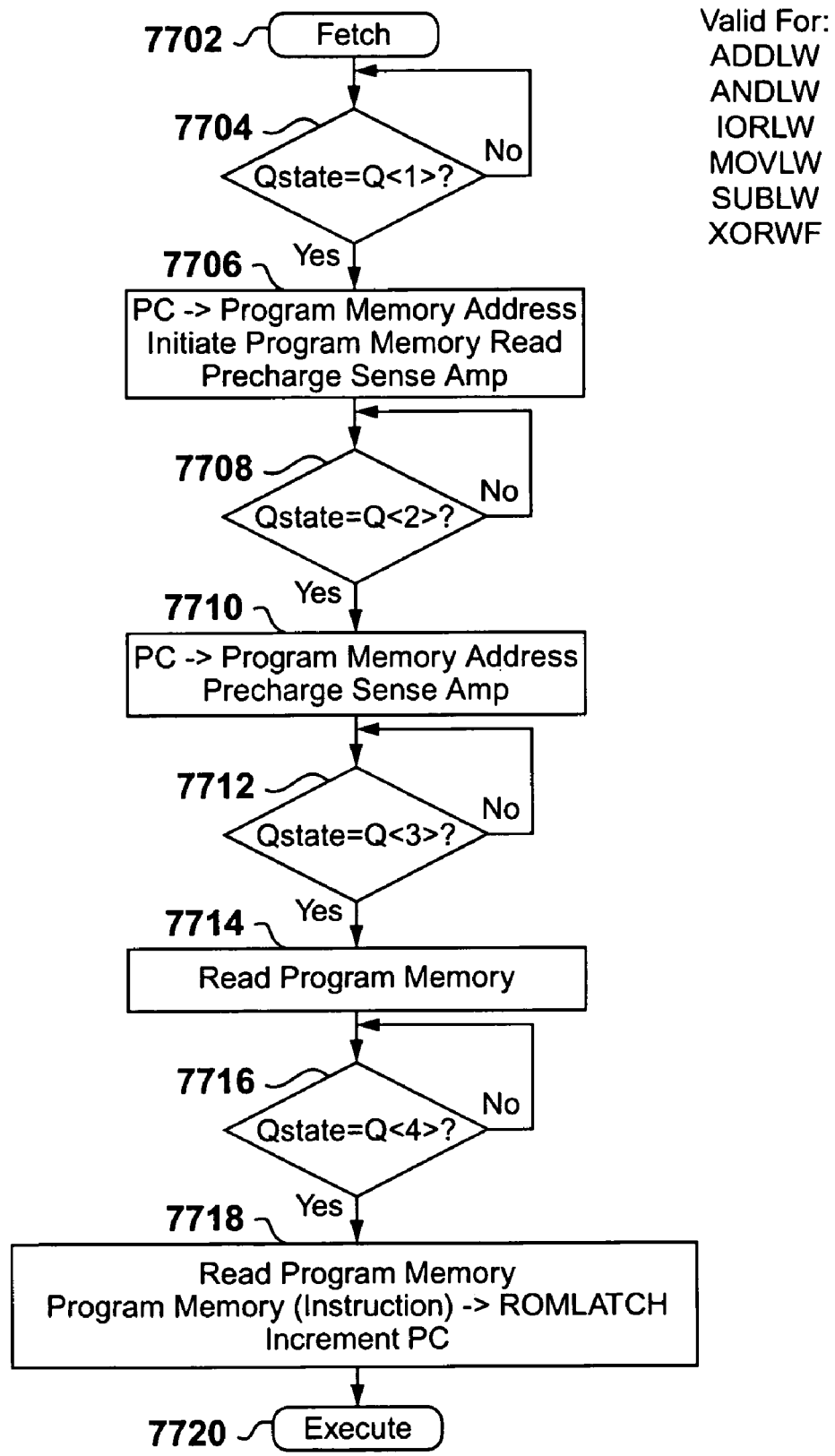
FIG. 77 is a flowchart for the Literal Operations (Fetch) of the present invention.
Figure 78:
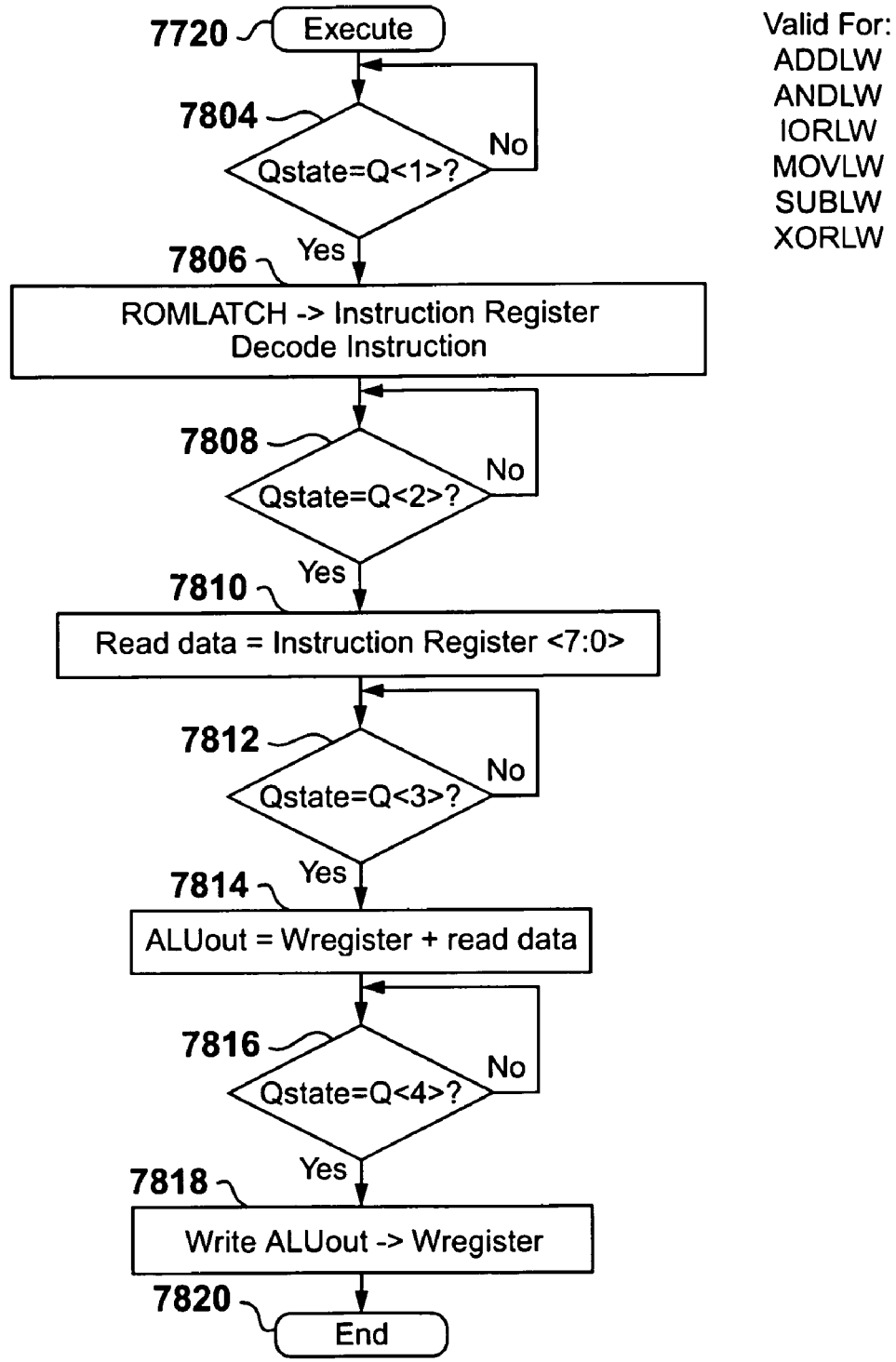
FIG. 78 is a flowchart for the Literal Operations (Execute) of the present invention.

FIG. 77 shows the fetch steps for the Literal Operations, which includes the instructions: ADDLW, ANDLW, IORLW, MOVLW, SUBLW, and XORLW. As before, FIG. 78 shows the execution steps for the Literal Operations, which includes the instructions: ADDLW, ANDLW, IORLW, MOVLW, SUBLW, and XORLW.

Figure 90:
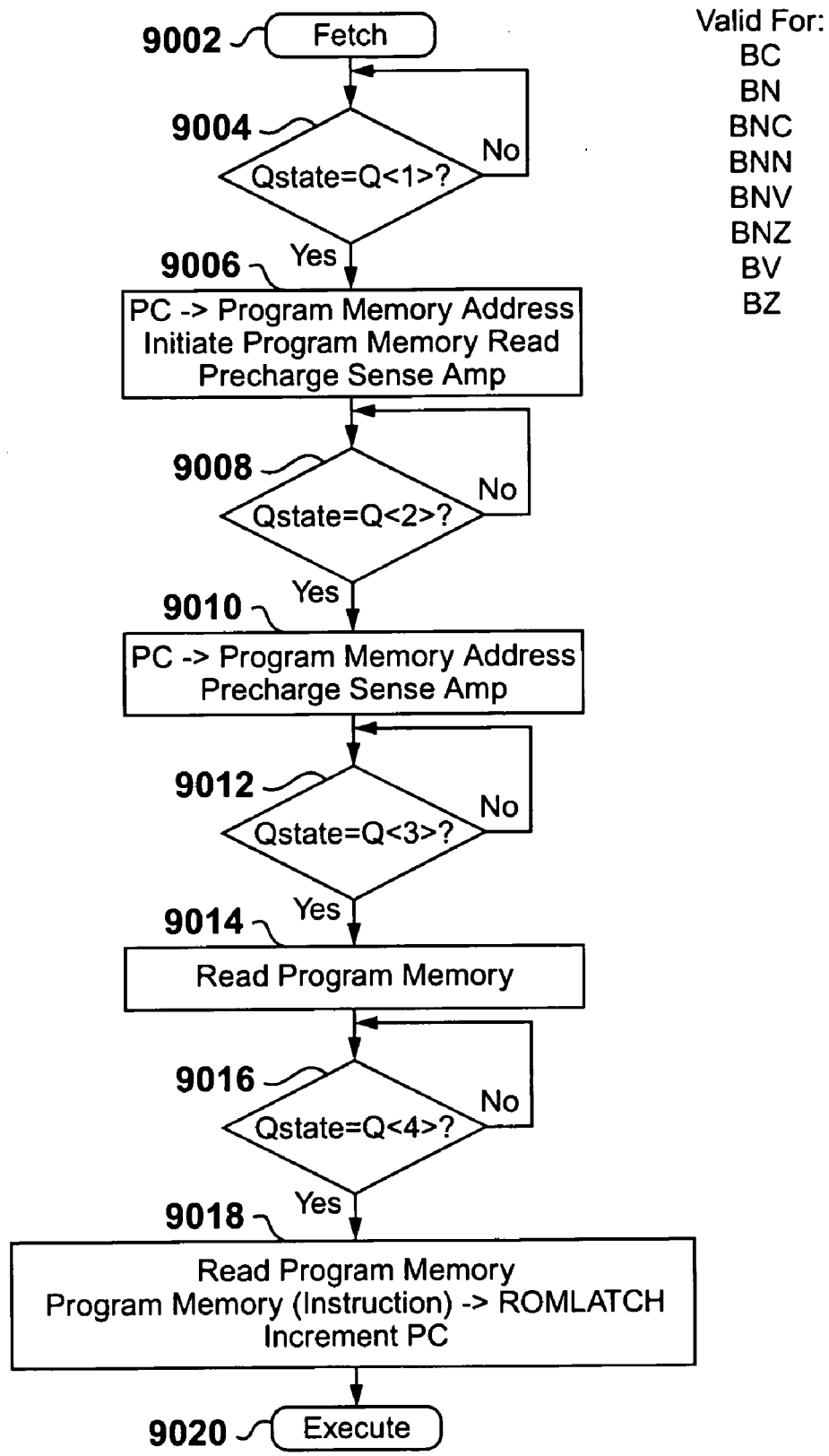
FIG. 90 is a flow chart for the Branch Operations (Fetch) of the present invention.
Figure 91:
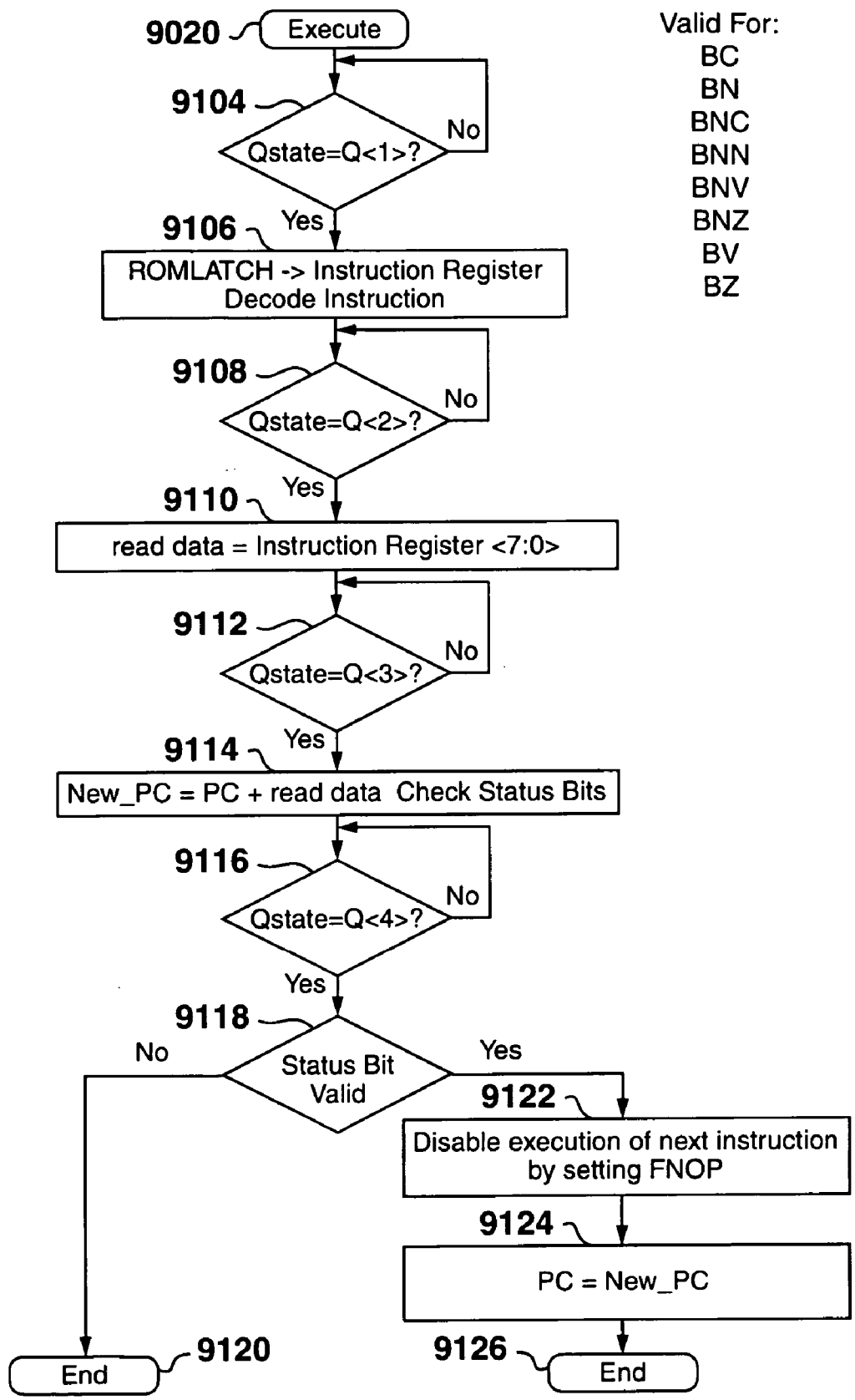
FIG. 91 is a flow chart for the Branch Operations (Execute) of the present invention.
Figure 92:
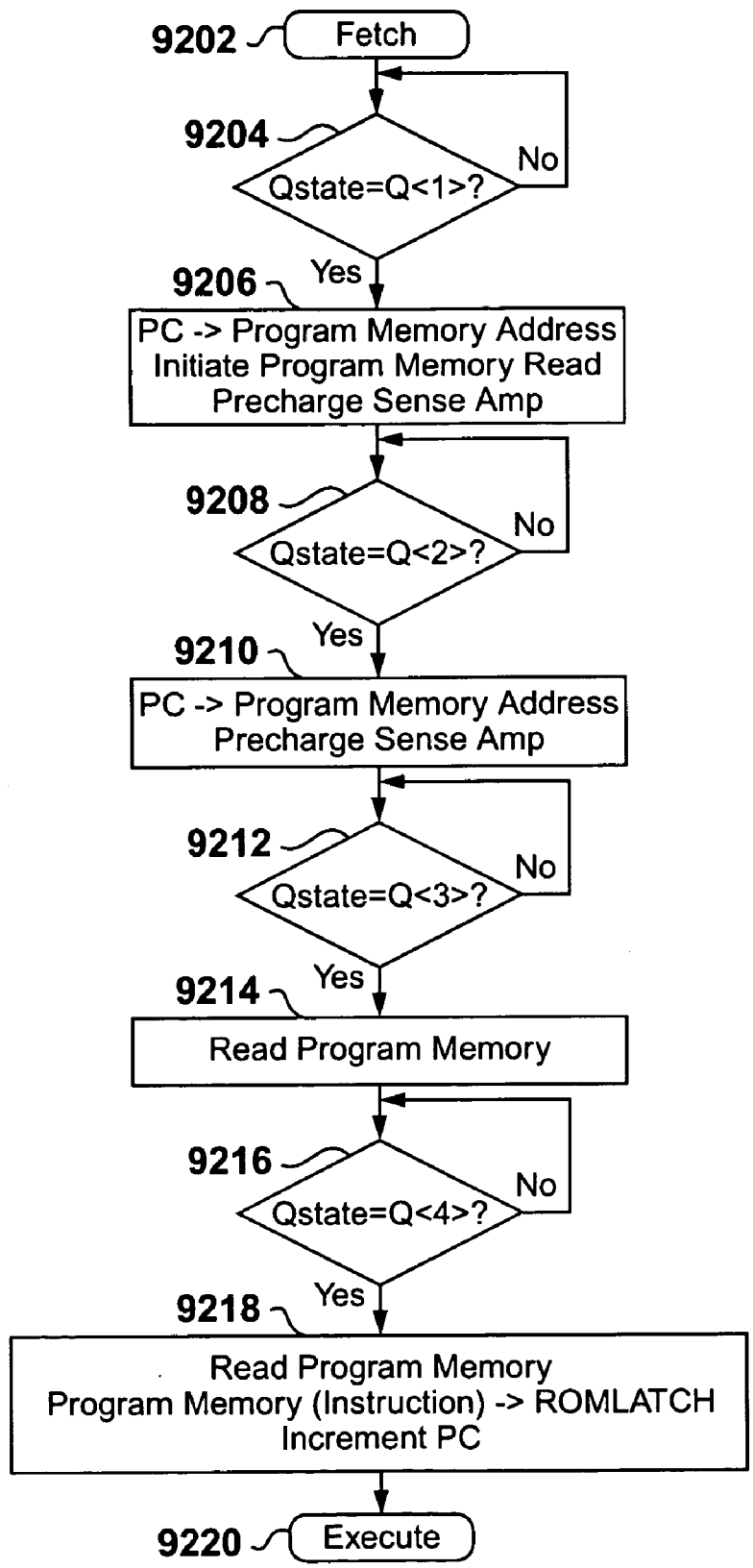
FIG. 92 is a flow chart for BRA and RCALL (Fetch) instructions of the present invention.
Figure 93:
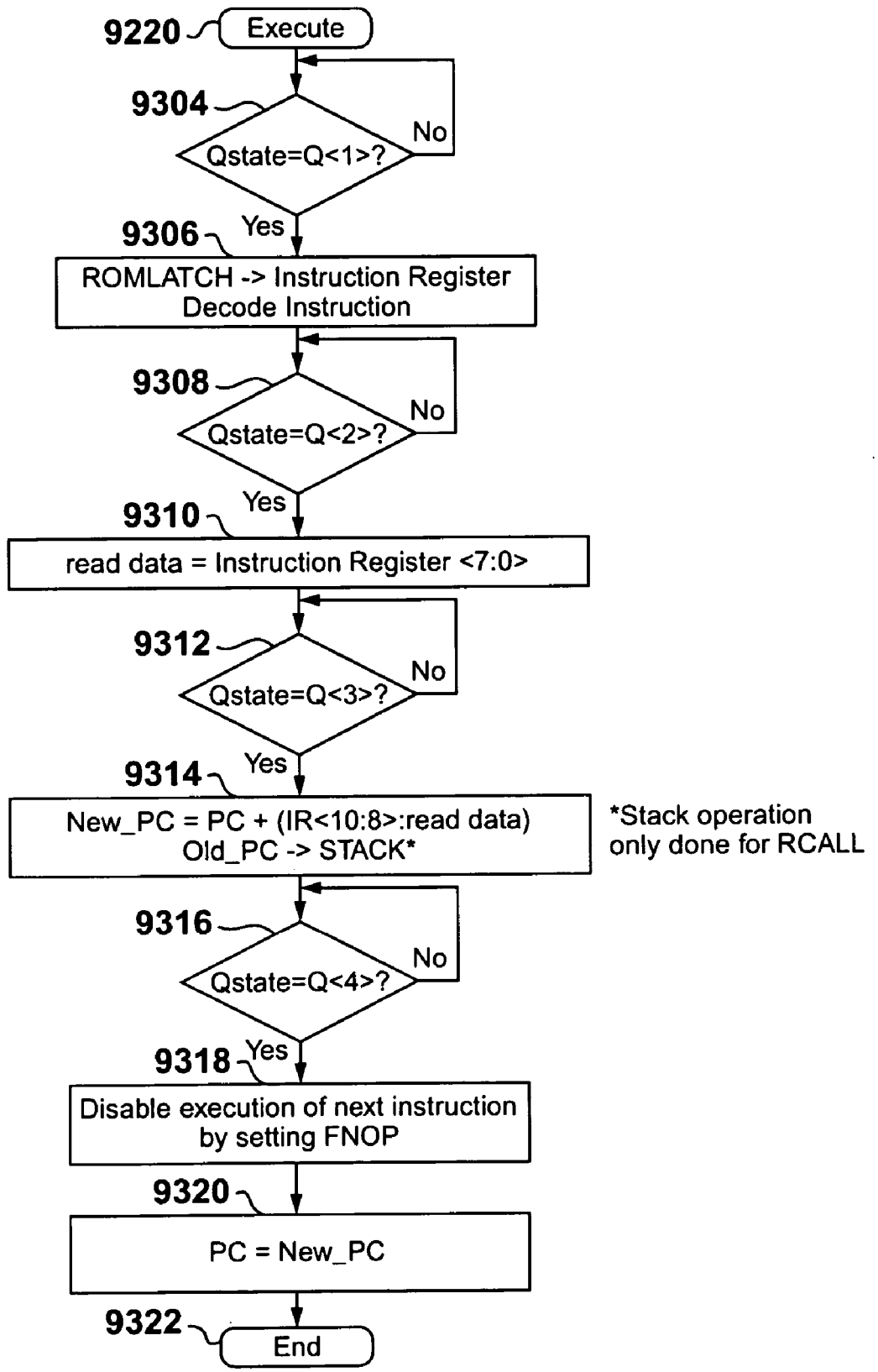
FIG. 93 is a flow chart for BRA and RCALL (Execute) instructions of the present invention.
Figure 94:
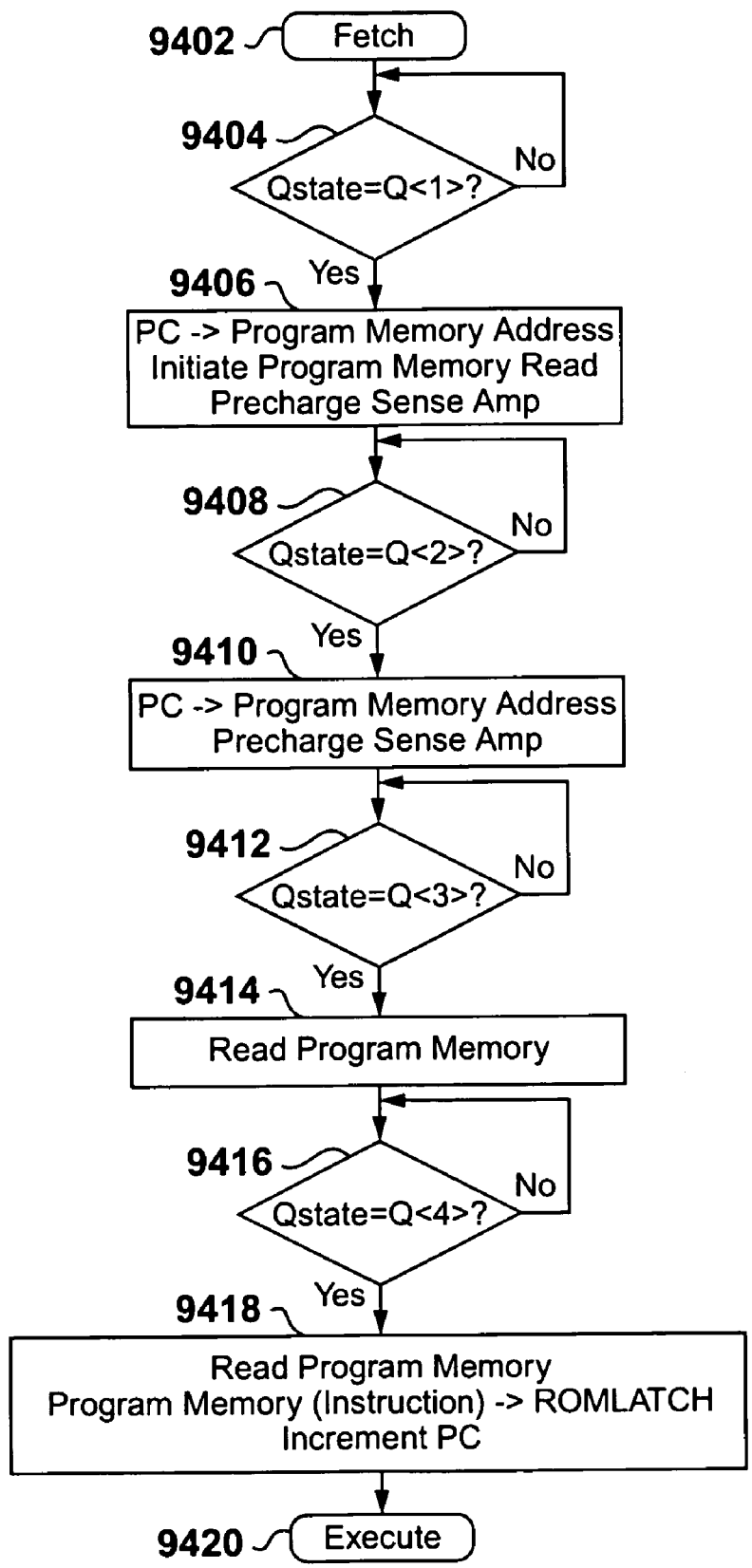
FIG. 94 is a flow chart for PUSH (Fetch) instruction of the present invention.
Figure 95:
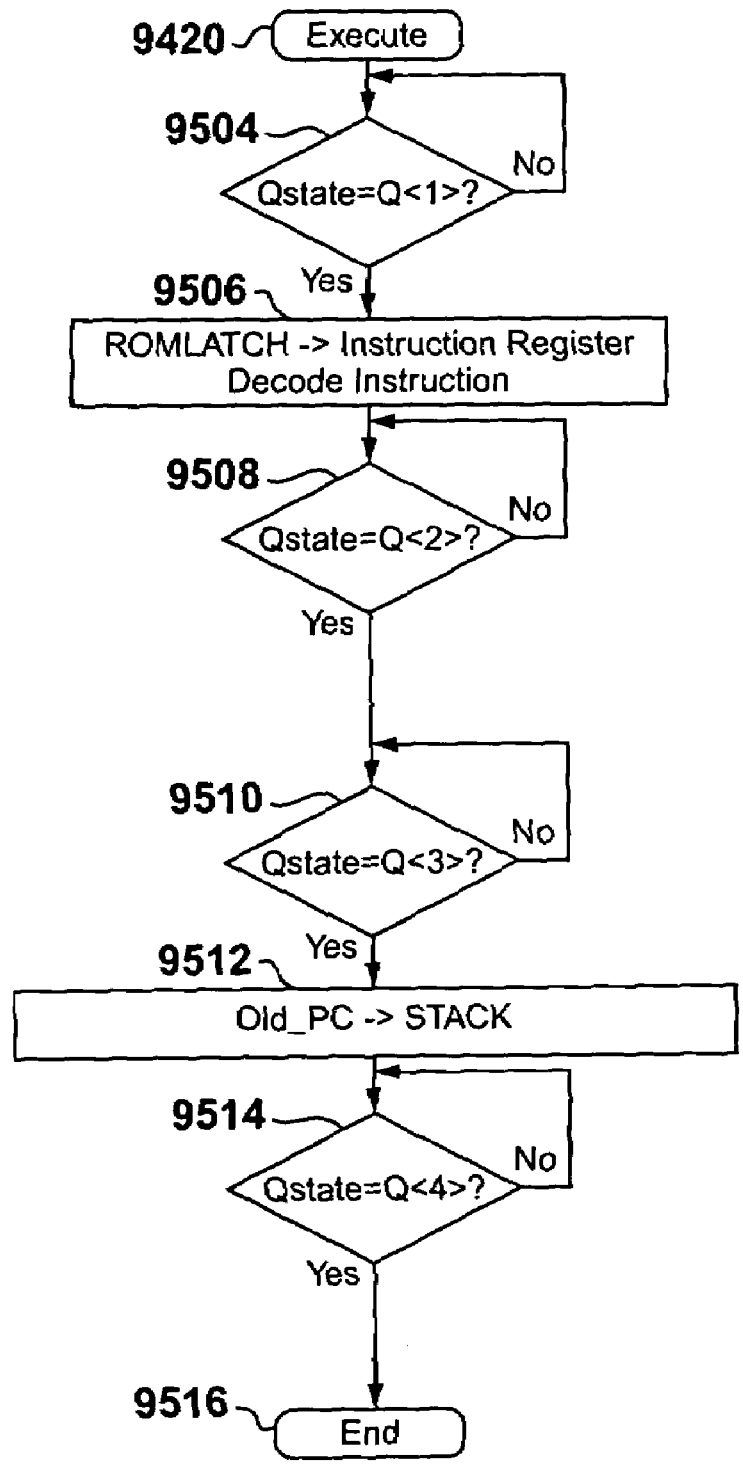
FIG. 95 is a flow chart for PUSH (Execute) instruction of the present invention.
Figure 96:
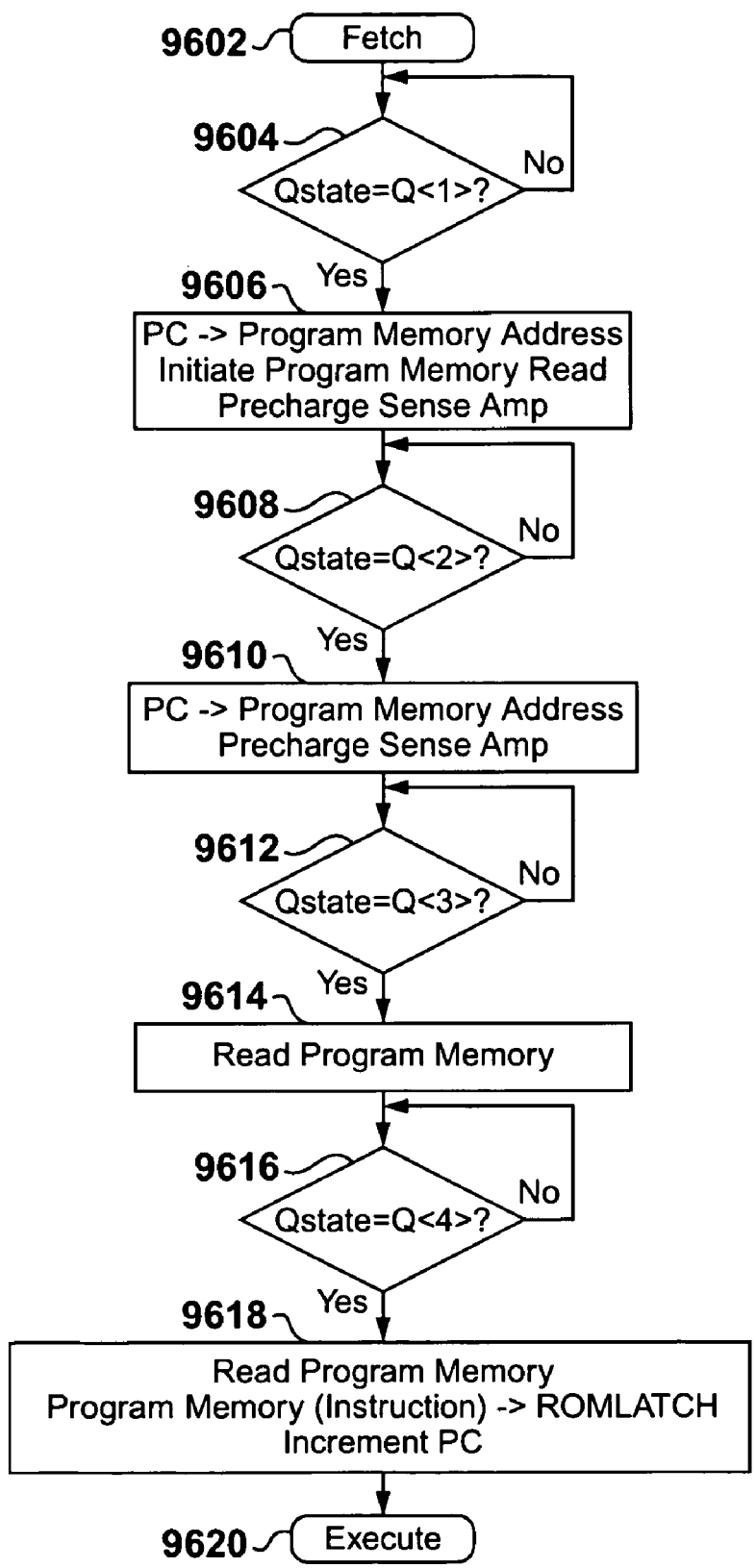
FIG. 96 is a flow chart for POP (Fetch) instruction of the present invention.
Figure 97:
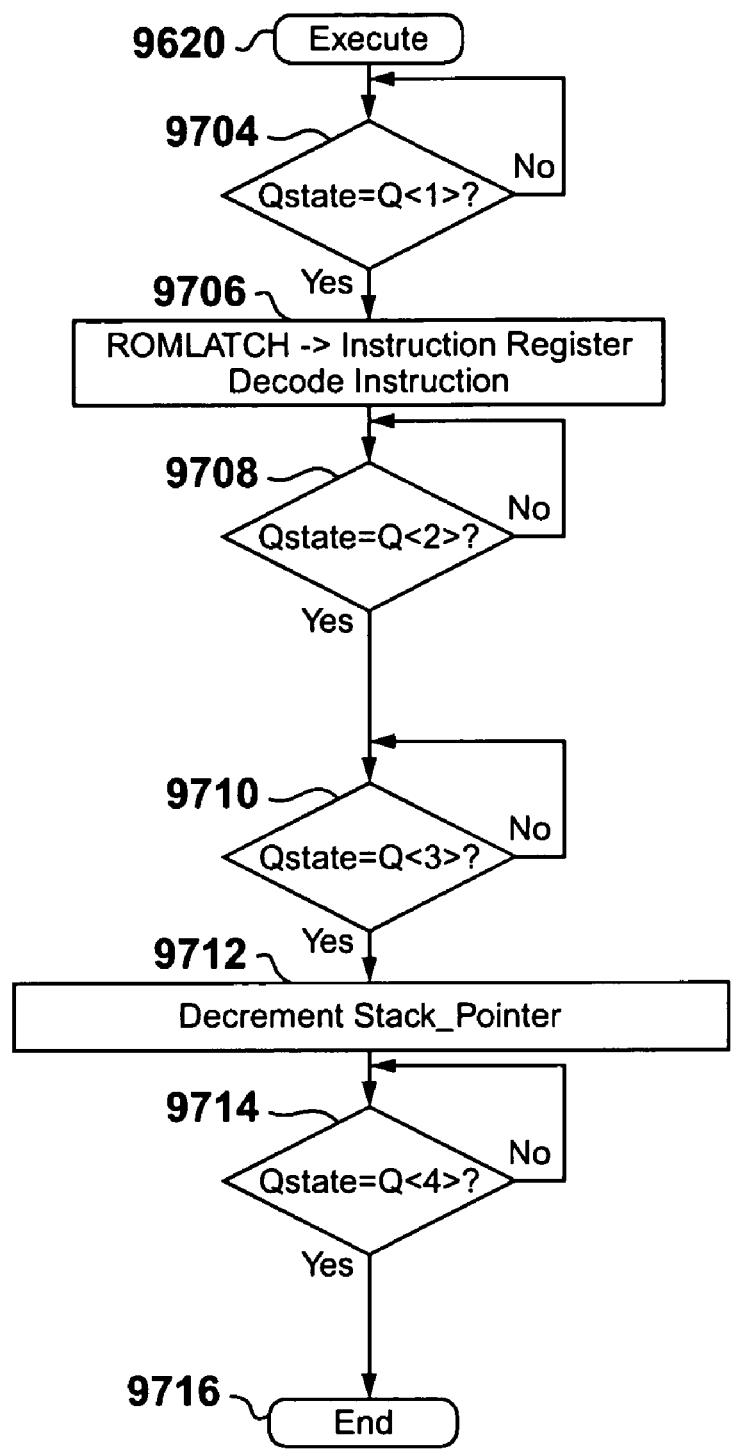
FIG. 97 is a flow chart for POP (Execute) instruction of the present invention.
Figure 98:
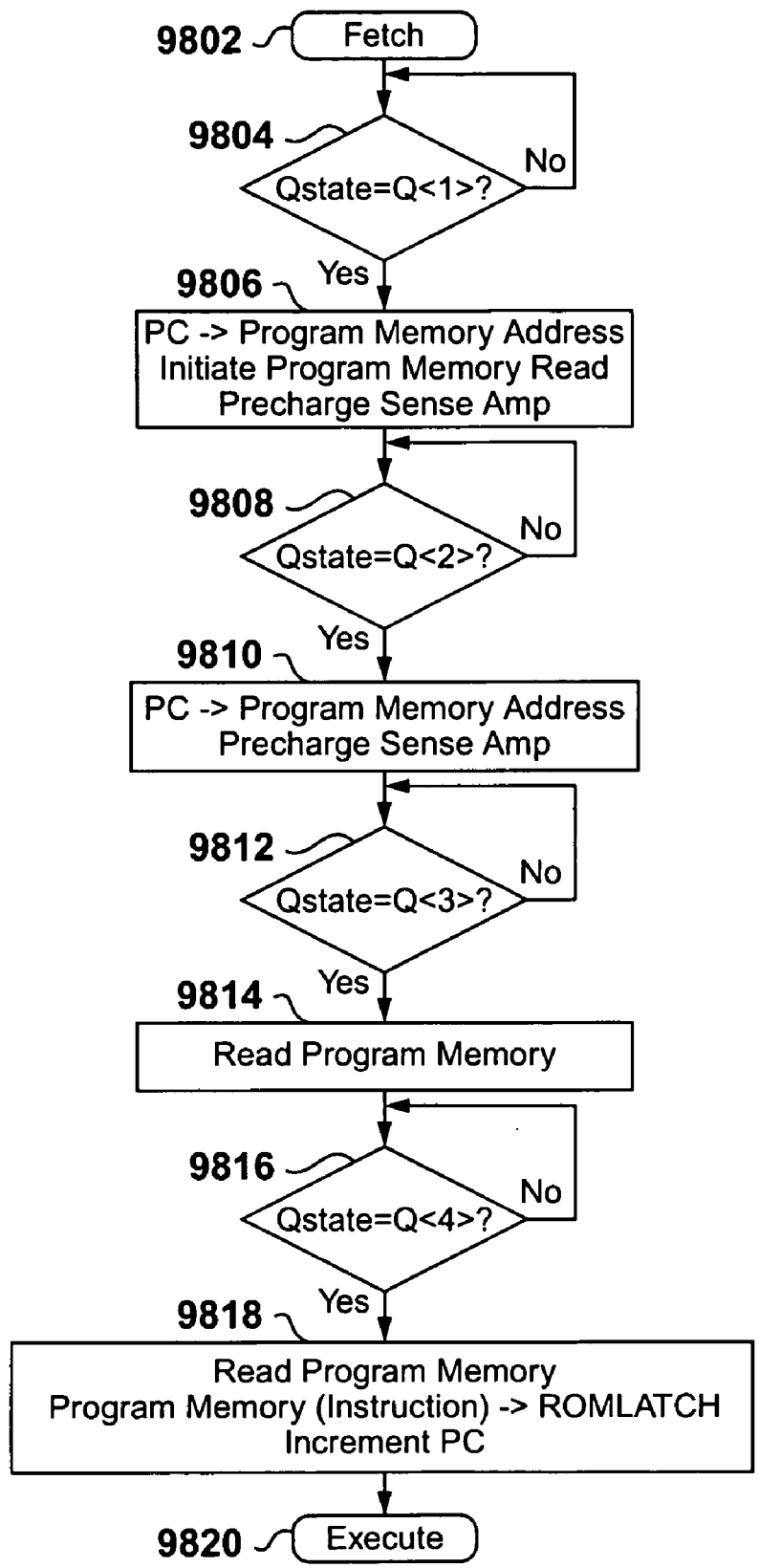
FIG. 98 is a flow chart for RETURN and RETFIE (Fetch) instructions of the present invention.
Figure 99:
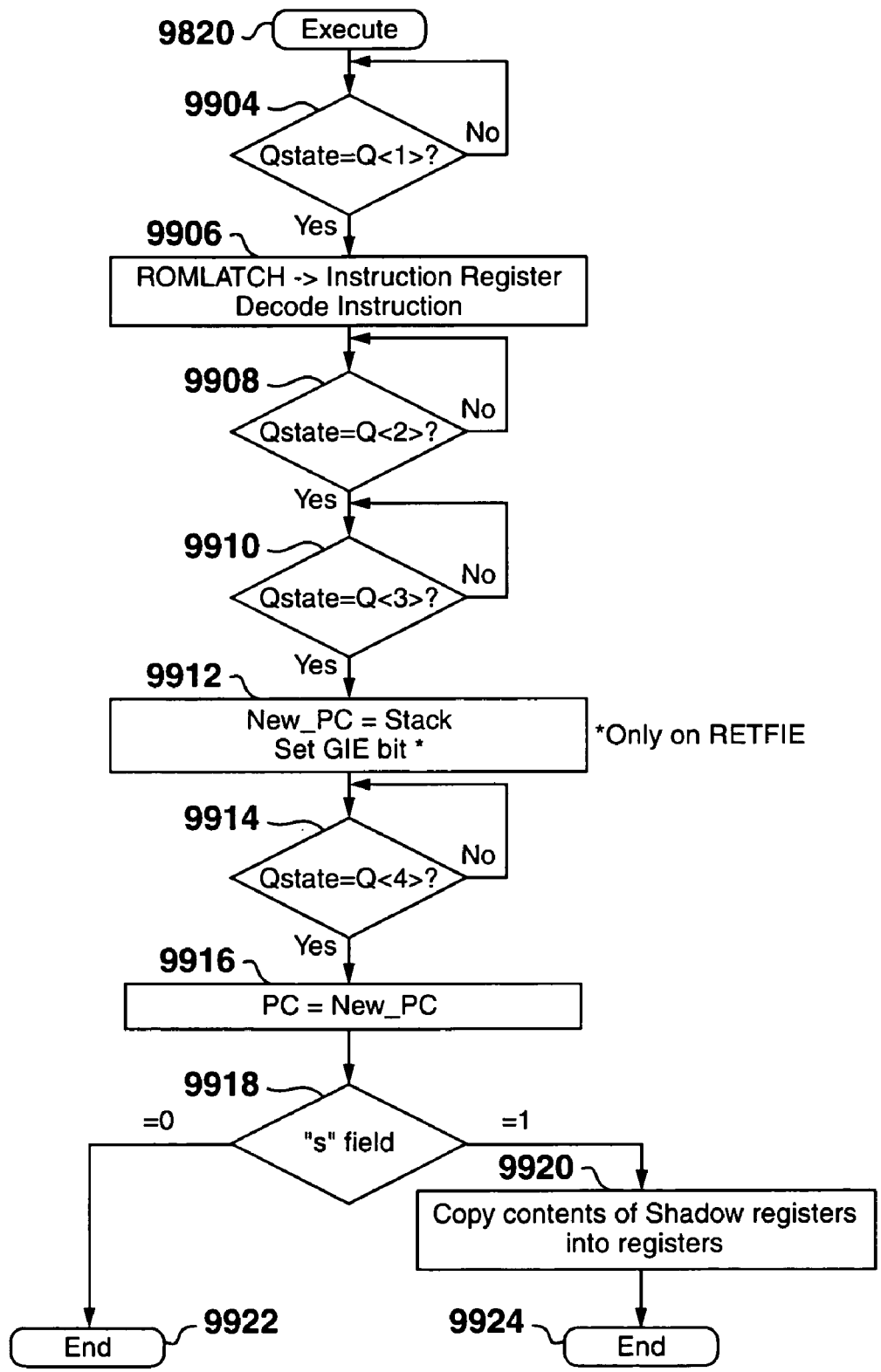
FIG. 99 is a flow chart for RETURN and RETFIE (Execute) instructions of the present invention.
Figure 100:
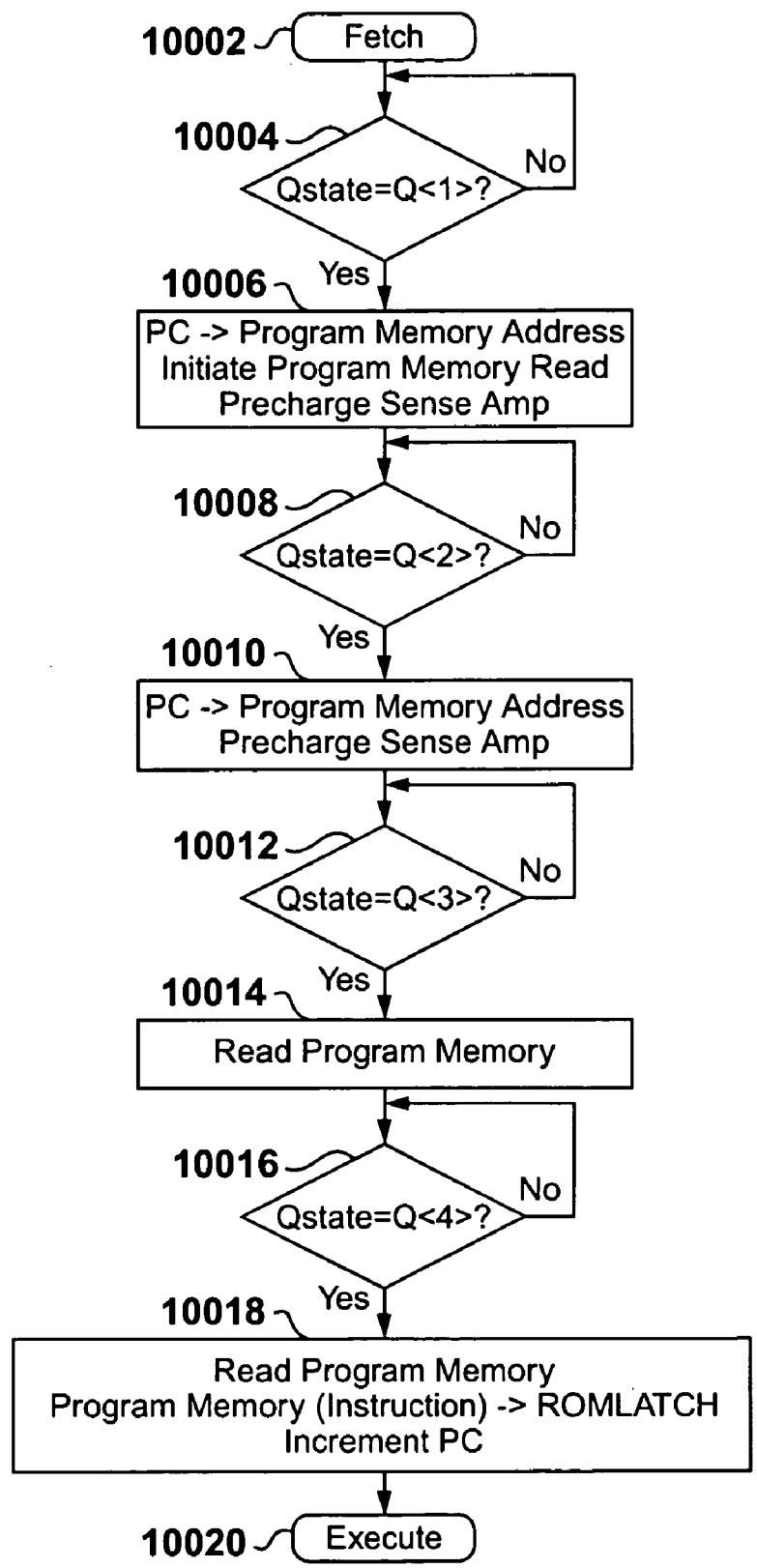
FIG. 100 is a flow chart for RETLW (Fetch) instruction of the present invention.
Figure 101:
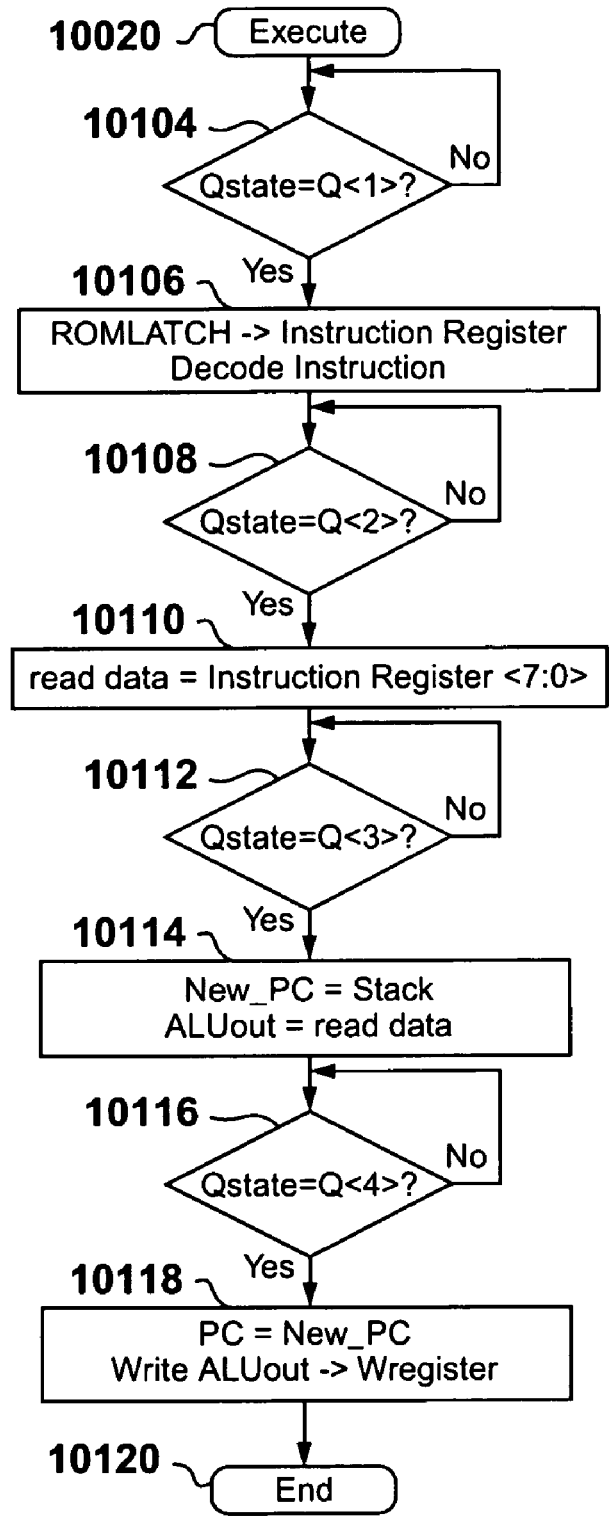
FIG. 101 is a flow chart for RETLW (Execute) instruction of the present invention.

FIG. 90 shows a flow chart for the fetching of the Branch Operations, which includes the instructions: BC, BN, BNC, BNN, BNV, BNZ, BV, and BZ. Similarly, FIG. 90 shows a flow chart for the execution of the Branch Operations, which includes the instructions: BC, BN, BNC, BNN, BNV, BNZ, BV, and BZ. The remaining figures show the steps of fetching and execution of the other instructions within the instruction set.

Figure 70:
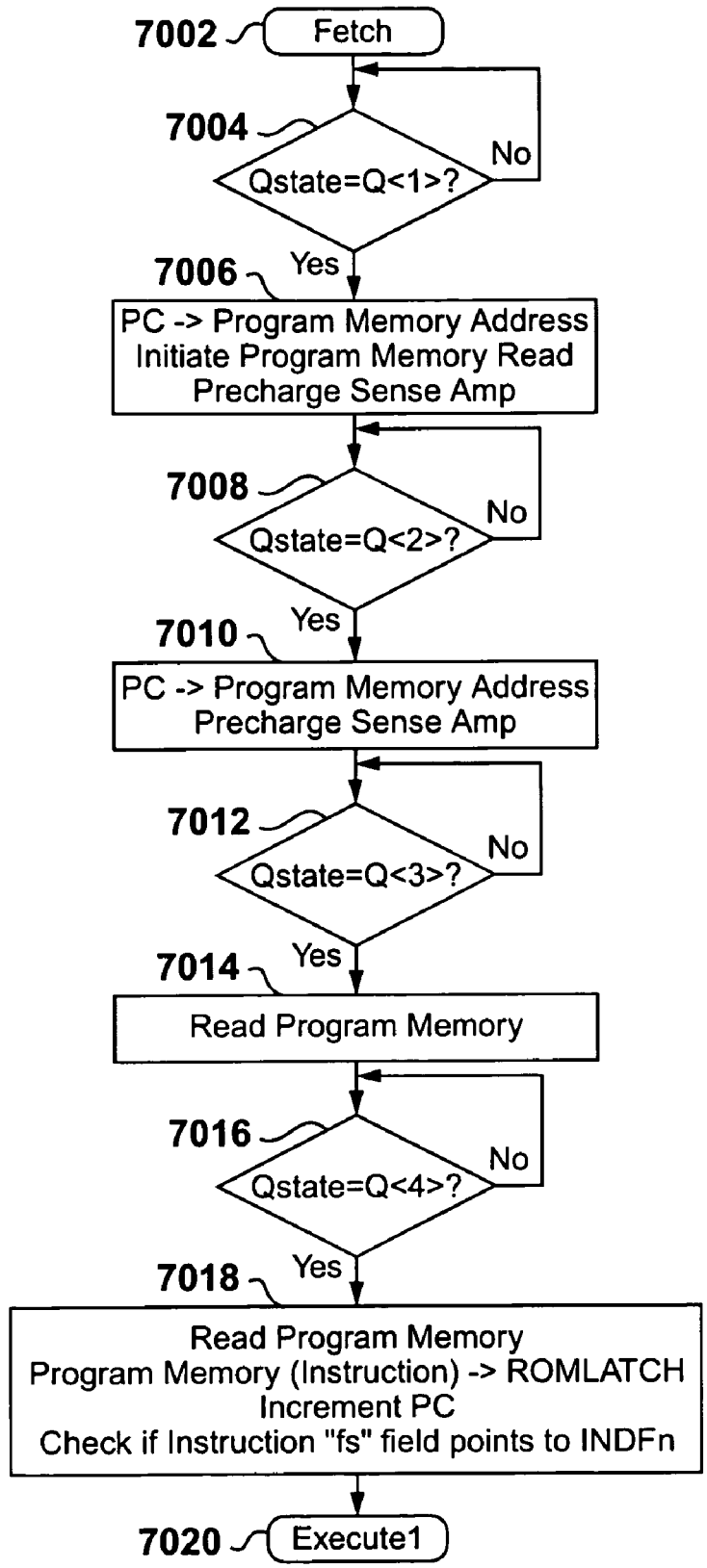
FIG. 70 is a flowchart for the MULFF (Fetch) instruction of the present invention.
Figure 71:
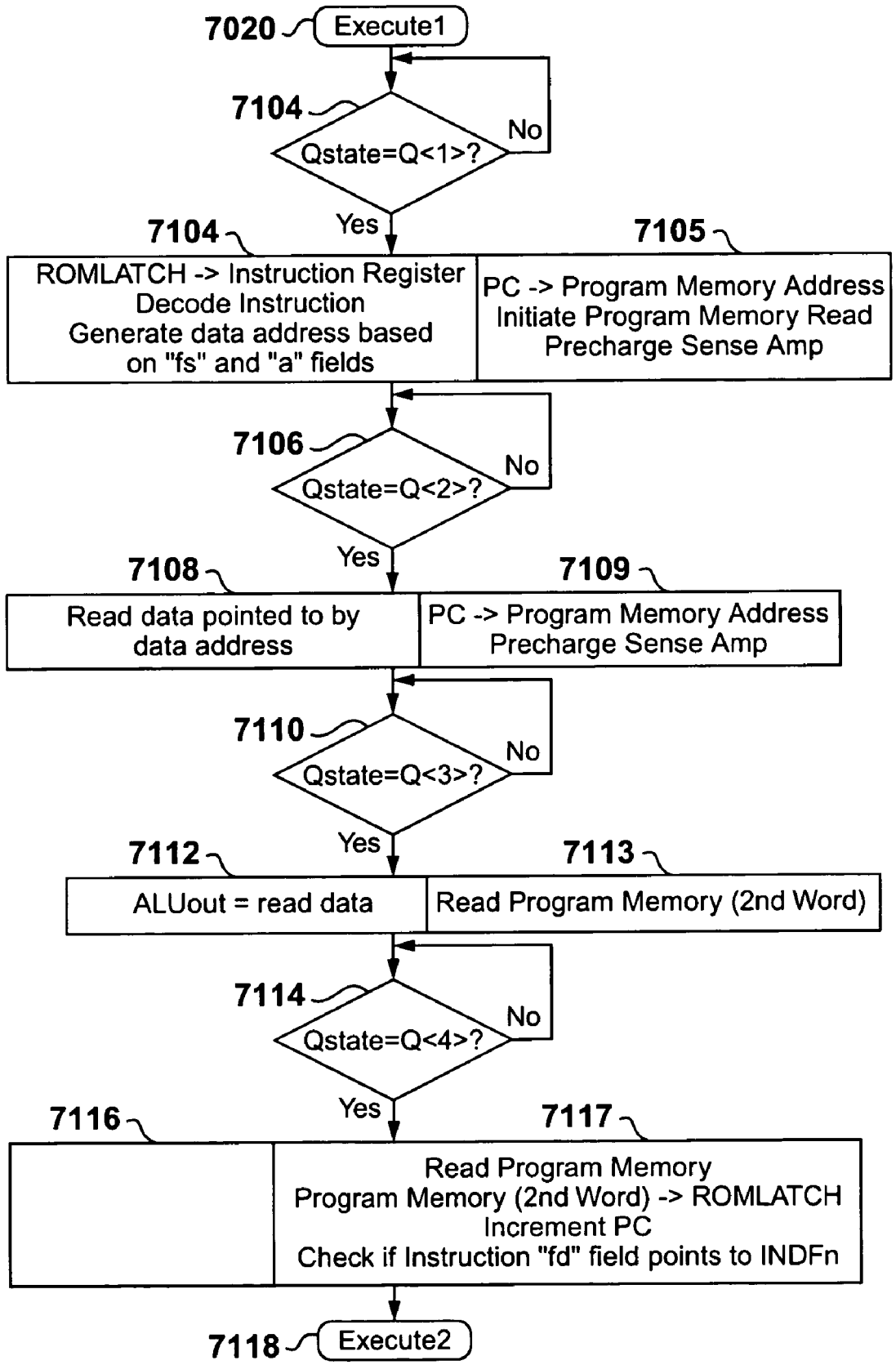
FIG. 71 is a flowchart for the MULFF (Execute1) instruction of the present invention.
Figure 72:
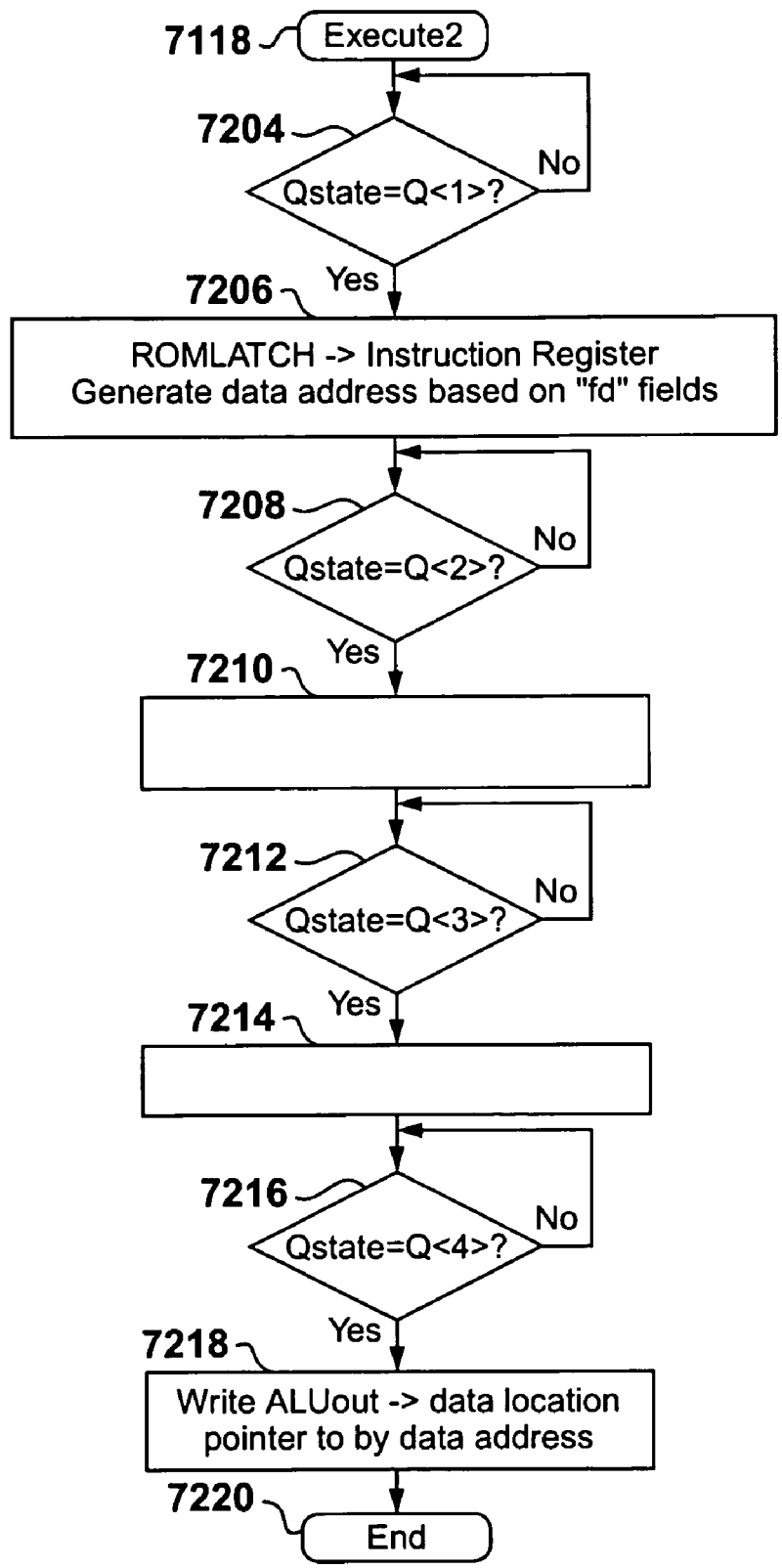
FIG. 72 is a flowchart for the MULFF (Execute2) instruction of the present invention.
Figure 73:
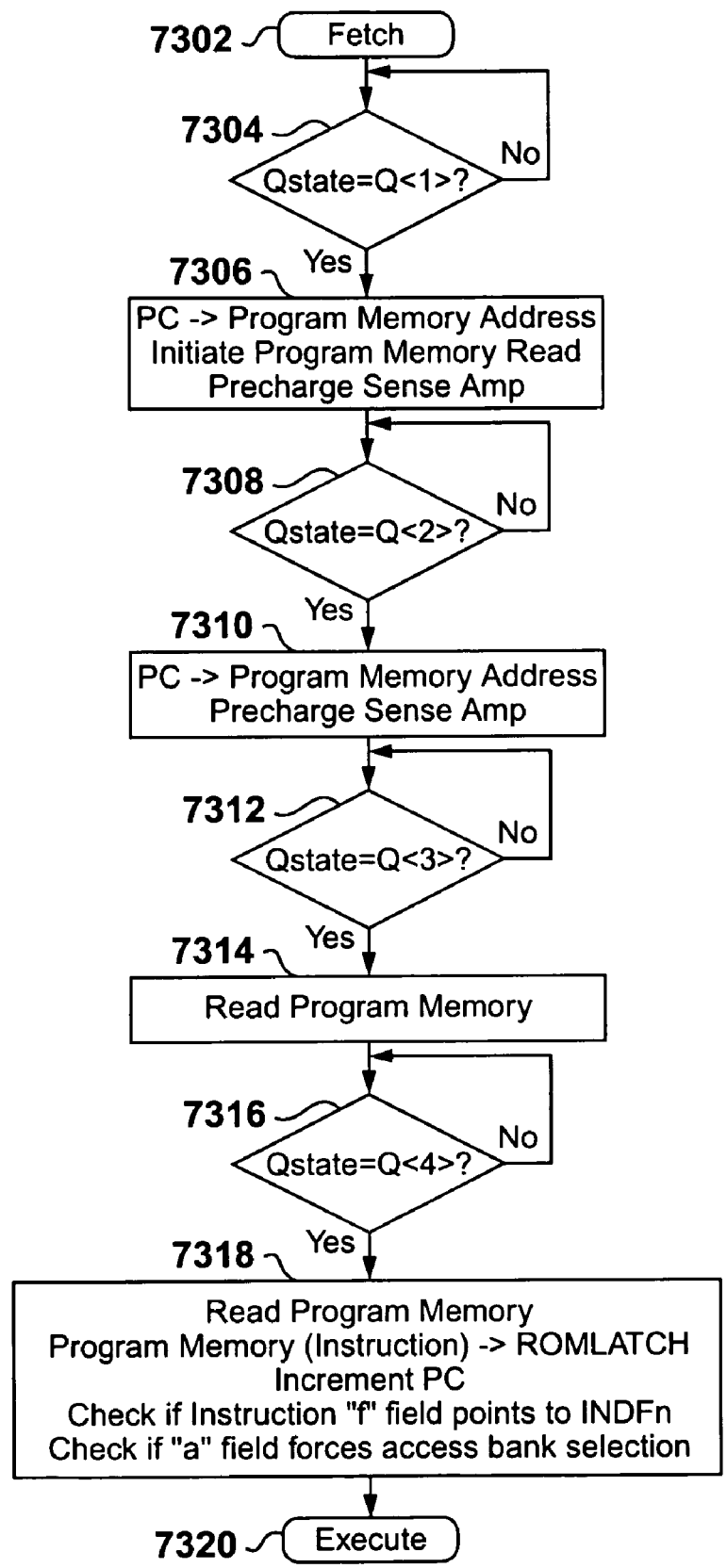
FIG. 73 is a flowchart for the BCF, BSF, BTG (Fetch) instructions of the present invention.
Figure 74:
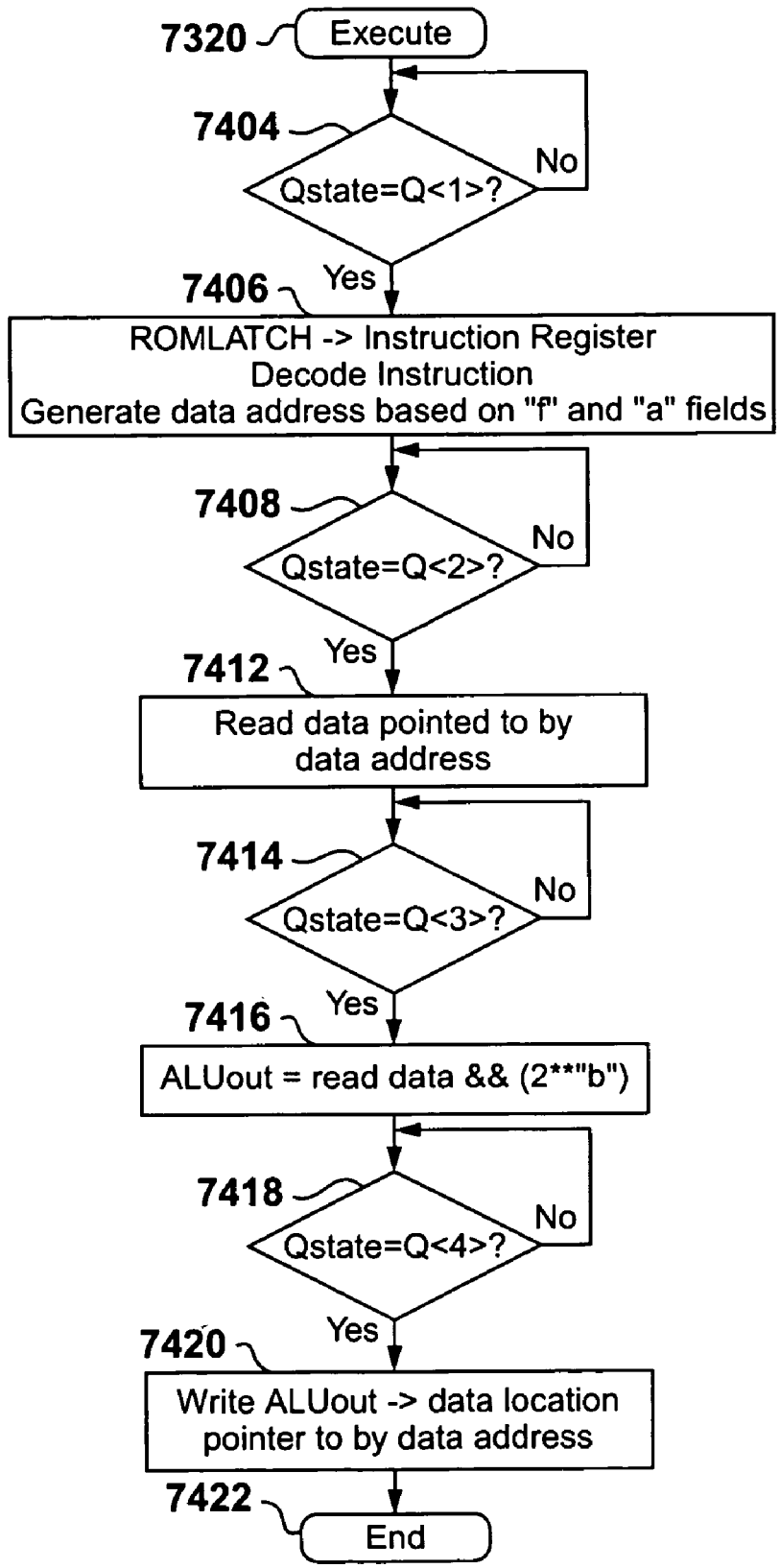
FIG. 74 is a flowchart for the BCF, BSF, BTG (Fetch) instructions of the present invention.
Figure 75:
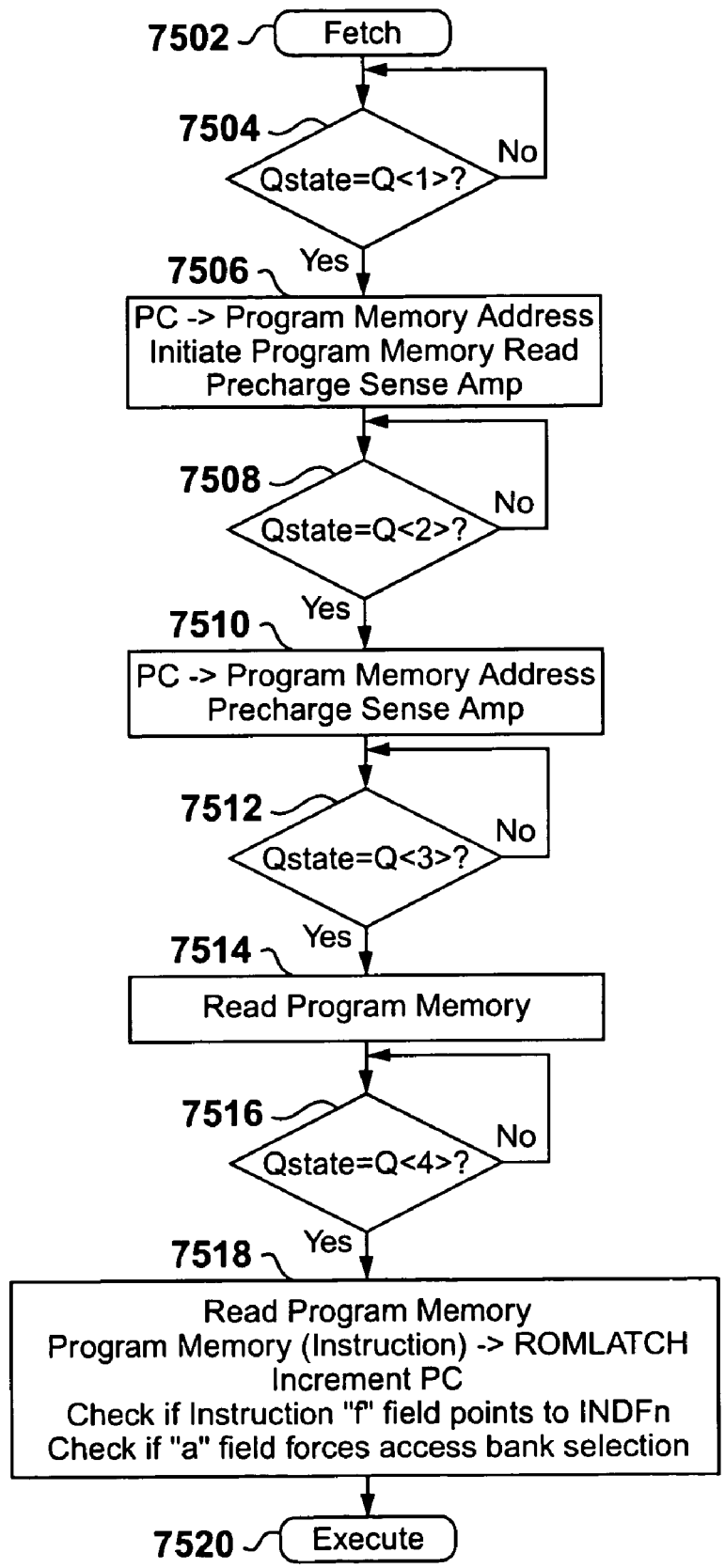
FIG. 75 is a flowchart for the BTFSC and BTFSS (Fetch) instructions of the present invention.
Figure 76:
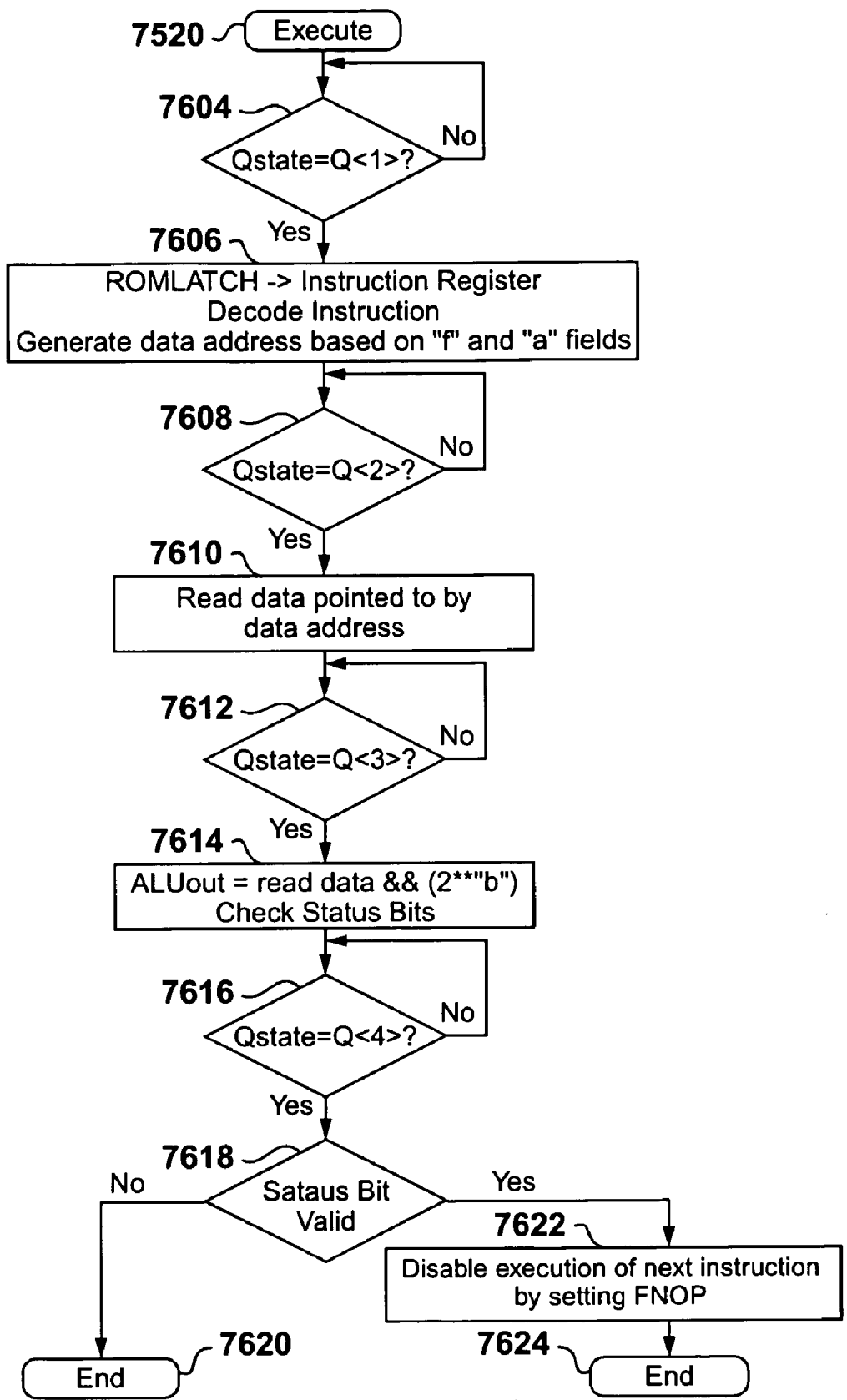
FIG. 76 is a flowchart for the BTFSC and BTFSS (Execute) instructions of the present invention.
Figure 79:
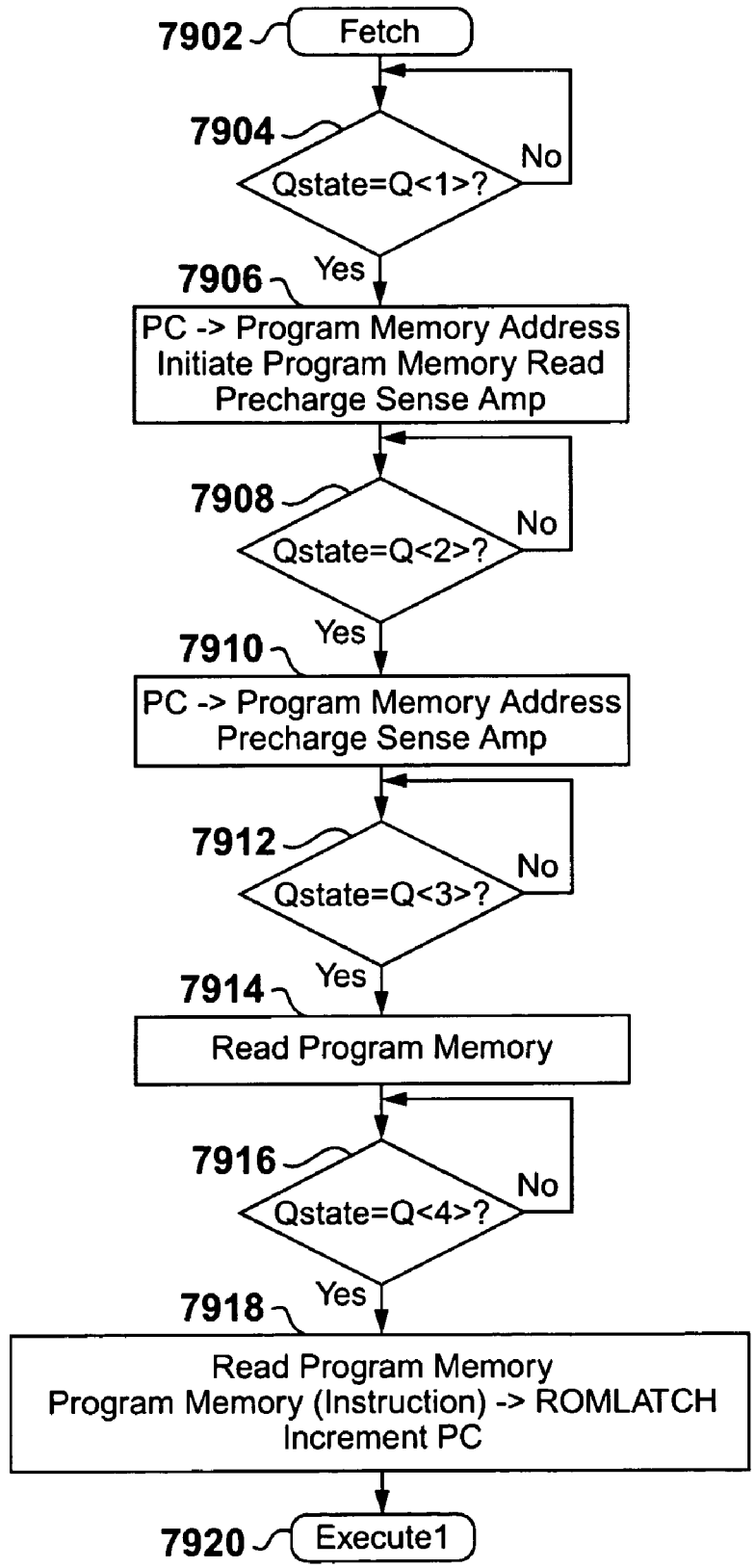
FIG. 79 is a flowchart for the LFSR (Fetch) instruction of the present invention.
Figure 80:
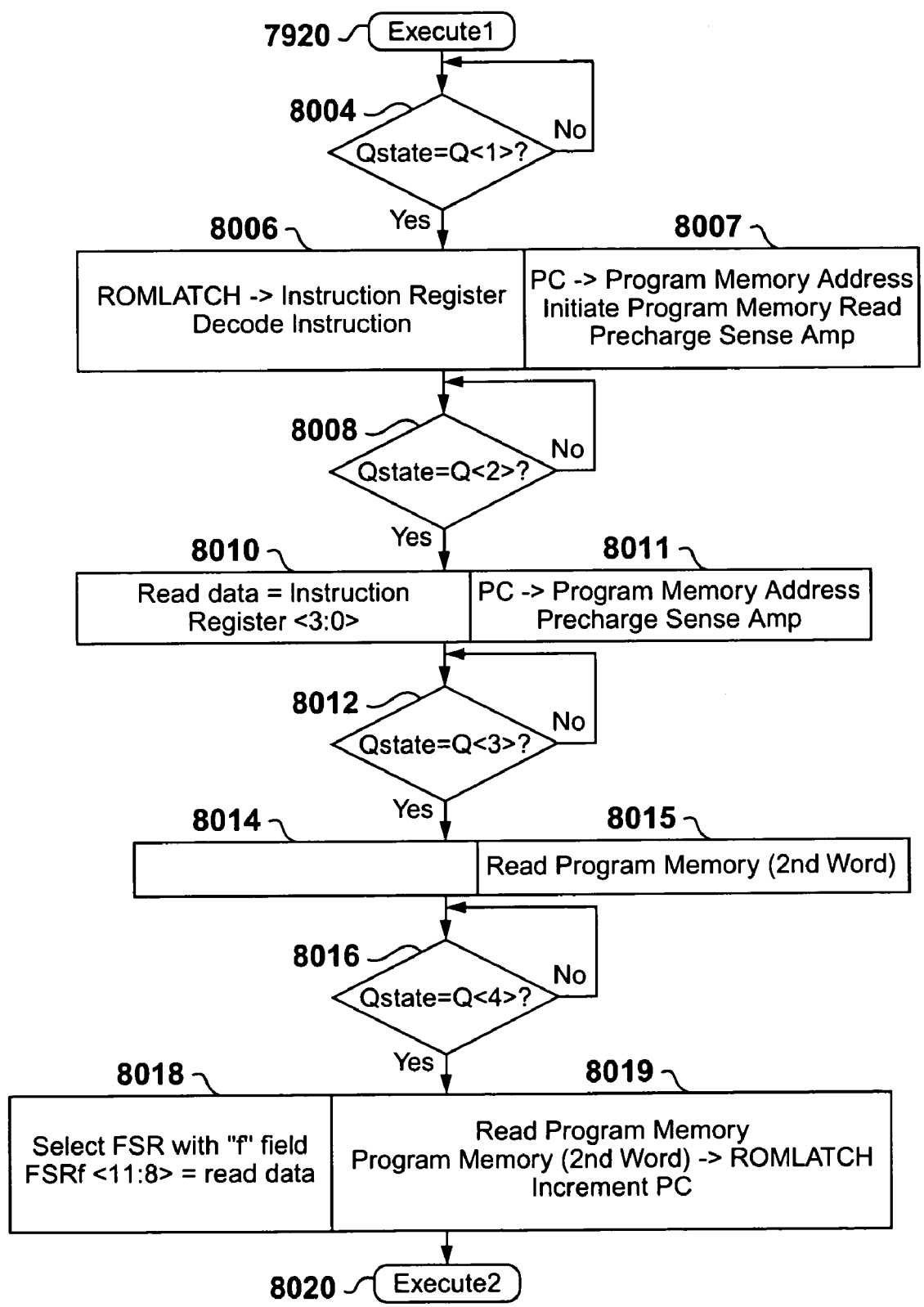
FIG. 80 is a flowchart for the LFSR (Execute1) instruction of the present invention.
Figure 81:
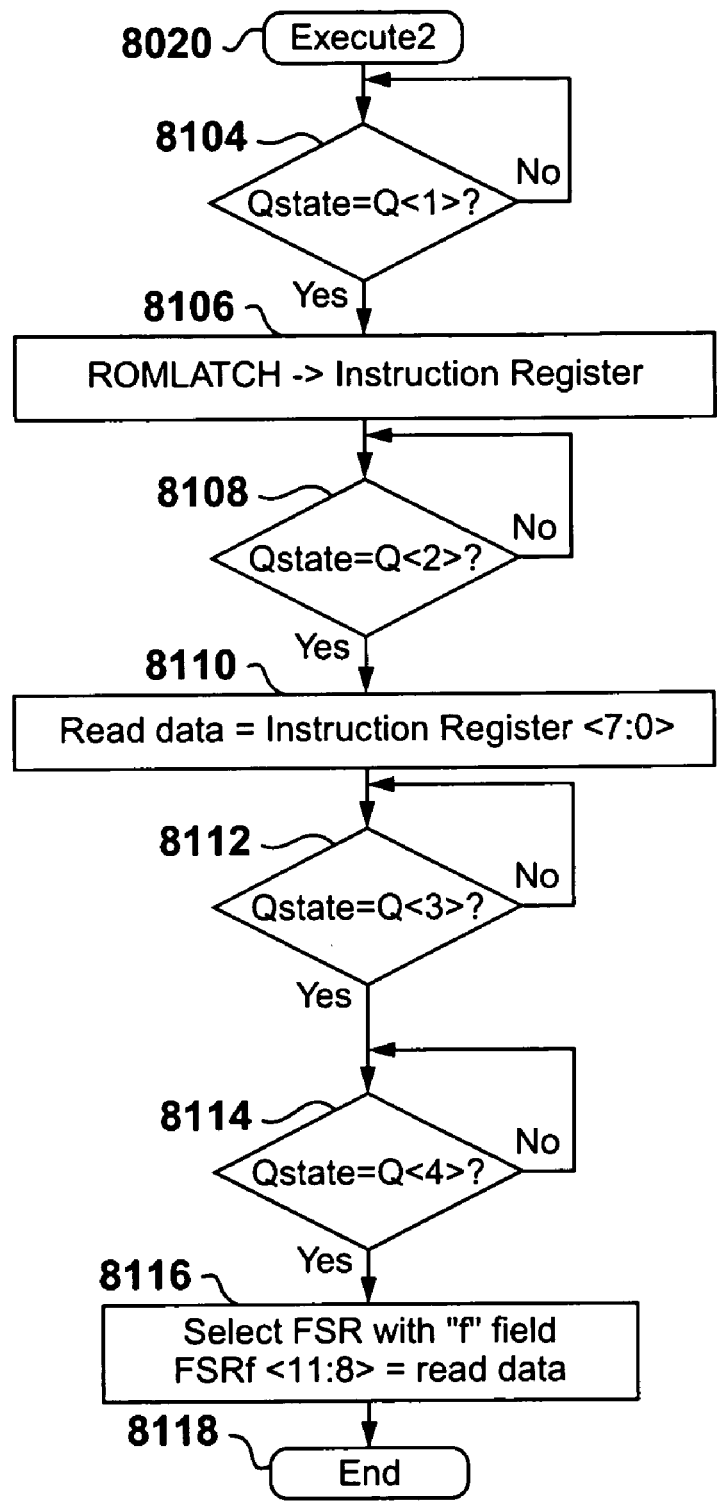
FIG. 81 is a flowchart for the LFSR (Execute2) instruction of the present invention.
Figure 82:
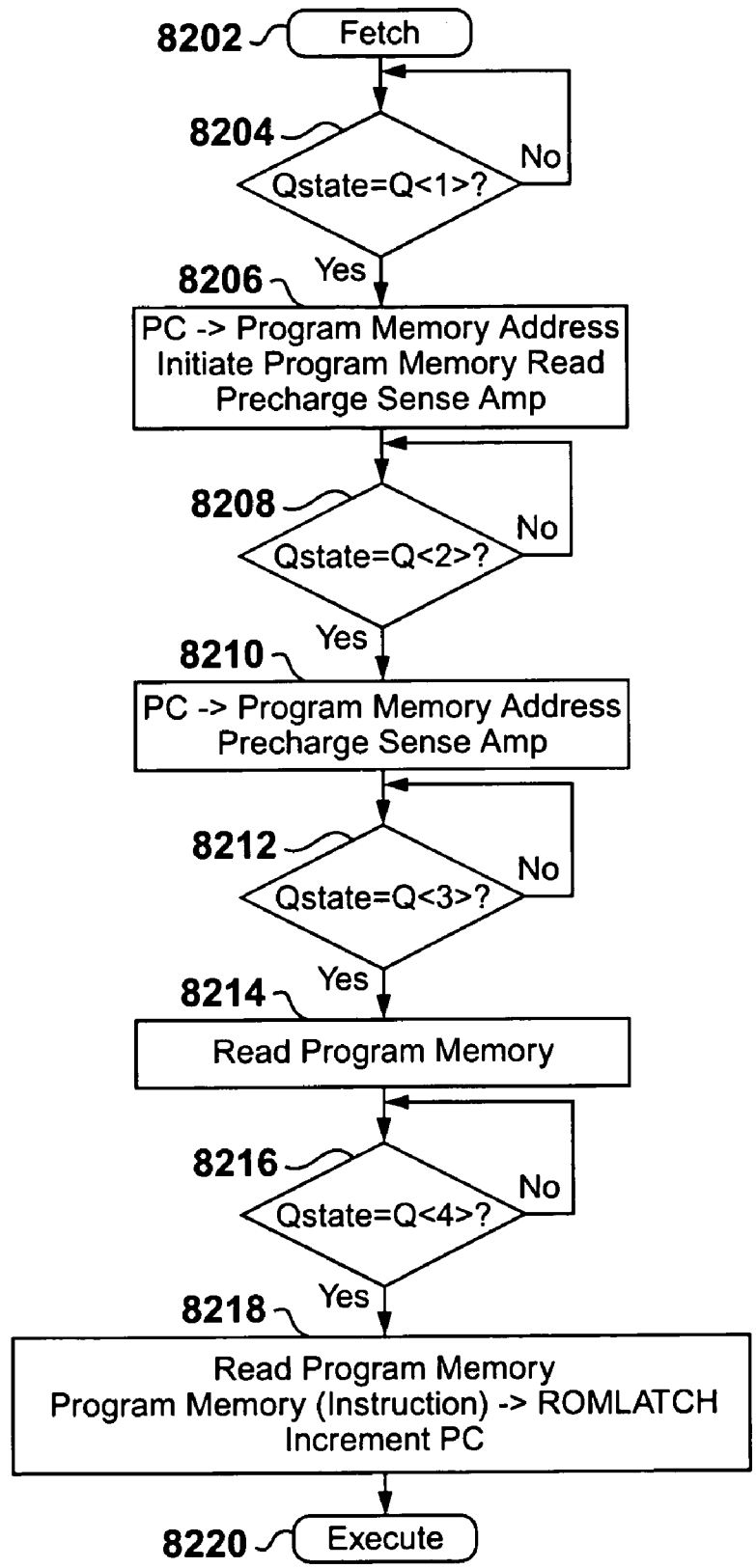
FIG. 82 is a flowchart for the DAW (Fetch) instruction of the present invention.
Figure 83:
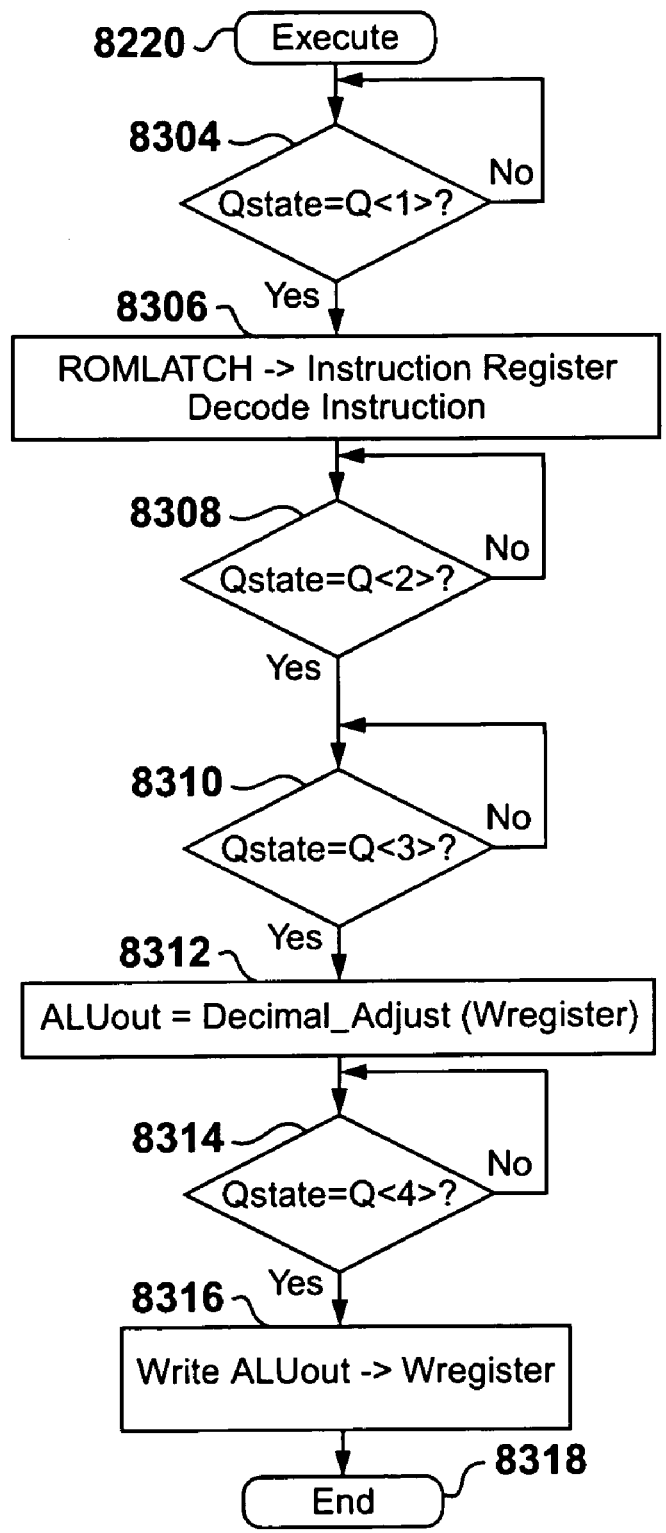
FIG. 83 is a flowchart for the DAW (Execute) instruction of the present invention.
Figure 84:
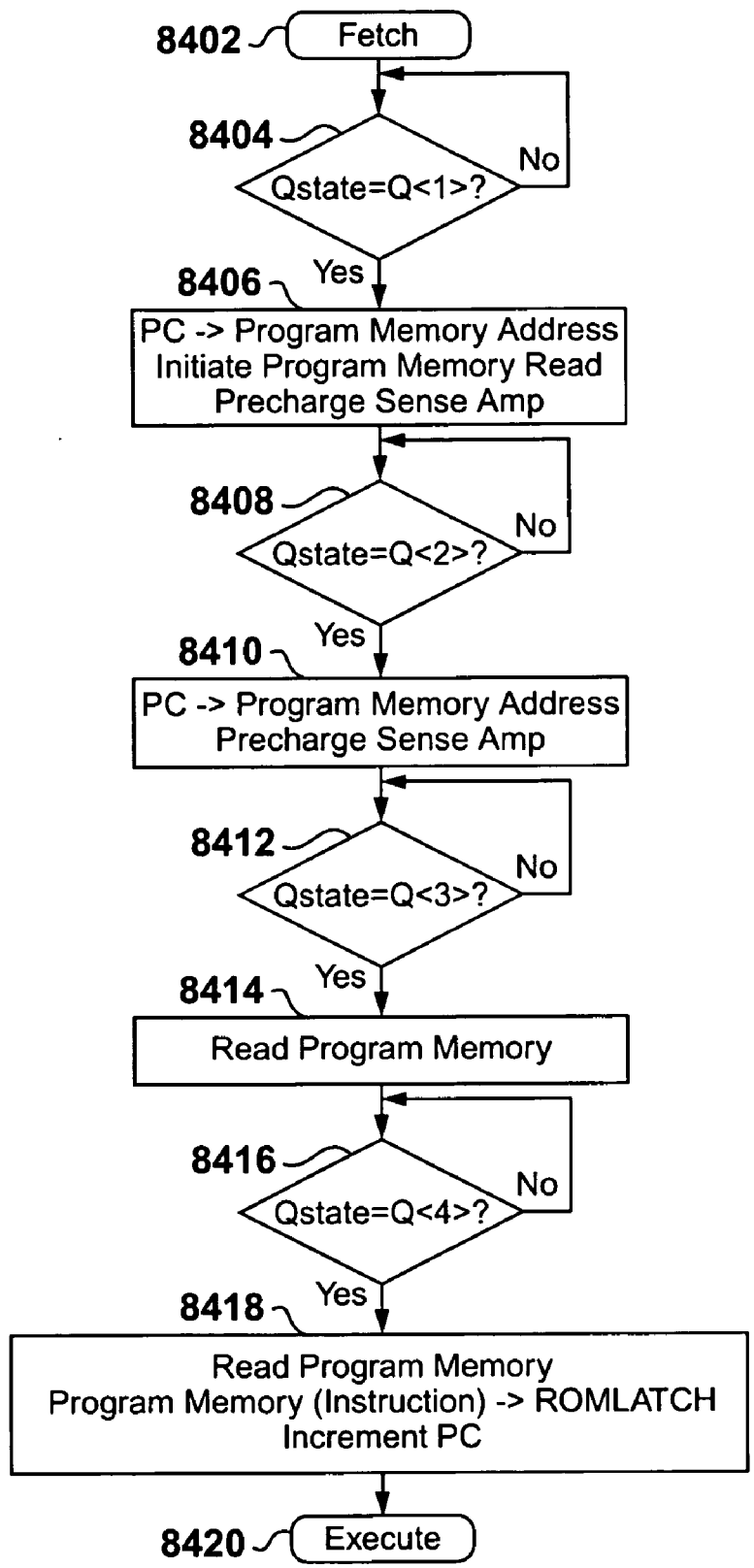
FIG. 84 is a flowchart for the MULLW (Fetch) instruction of the present invention.
Figure 85:
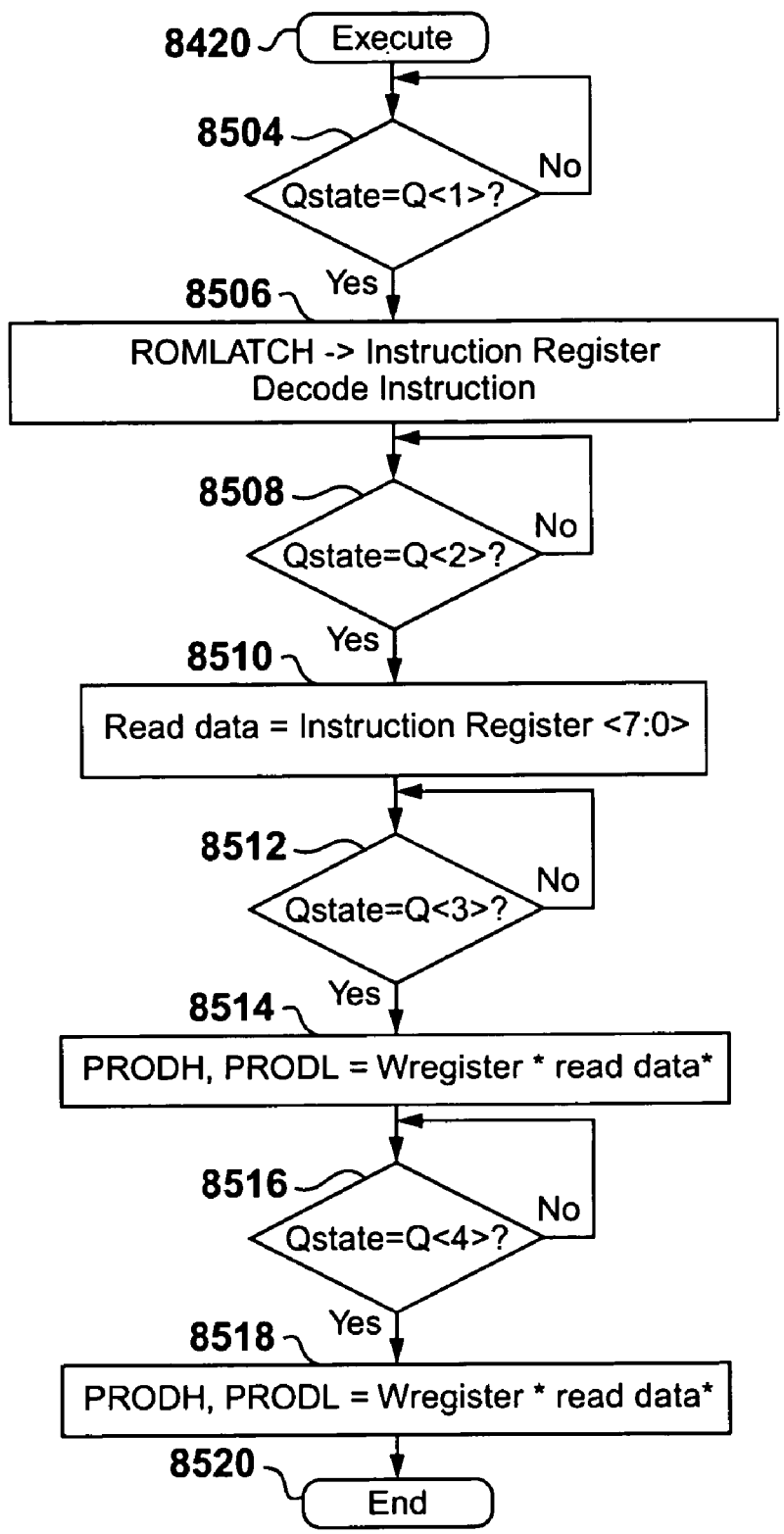
FIG. 85 is a flowchart for the MULLW (Execute) instruction of the present invention.
Figure 86:
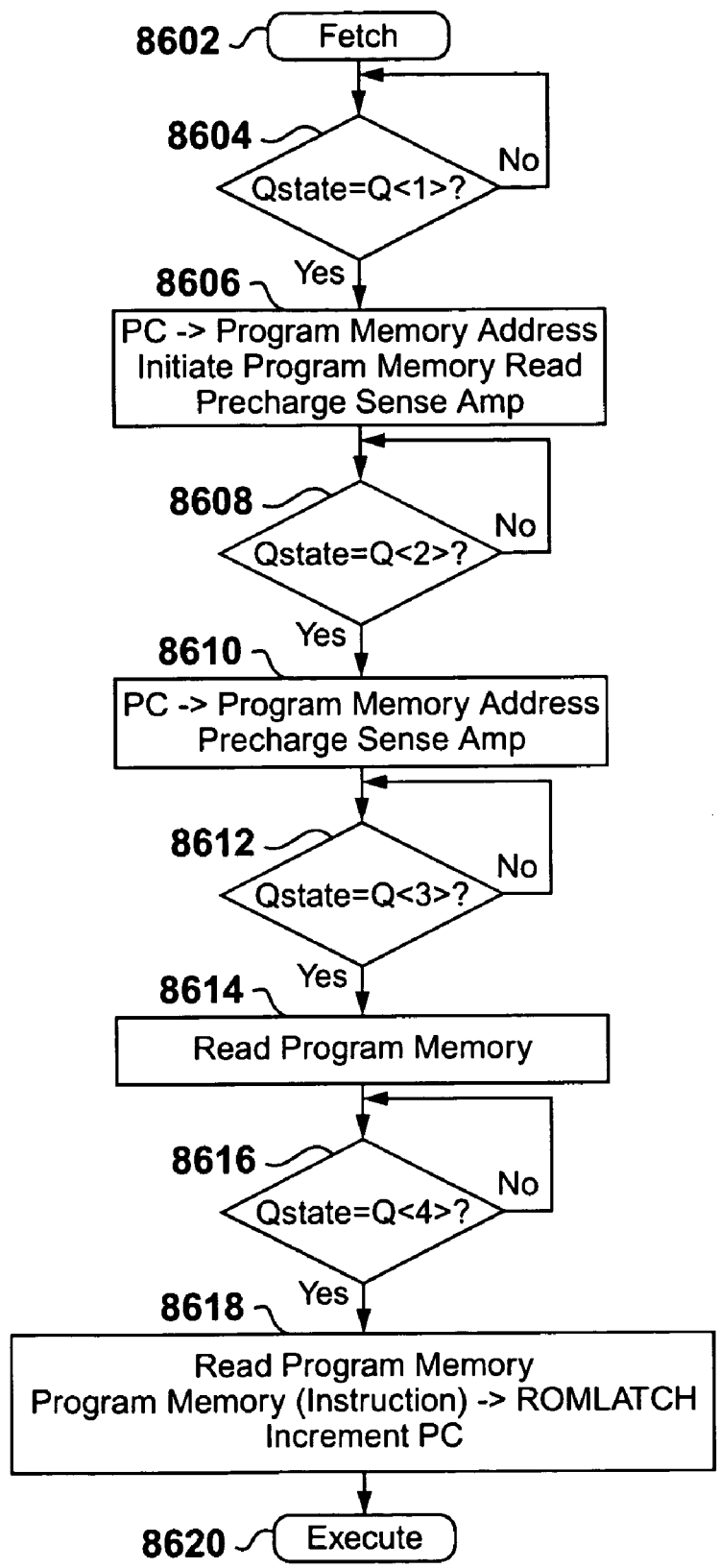
FIG. 86 is a flowchart for the CLRWDT, HALT, RESET, and SLEEP (Fetch) instructions of the present invention.
Figure 87:
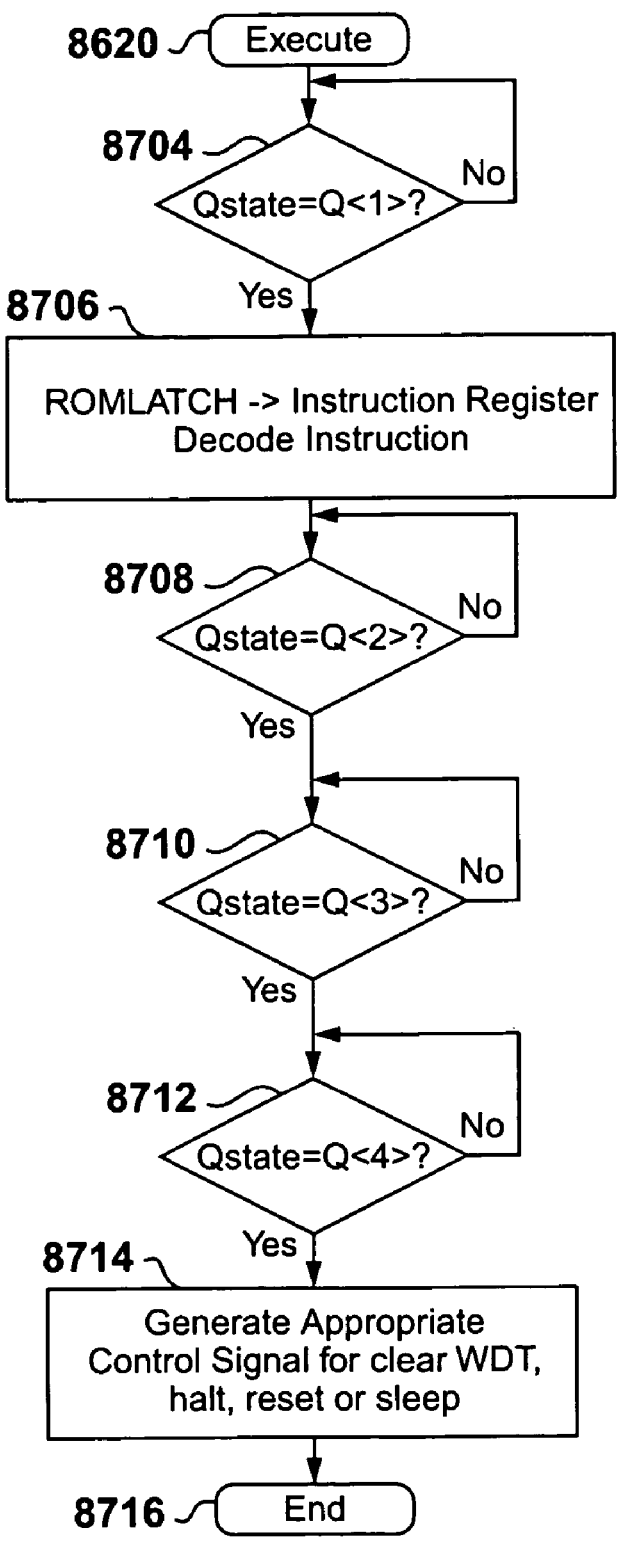
FIG. 87 is a flowchart for the CLRWDT, HALT, RESET, and SLEEP (Execute) instructions of the present invention.
Figure 88:
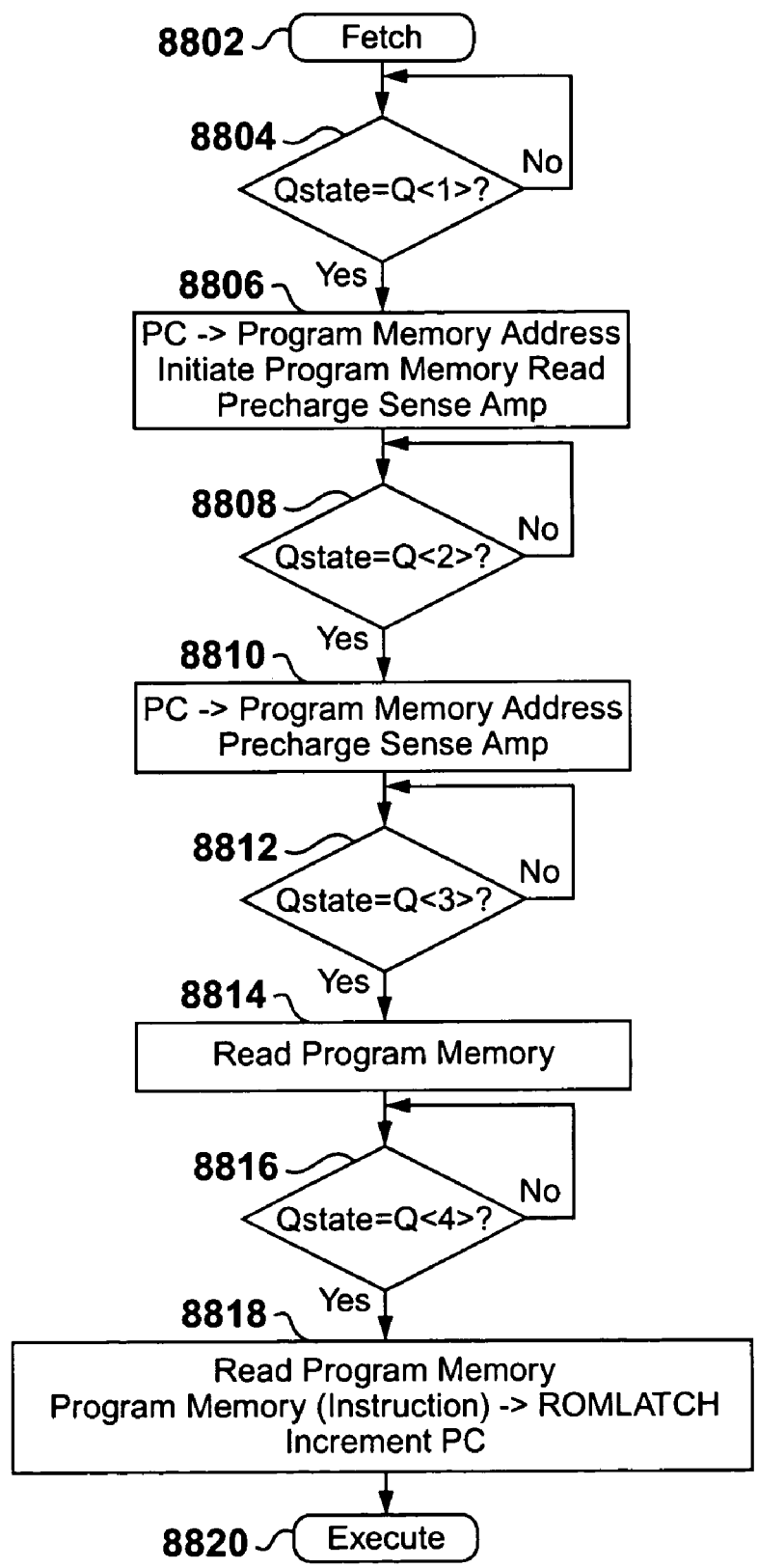
FIG. 88 is a flowchart for the MOVELB (Fetch) instruction of the present invention.
Figure 89:
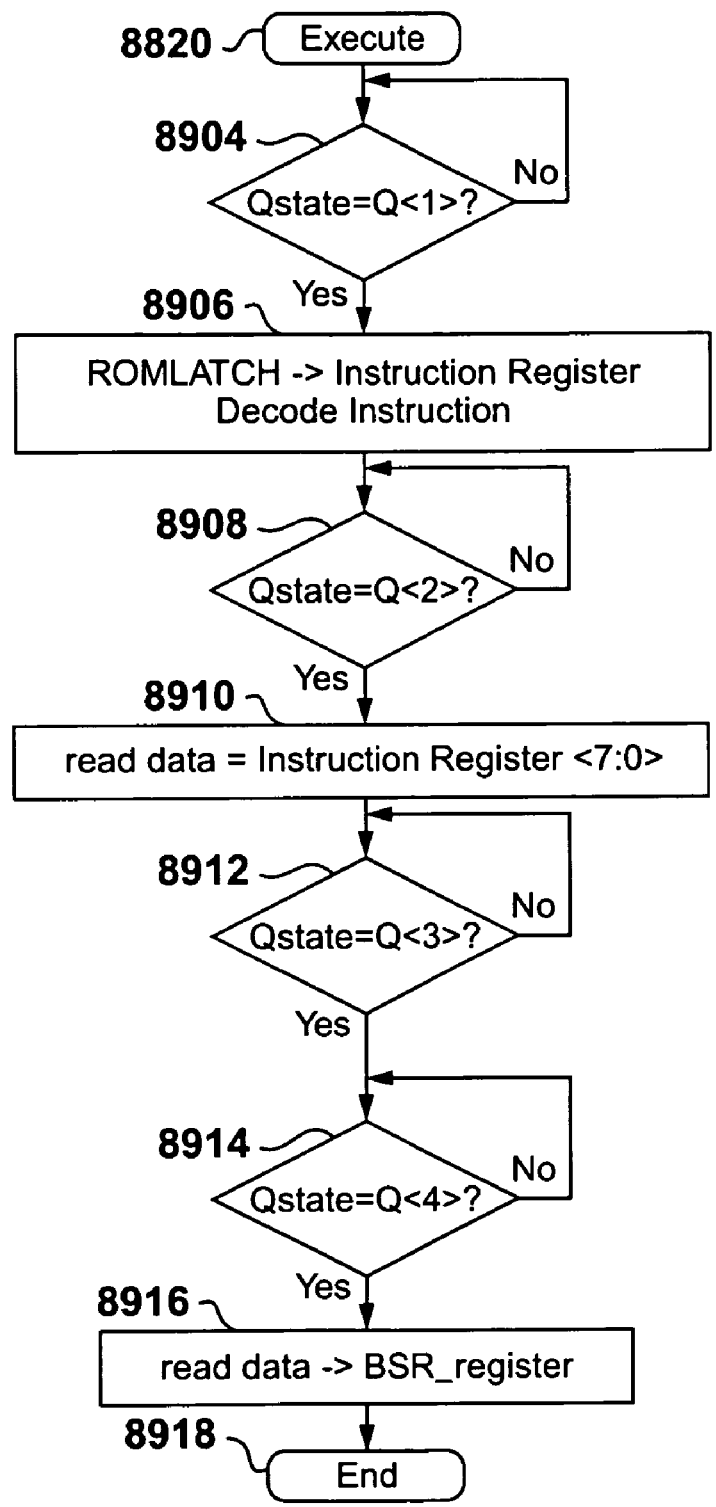
FIG. 89 is a flow chart for the MOVLB (Execute) instruction of the present invention.
Figure 102:
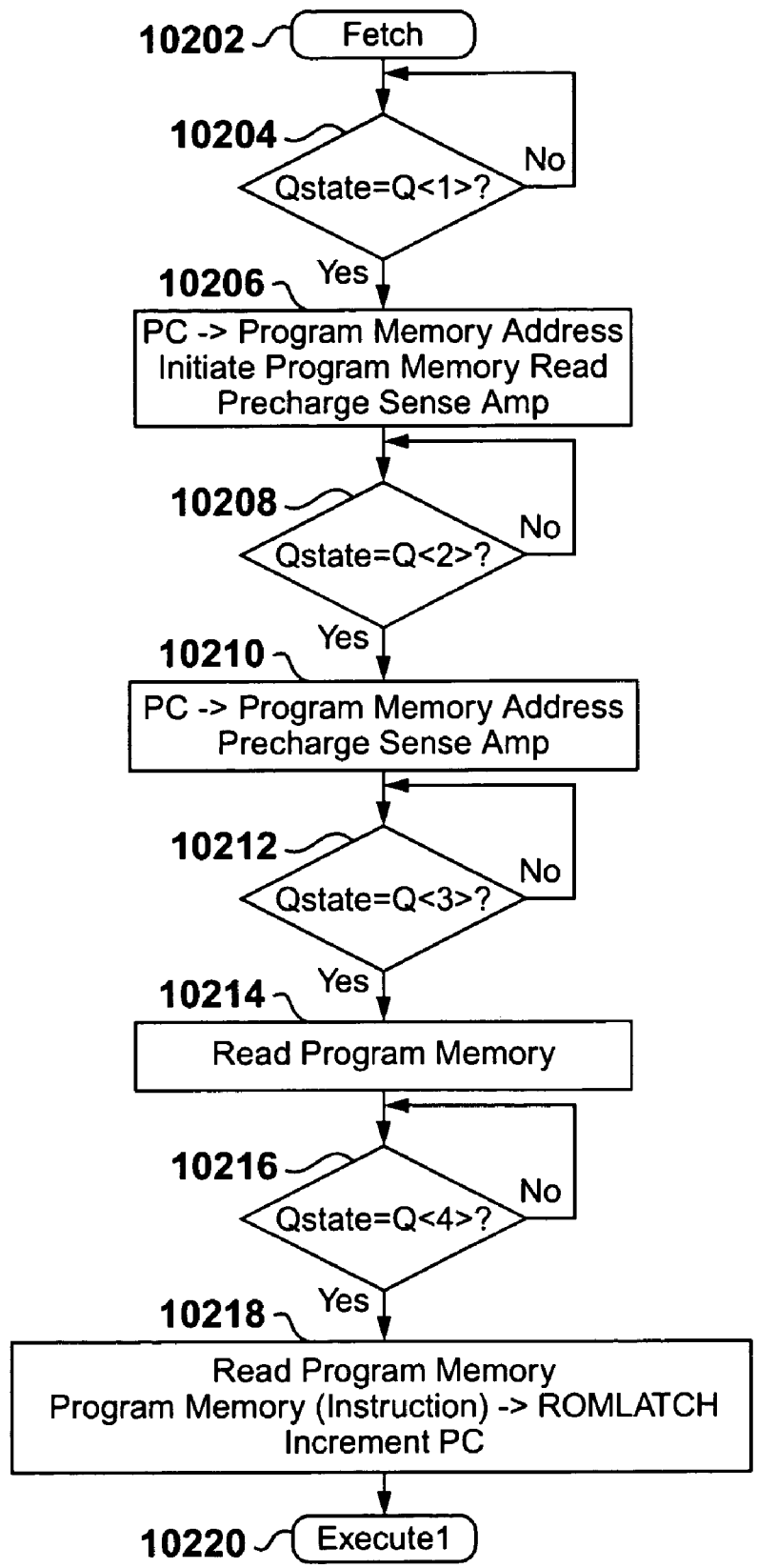
FIG. 102 is a flow chart for GOTO (Fetch) instruction of the present invention.
Figure 103:
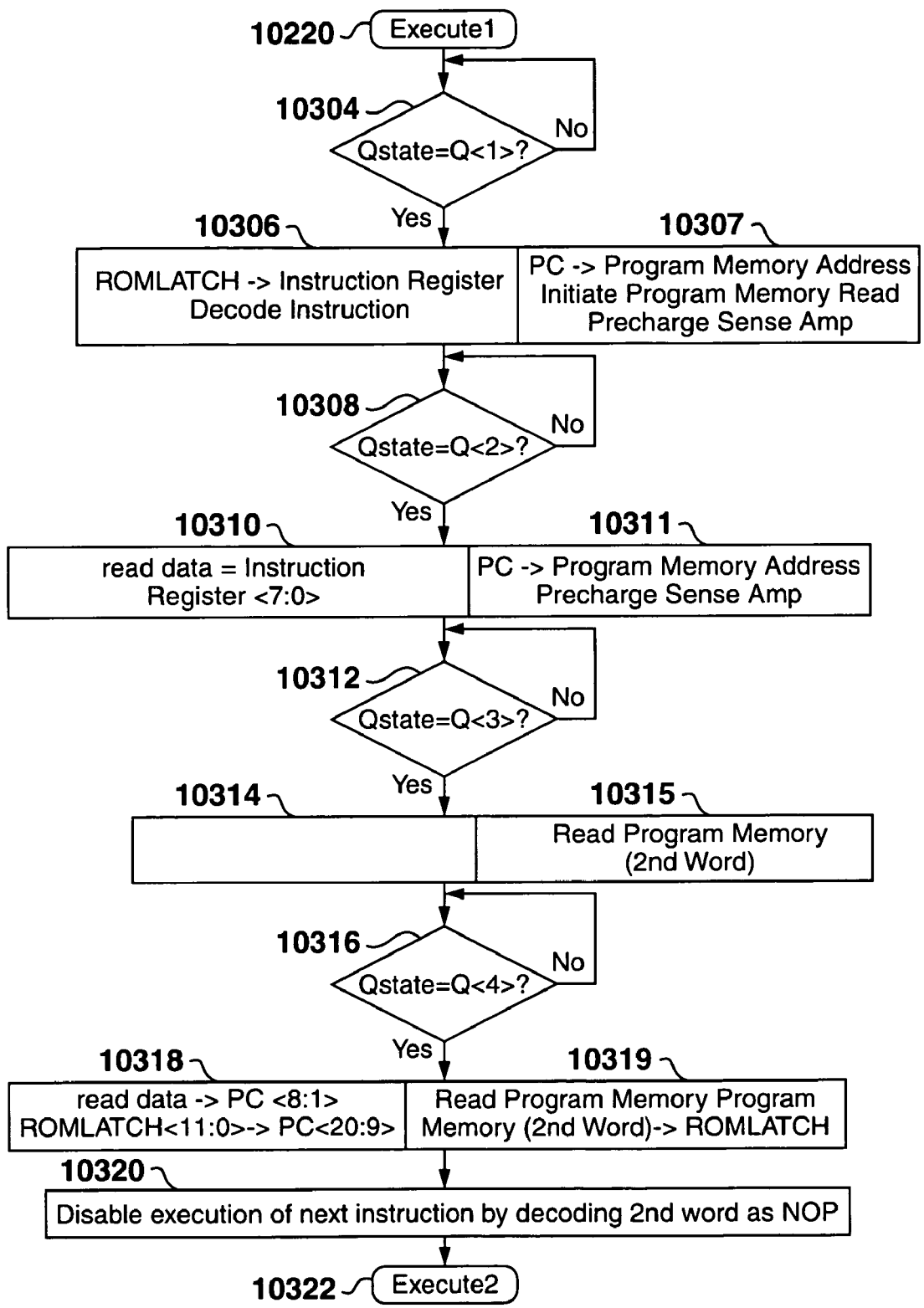
FIG. 103 is a flow chart for GOTO (Execute1) instruction of the present invention.
Figure 104:
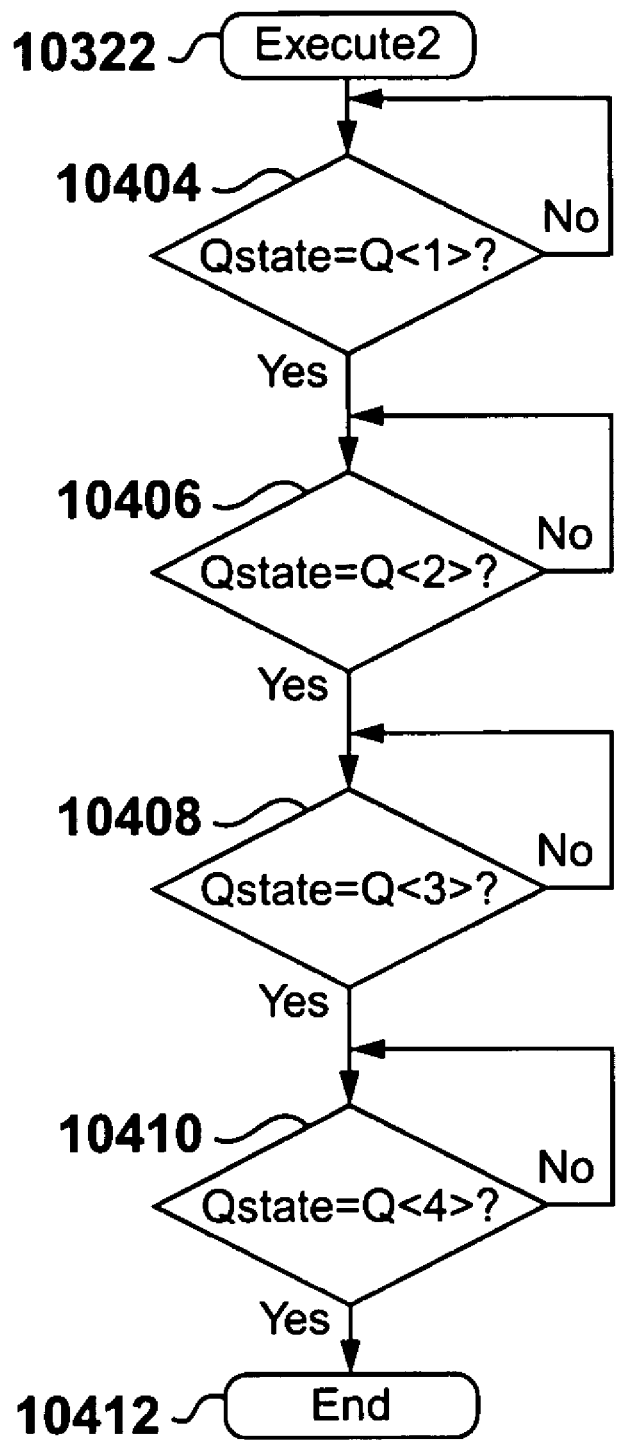
FIG. 104 is a flow chart for GOTO (Execute2) instruction of the present invention.
Figure 105:
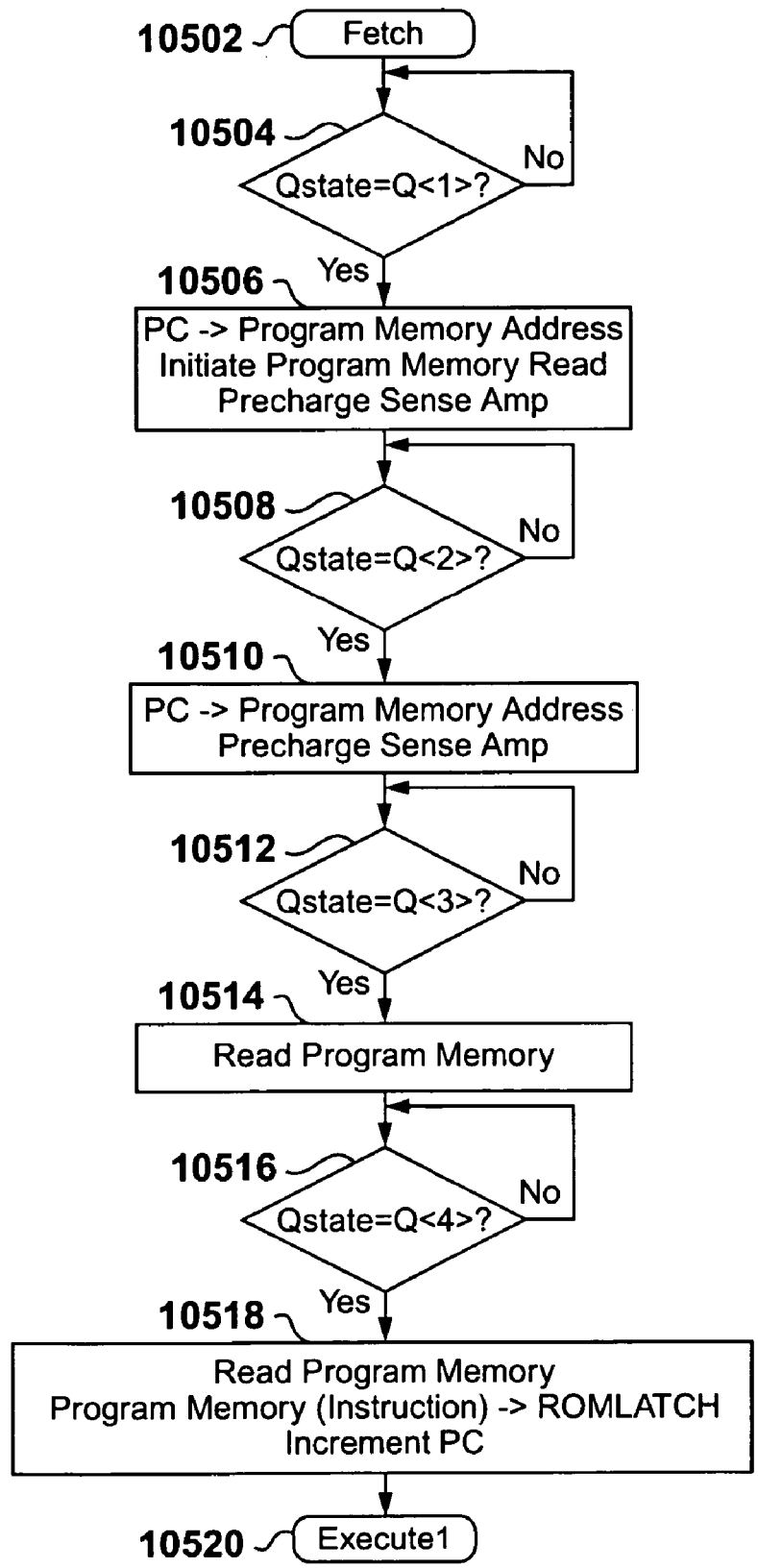
FIG. 105 is a flow chart for CALL (Fetch) instruction of the present invention.
Figure 106:
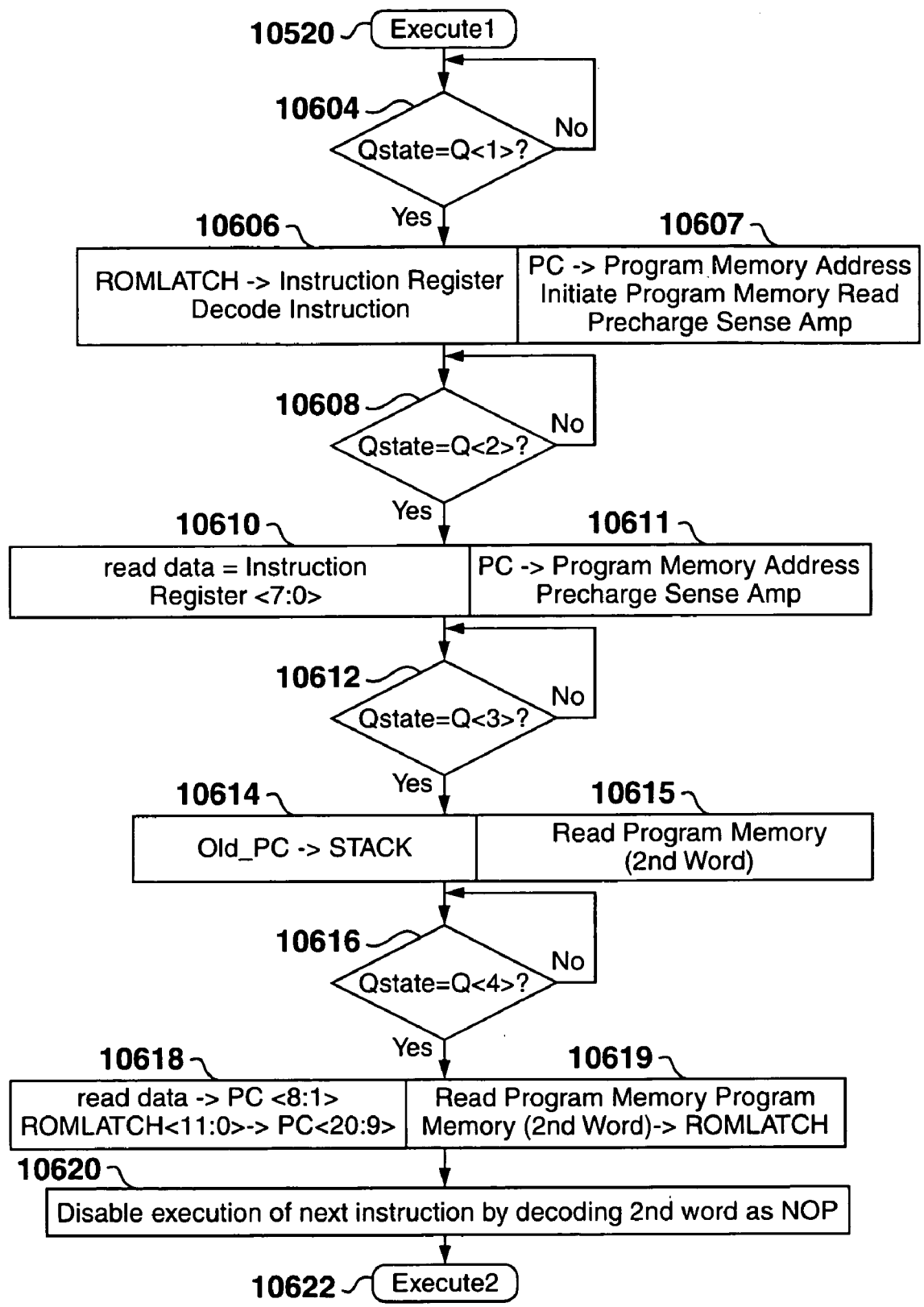
FIG. 106 is a flow chart for CALL (Execute1) instruction of the present invention.
Figure 107:
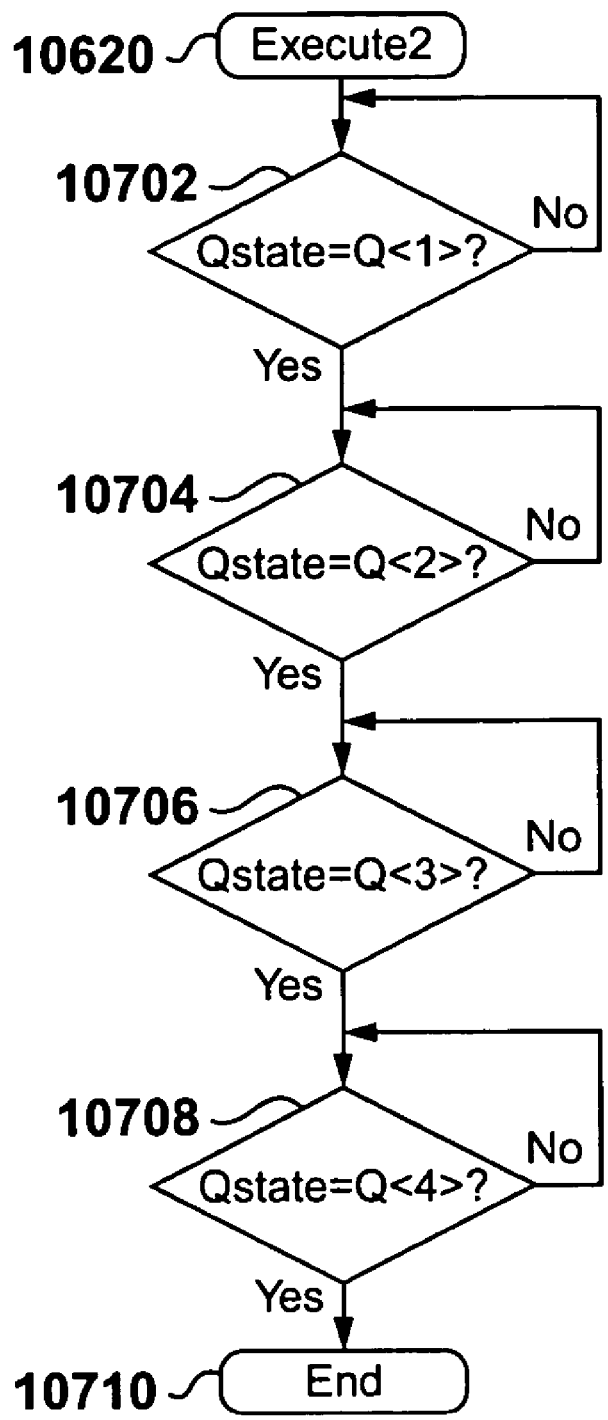
FIG. 107 is a flow chart for CALL (Execute2) instruction of the present invention.
Figure 108:
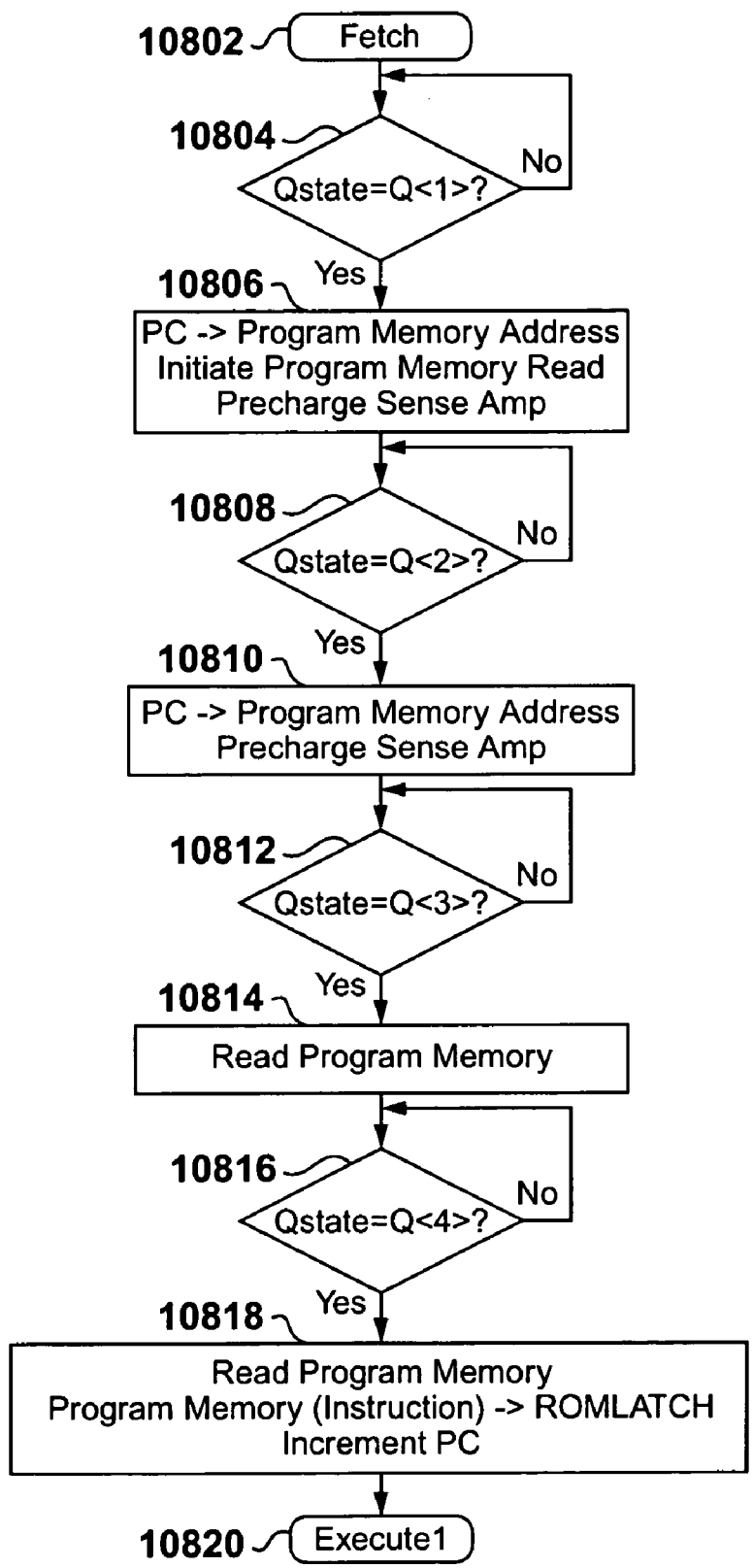
FIG. 108 is a flow chart for TBLRD*, TBLRD*+, TBLRD*−, and TBLRD+* (Fetch) instructions of the present invention.
Figure 109:
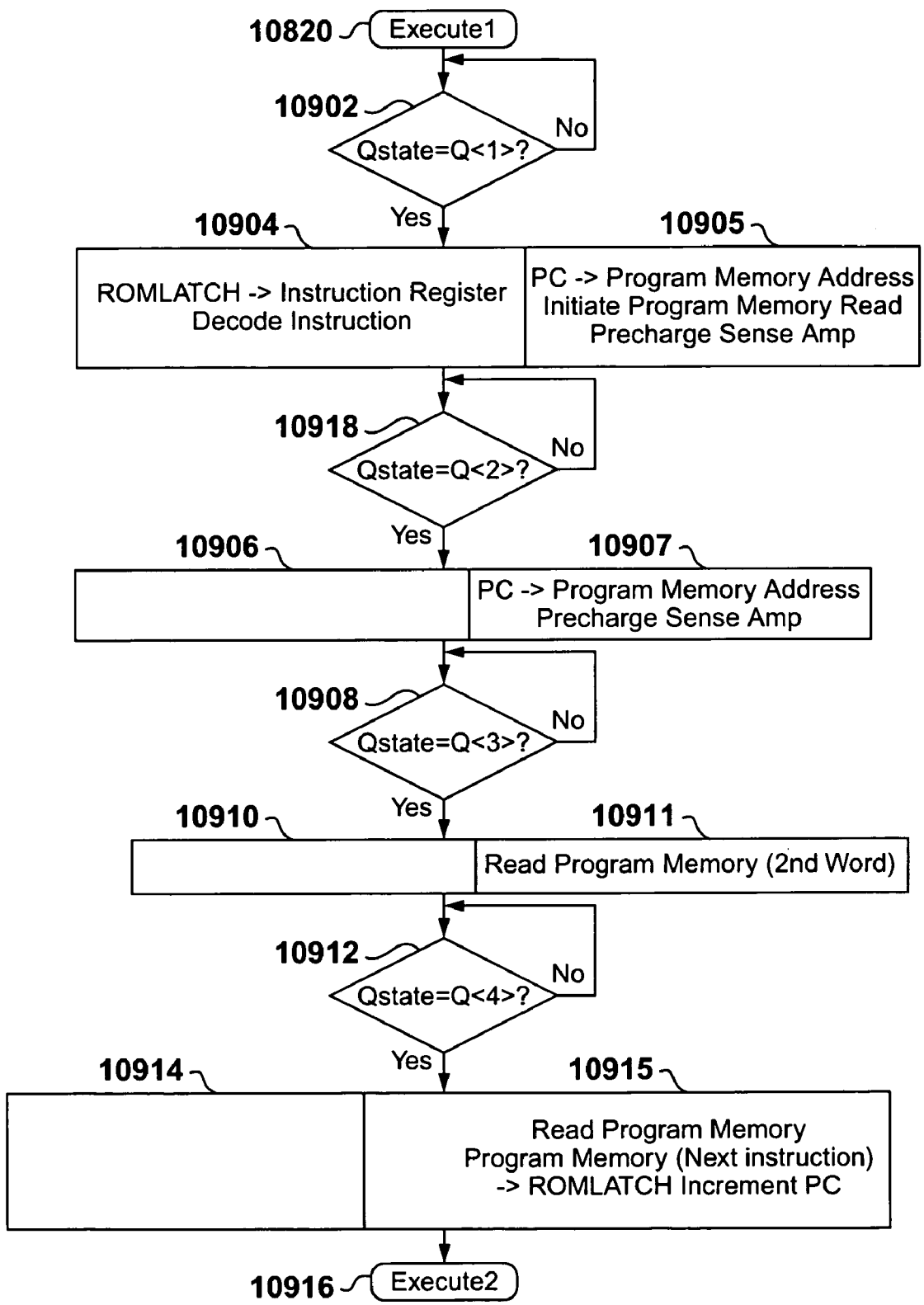
FIG. 109 is a flow chart for TBLRD*, TBLRD*+, TBLRD*−, and TBLRD+* (Execute1) instructions of the present invention.
Figure 110:
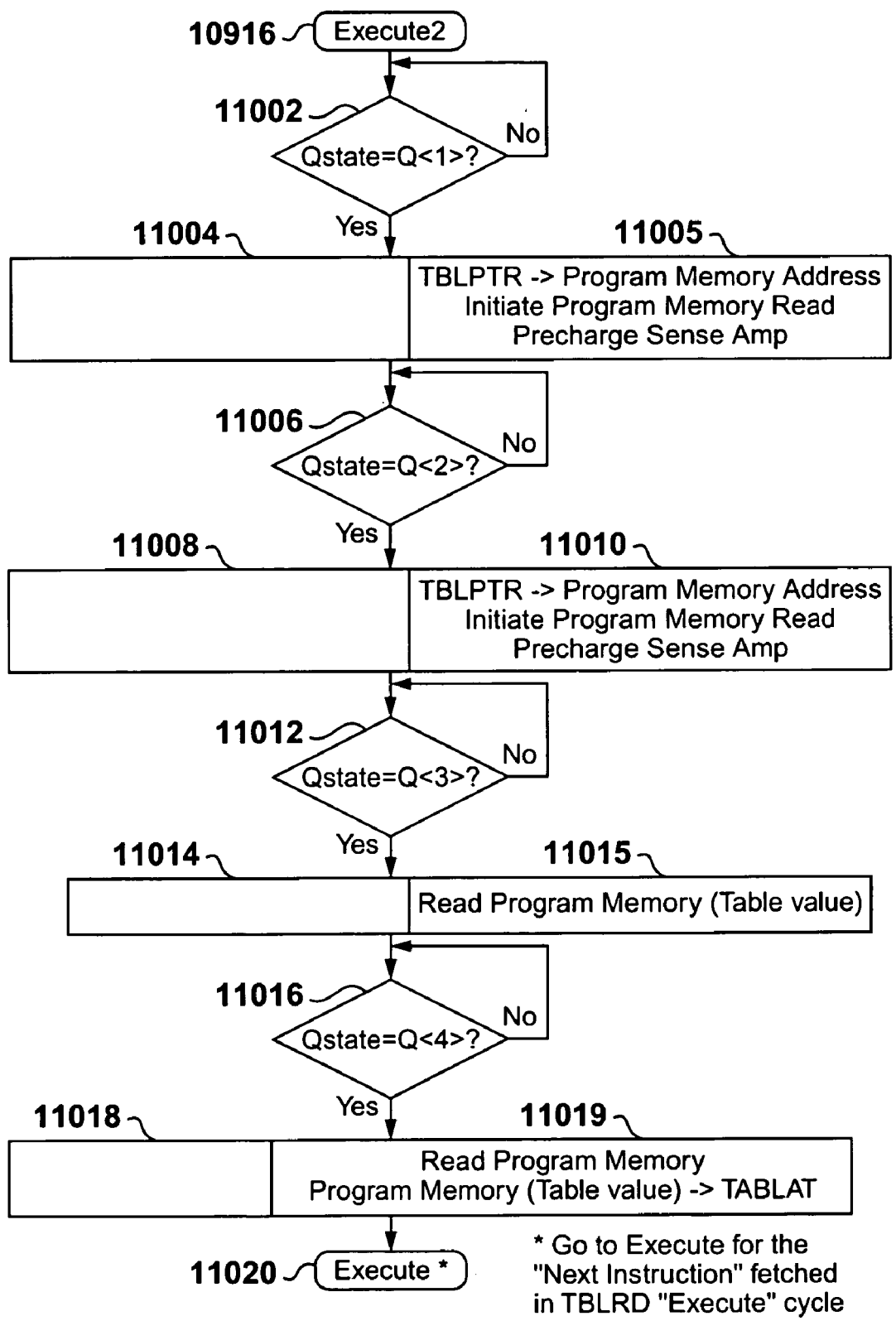
FIG. 110 is a flow chart for TBLRD*, TBLRD*+, TBLRD*−, and TBLRD+* (Execute2) instructions of the present invention.
Figure 111:
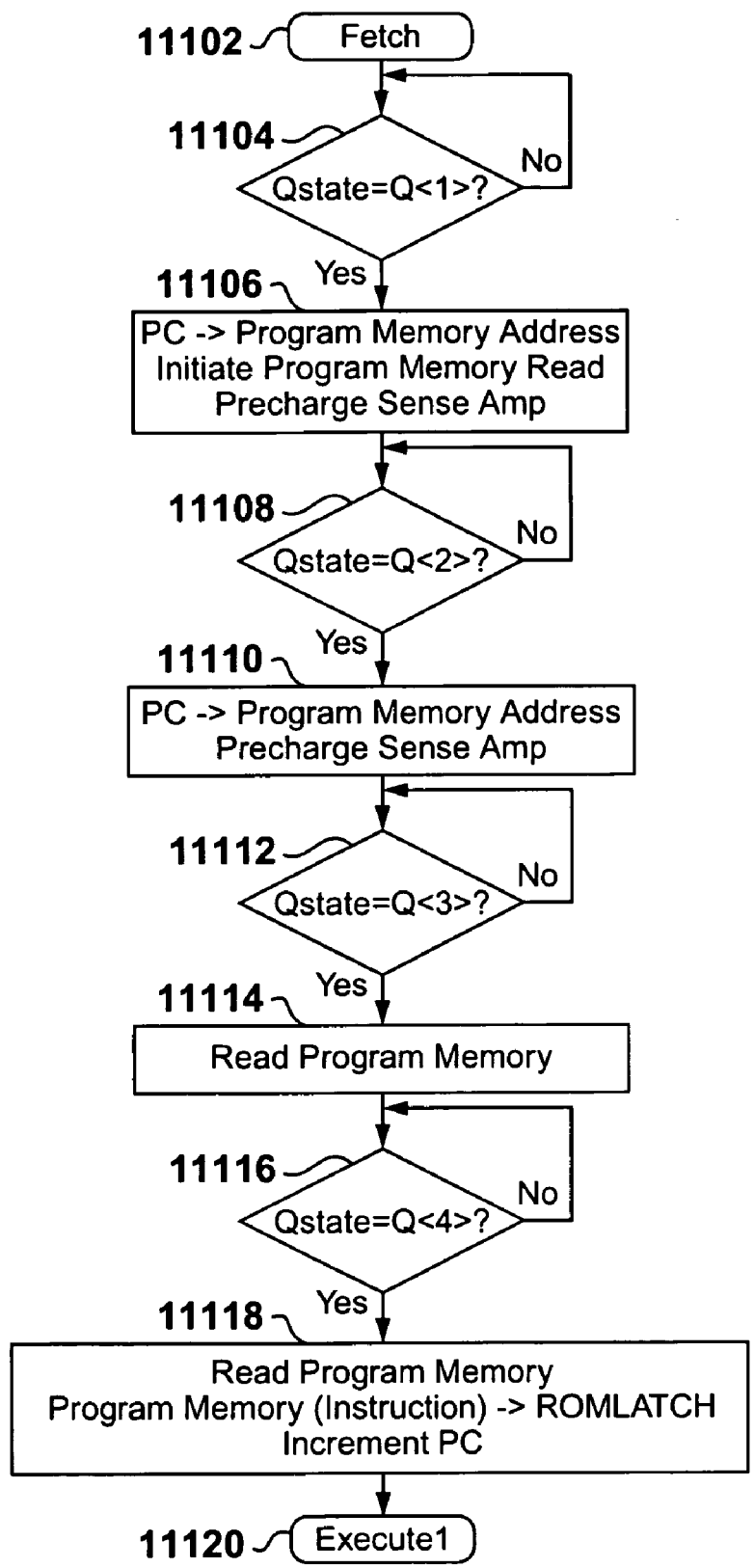
FIG. 111 is a flow chart for TBLWT*, TBLWT*+, TBLWT*−, and TBLWT+* (Fetch) instructions of the present invention.
Figure 112:
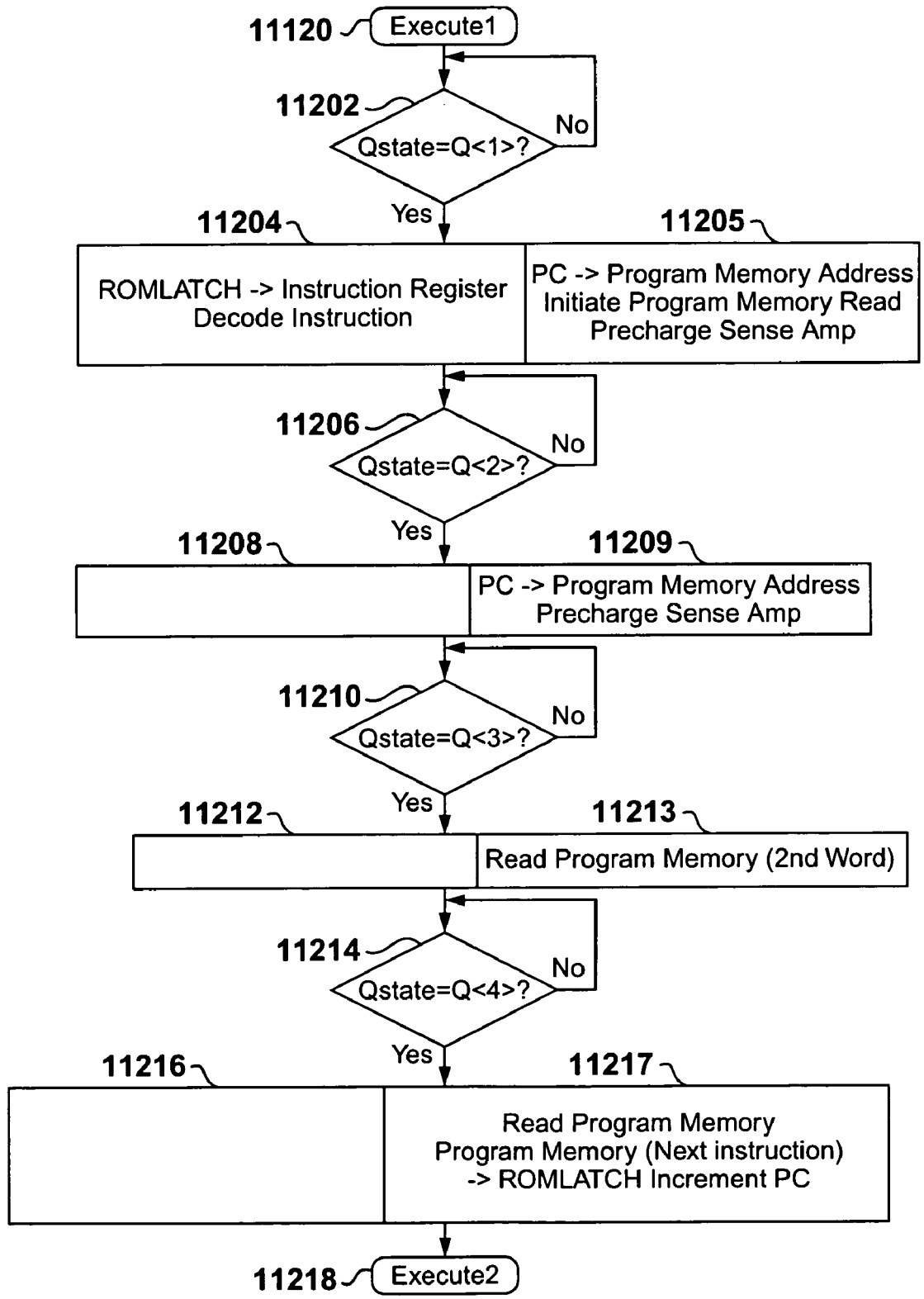
FIG. 112 is a flow chart for TBLWT*, TBLWT*+, TBLWT*−, and TBLWT+(Execute) instructions of the present invention.

For those multi-Word instructions that require two fetches to obtain the complete instruction, three flowcharts are used to describe the entire fetch and execute process. For example, the MOVFF instruction is described in FIGS. 70–72. FIG. 70 shows a relatively standard fetch operation. However, FIG. 71 shows the execution of the first portion of the MOVFF in the left side of the operation boxes while the right portion of the operation boxes show the fetching of the second Word of the instruction. Correspondingly, FIG. 72 shows simply the execution steps of the second Word of the MOVFF instruction. Similar flow charts are provided for the other multi-Word instructions: LFSR (FIGS. 79–81); GOTO (FIGS. 102–104); CALL (FIGS. 105–107), TBLRD*, TBLRD*+, TBLRD*–, and TBLRD+* (FIGS. 108–110); TBLWT*, TBLWT*+, TBLWT*–, and TBLWT+* (FIGS. 111–113).

Appendix A contains a detailed listing of the opcodes and instructions of the instruction set of the present invention. The material in Appendix A is incorporated herein by reference for all purposes.

The present invention, therefore, is well adapted to carry out the objects and attain the ends and advantages mentioned, as well as others inherent therein. While the present invention has been depicted, described, and is defined by reference to particular preferred embodiments of the invention, such references do not imply a limitation on the invention, and no such limitation is to be inferred. The invention is capable of considerable modification, alternation, and equivalents in form and function, as will occur to those ordinarily skilled in the pertinent arts. The depicted and described preferred embodiments of the invention are exemplary only, and are not exhaustive of the scope of the invention. Consequently, the invention is intended to be limited only by the spirit and scope of the appended claims, giving full cognizance to equivalents in all respects.

What is claimed is:

1. A microcontroller comprising:

a central processing unit;

a data memory having a linearized address space coupled with said central processing unit being divided into n banks;

said central processing unit comprising:

a bank select unit which either accesses one of said banks or accesses a virtual bank, whereby said virtual bank combines partial memory space of two banks of said data memory and wherein said selected bank forms a register file;

an arithmetic logic unit coupled with said register file;

a plurality of special function registers being mapped to one of said banks in said data memory, wherein one of said special function registers is a working register being coupled with said arithmetic logic unit;

a program counter register within said central processing unit, said program counter mapped in said data memory; and a working register within said central processing unit being coupled with said arithmetic logic unit, said working register mapped in said data memory;

wherein said microcontroller having an instruction set for controlling said arithmetic logic unit and wherein at least one instruction comprises a bit indicating whether said bank select unit accesses one of said banks or said virtual bank; and wherein said instruction set includes an instruction with an encoding of 1110 110s kkkk kkkk 1111 kkkk kkkk kkkk, wherein said instruction is a subroutine call of an entire 2 mega byte memory range, said 's' bit of said instruction is used to modify the behavior of said instruction, said memory range designated by said kkkk kkkk and kkkk kkkk kkkk portions of said instruction.

2. A microcontroller comprising:

a central processing unit;

a data memory having a linearized address space coupled with said central processing unit being divided into n banks;

said central processing unit comprising:

a bank select unit which either accesses one of said banks or accesses a virtual bank, whereby said virtual bank combines partial memory space of two banks of said data memory and wherein said selected bank forms a register file;

an arithmetic logic unit coupled with said register file;

a plurality of special function registers being mapped to one of said banks in said data memory, wherein one of said special function registers is a working register being coupled with said arithmetic logic unit;

a program counter register within said central processing unit, said program counter mapped in said data memory; and a working register within said central processing unit being coupled with said arithmetic logic unit, said working register mapped in said data memory;

wherein said microcontroller having an instruction set for controlling said arithmetic logic unit and wherein at least one instruction comprises a bit indicating whether said bank select unit accesses one of said banks or said virtual bank; and wherein said instruction set includes an instruction with an encoding of 1110 1111 kkkk kkkk 1111 kkkk kkkk kkkk, wherein said instruction provides an unconditional branch for a program composed from said instruction set anywhere within a 2 megabyte memory range designated by said kkkk kkkk and kkkk kkkk kkkk portions of said instruction.

3. A microcontroller comprising:
a central processing unit;
a data memory having a linearized address space coupled with said central processing unit being divided into n banks;
said central processing unit comprising:
a bank select unit which either accesses one of said banks or accesses a virtual bank, whereby said virtual bank combines partial memory space of two banks of said data memory and wherein said selected bank forms a register file;
an arithmetic logic unit coupled with said register file;
a plurality of special function registers being mapped to one of said banks in said data memory, wherein one of said special function registers is a working register being coupled with said arithmetic logic unit;
a program counter register within said central processing unit, said program counter mapped in said data memory; and
a working register within said central processing unit being coupled with said arithmetic logic unit, said working register mapped in said data memory;
wherein said microcontroller having an instruction set for controlling said arithmetic logic unit and wherein at least one instruction comprises a bit indicating whether said bank select unit accesses one of said banks or said virtual bank; and
wherein said instruction set includes an instruction with an encoding of 1111 xxxx xxxx xxxx, wherein said instruction performs no operation, and the contents of said xxxx xxxx xxxx portion of said instruction are ignored.

4. A microcontroller comprising:
a central processing unit;
a data memory having a linearized address space coupled with said central processing unit being divided into n banks;
said central processing unit comprising:
a bank select, unit which either accesses one of said banks or accesses a virtual bank, whereby said virtual bank combines partial memory space of two banks of said data memory and wherein said selected bank forms a register file;
an arithmetic logic unit coupled with said register file;
a plurality of special function registers being mapped to one of said banks in said data memory, wherein one of said special function registers is a working register being coupled with said arithmetic logic unit;
a program counter register within said central processing unit, said program counter mapped in said data memory; and
a working register within said central processing unit being coupled with said arithmetic logic unit, said working register mapped in said data memory;
wherein said microcontroller having an instruction set for controlling said arithmetic logic unit and wherein at least one instruction comprises a bit indicating whether said bank select unit accesses one of said banks or said virtual bank; and
wherein said instruction set includes an instruction with an encoding of 0000 0000 0000 0000, wherein said instruction performs no operation, and the contents of the latter 0000 0000 0000 portion of said instruction are ignored.

5. A microcontroller comprising:
a central processing unit;
a data memory coupled with said central processing unit being divided into n banks;
said central processing unit comprising:
a bank select unit for selecting one of said banks in said data memory, wherein said selected bank forms a register file;
an arithmetic logic unit coupled with said register file; and
a plurality of special function registers being mapped to one of said banks in said data memory;
wherein one of said special function registers is a working register being coupled with said arithmetic logic unit;
wherein said microcontroller having an instruction set for controlling said arithmetic logic unit and wherein at least one instruction comprises a bit indicating whether said bank select unit accesses one of said banks or said virtual bank; and
wherein said instruction set includes an instruction with an encoding of 1110 110s kkkk kkkk 1111 kkkk kkkk kkkk, wherein said instruction is a subroutine call of an entire 2 mega byte memory range, said 's' bit of said instruction is used to modify the behavior of said instruction, said memory range designated by said kkkk kkkk and kkkk kkkk kkkk portions of said instruction.

6. A microcontroller comprising:
a central processing unit;
a data memory coupled with said central processing unit being divided into n banks;
said central processing unit comprising:
a bank select unit for selecting one of said banks in said data memory, wherein said selected bank forms a register file;
an arithmetic logic unit coupled with said register file; and
a plurality of special function registers being mapped to one of said banks in said data memory;
wherein one of said special function registers is a working register being coupled with said arithmetic logic unit;
wherein said microcontroller having an instruction set for controlling said arithmetic logic unit and wherein at least one instruction comprises a bit indicating whether said bank select unit accesses one of said banks or said virtual bank; and
wherein said instruction set includes an instruction with an encoding of 1110 1111 kkkk kkkk 1111 kkkk kkkk kkkk, wherein said instruction provides an unconditional branch for a program composed from said instruction set anywhere within a 2 megabyte memory range designated by said kkkk kkkk and kkkk kkkk kkkk portions of said instruction.

7. A microcontroller comprising:
a central processing unit;
a data memory coupled with said central processing unit being divided into n banks;
said central processing unit comprising:
a bank select unit for selecting one of said banks in said data memory, wherein said selected bank forms a register file;
an arithmetic logic unit coupled with said register file; and
a plurality of special function registers being mapped to one of said banks in said data memory;
wherein one of said special function registers is a working register being coupled with said arithmetic logic unit;

wherein said microcontroller having an instruction set for controlling said arithmetic logic unit and wherein at least one instruction comprises a bit indicating whether said bank select unit accesses one of said banks or said virtual bank; and wherein said instruction set includes an instruction with an encoding of 1111 xxxx xxxx xxxx, wherein said instruction performs no operation, and the contents of said xxxx xxxx xxxx portion of said instruction are ignored.

8. A microcontroller comprising:

a central processing unit;

a data memory coupled with said central processing unit being divided into n banks;

said central processing unit comprising:

a bank select unit for selecting one of said banks in said data memory, wherein said selected bank forms a register file;

an arithmetic logic unit coupled with said register file; and a plurality of special function registers being mapped to one of said banks in said data memory;

wherein one of said special function registers is a working register being coupled with said arithmetic logic unit;

wherein said microcontroller having an instruction set for controlling said arithmetic logic unit and wherein at least one instruction comprises a bit indicating whether said bank select unit accesses one of said banks or said virtual bank; and wherein said instruction set includes an instruction with an encoding of 0000 0000 0000 0000, wherein said instruction performs no operation, and the contents of the latter 0000 0000 0000 portion of said instruction are ignored.

\* \* \* \* \*